Dec. 20, 1938.  C. F. PYM  2,140,546
METHOD OF AND MACHINE FOR USE IN MANUFACTURING SHOES
Filed July 3, 1936  20 Sheets-Sheet 3

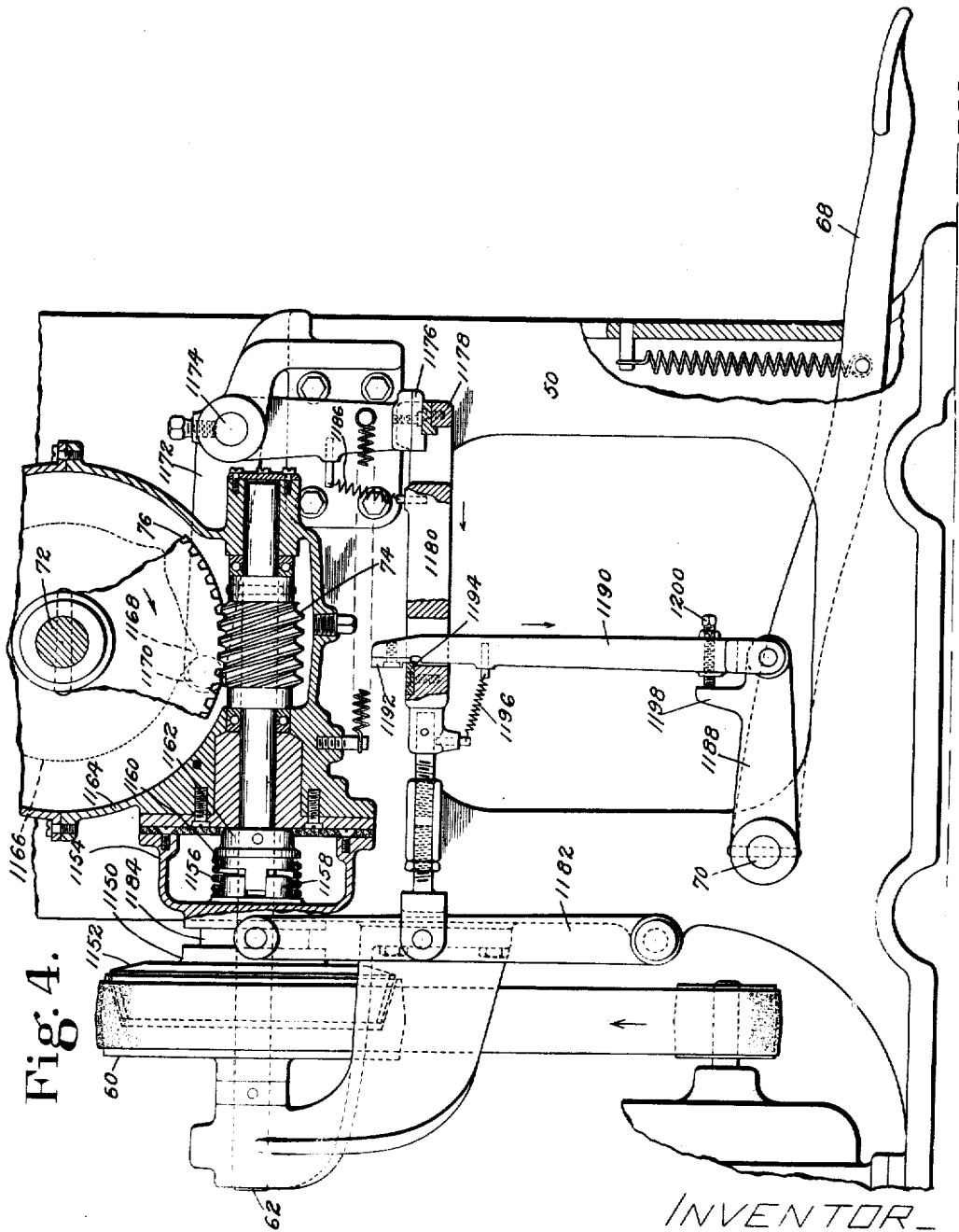

Dec. 20, 1938.  C. F. PYM  2,140,546
METHOD OF AND MACHINE FOR USE IN MANUFACTURING SHOES
Filed July 3, 1936  20 Sheets-Sheet 5

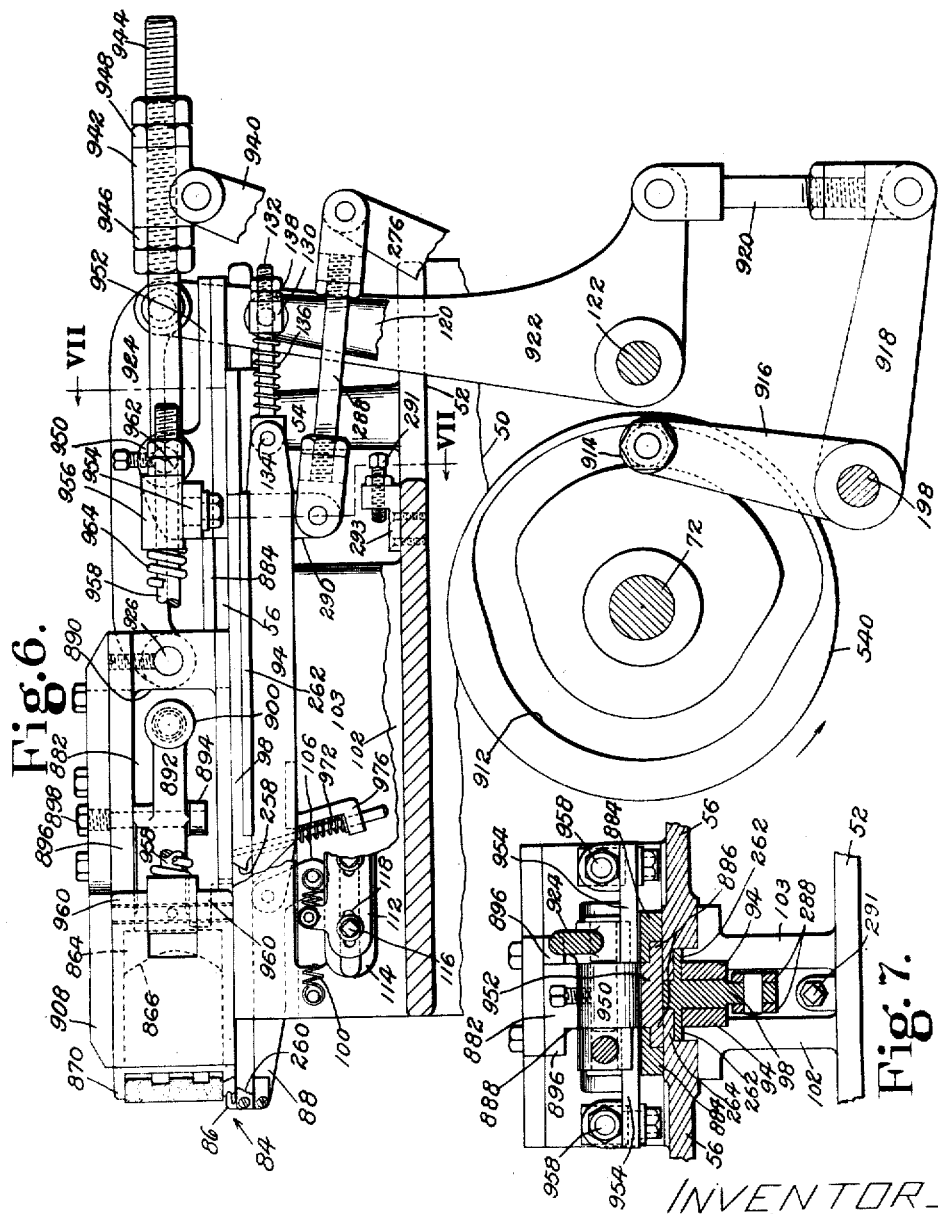

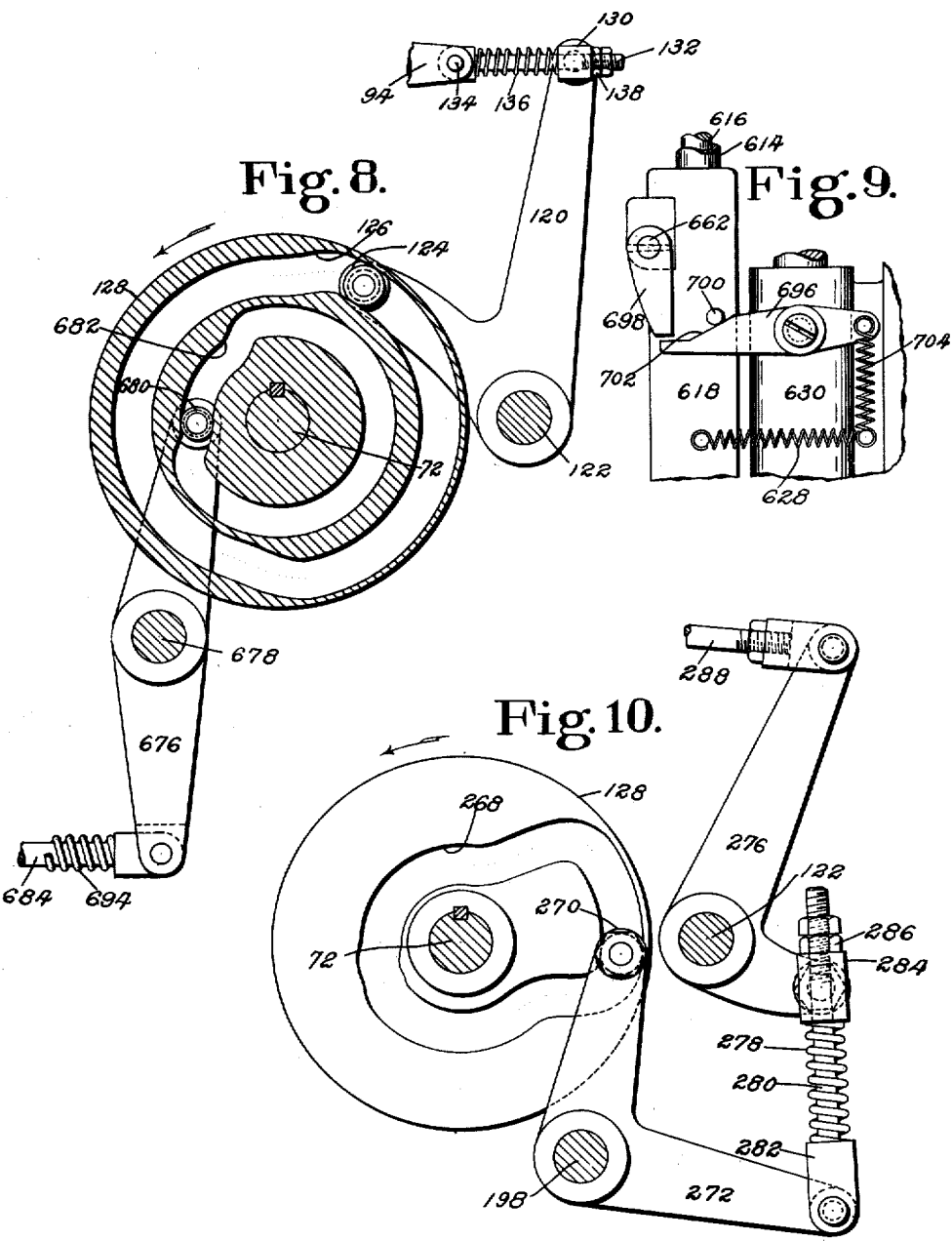

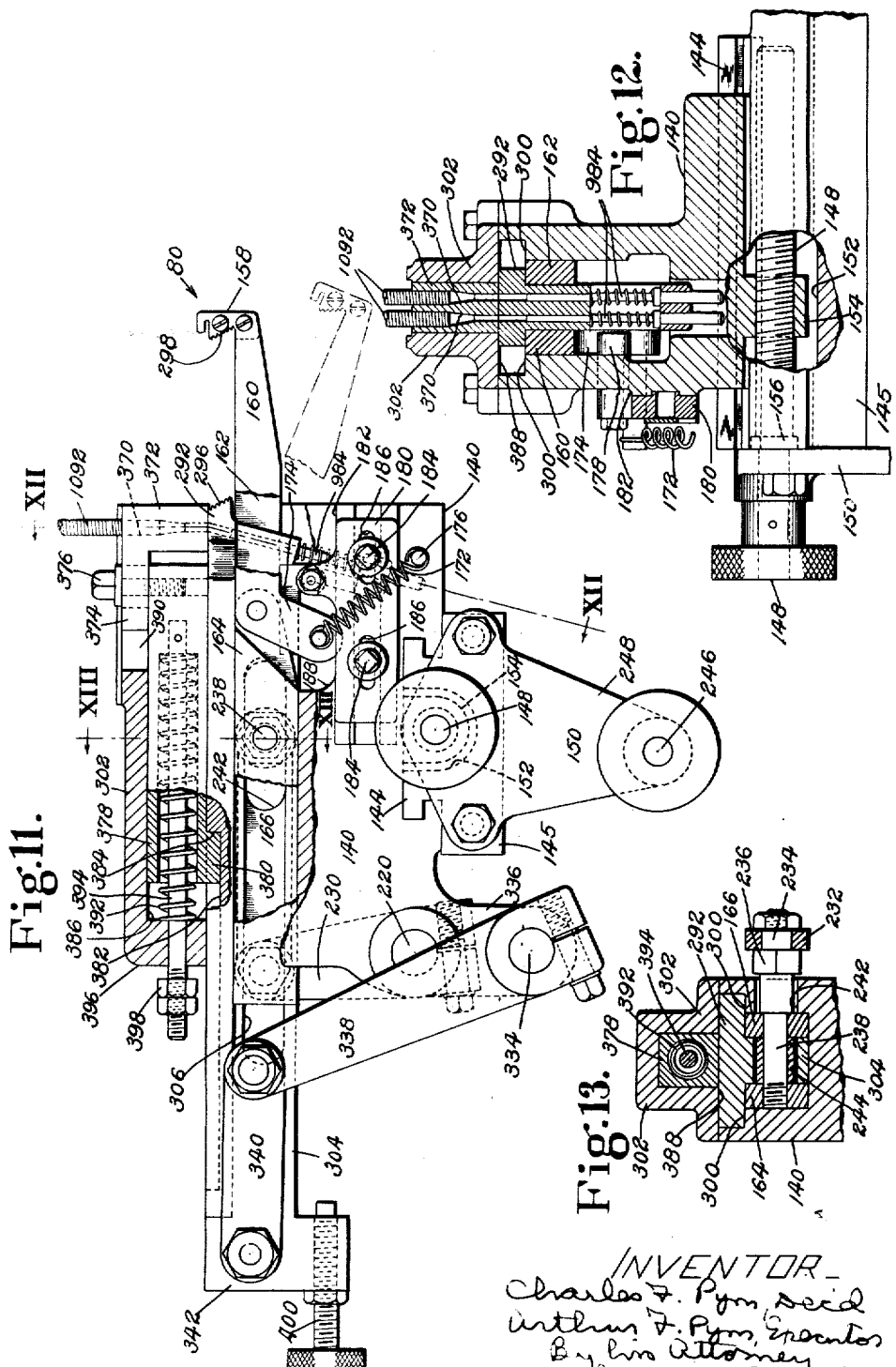

Dec. 20, 1938. C. F. PYM 2,140,546
METHOD OF AND MACHINE FOR USE IN MANUFACTURING SHOES
Filed July 3, 1936 20 Sheets-Sheet 9

Dec. 20, 1938.   C. F. PYM   2,140,546
METHOD OF AND MACHINE FOR USE IN MANUFACTURING SHOES
Filed July 3, 1936   20 Sheets-Sheet 10
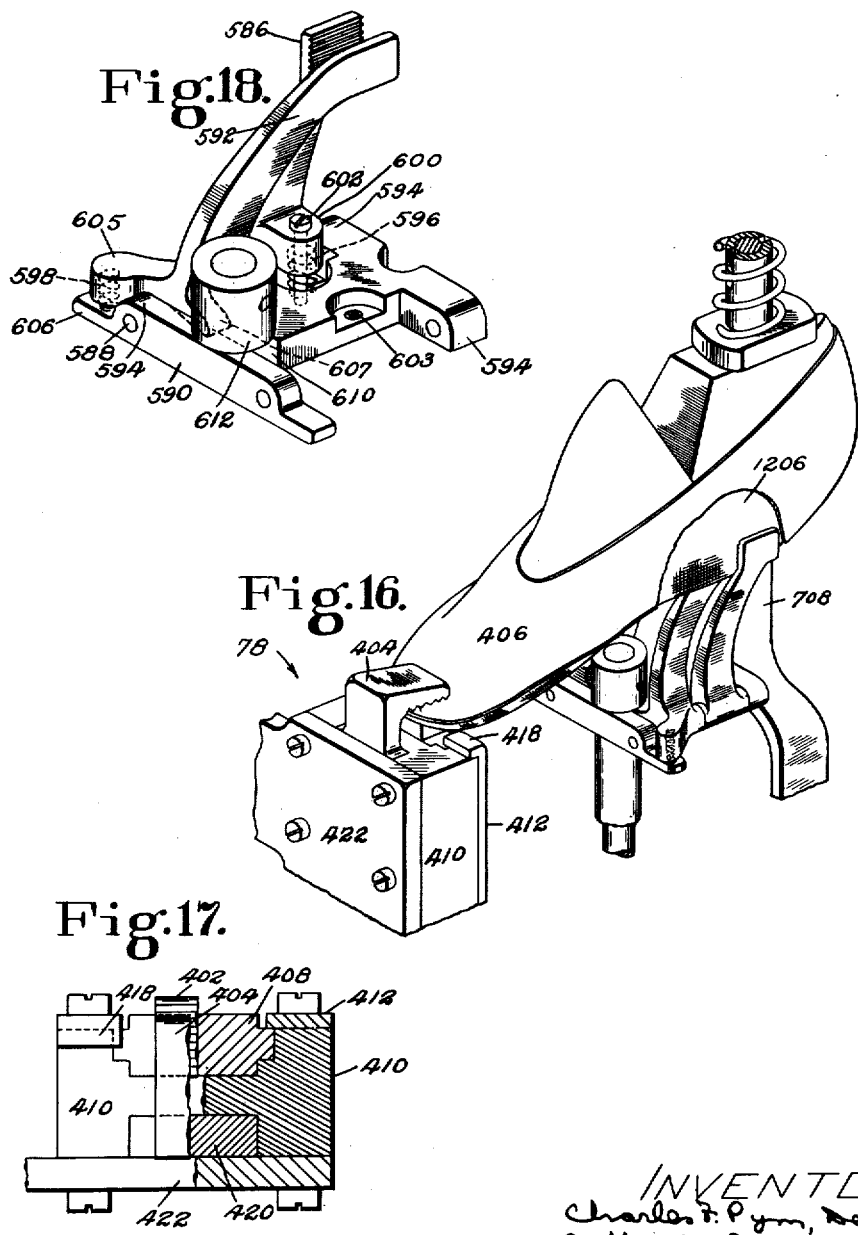

Dec. 20, 1938.  C. F. PYM  2,140,546
METHOD OF AND MACHINE FOR USE IN MANUFACTURING SHOES
Filed July 3, 1936  20 Sheets-Sheet 11
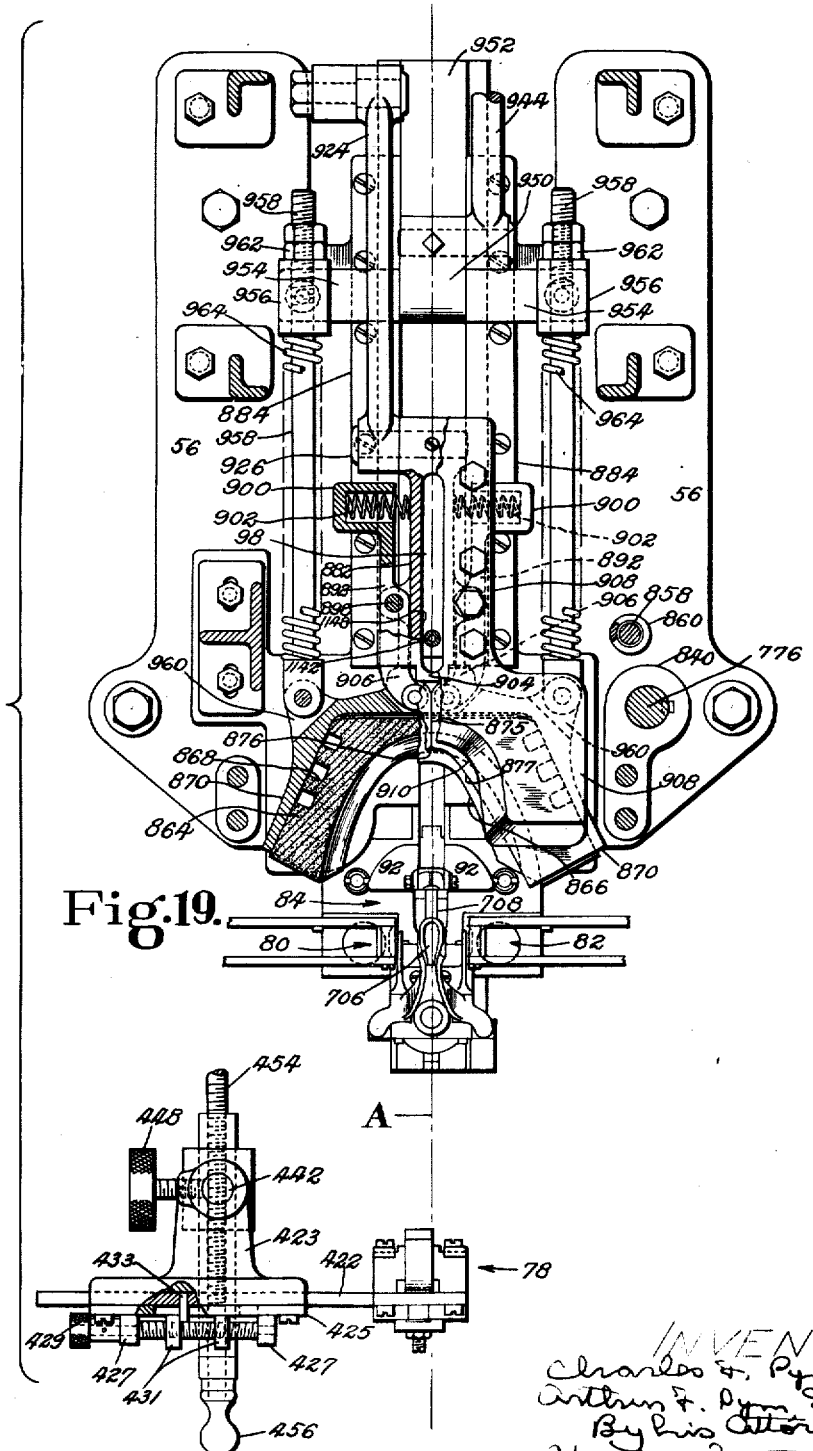

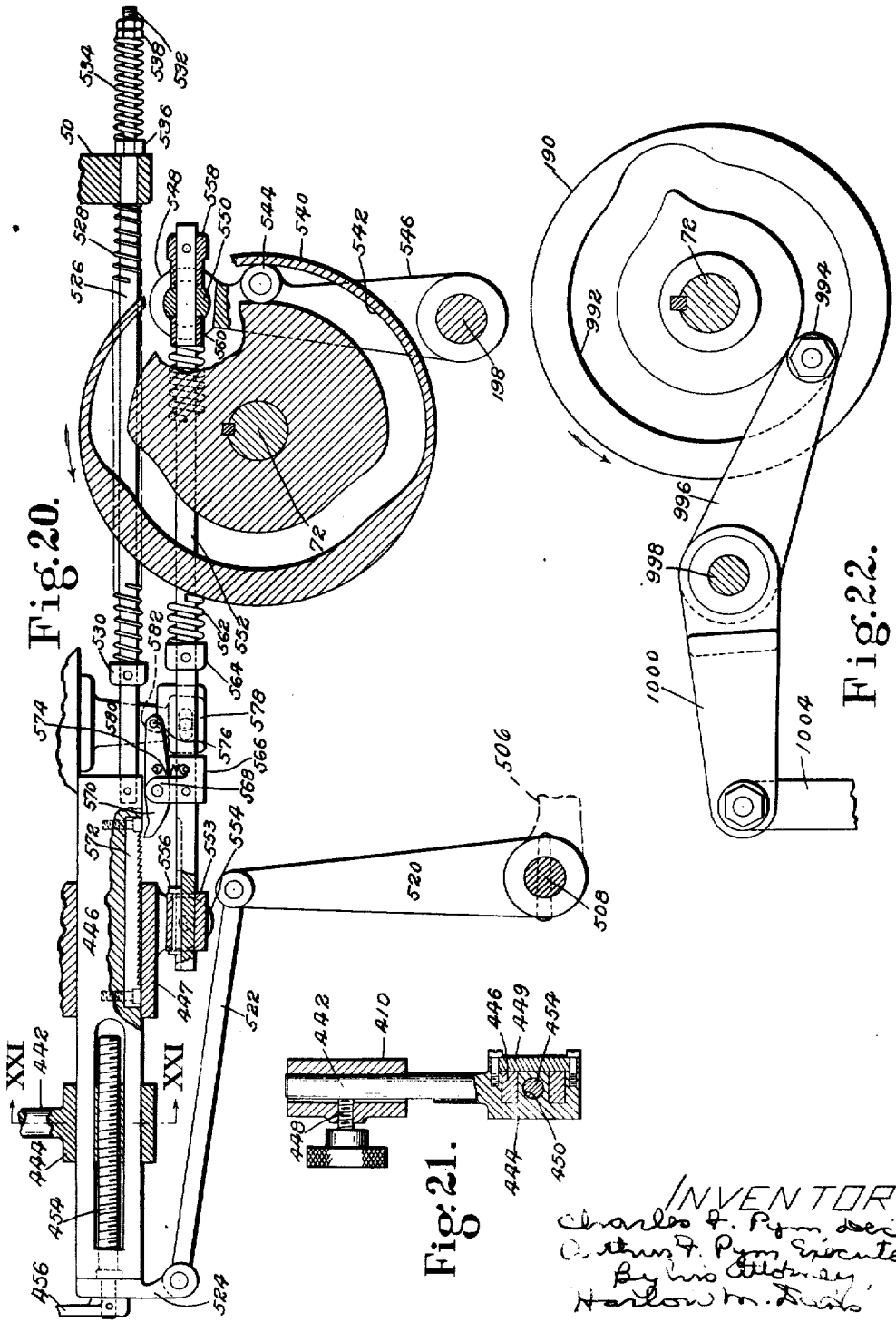

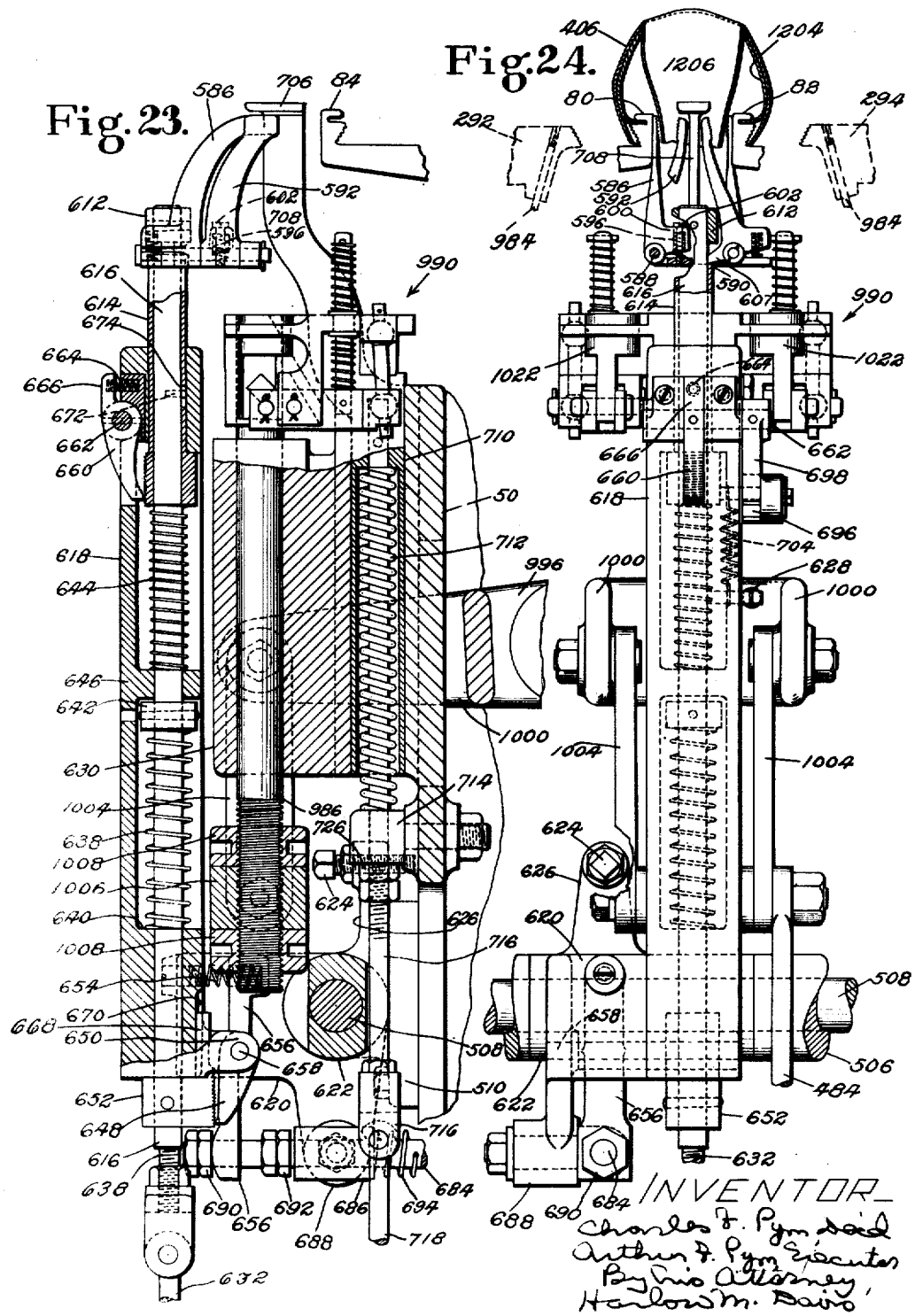

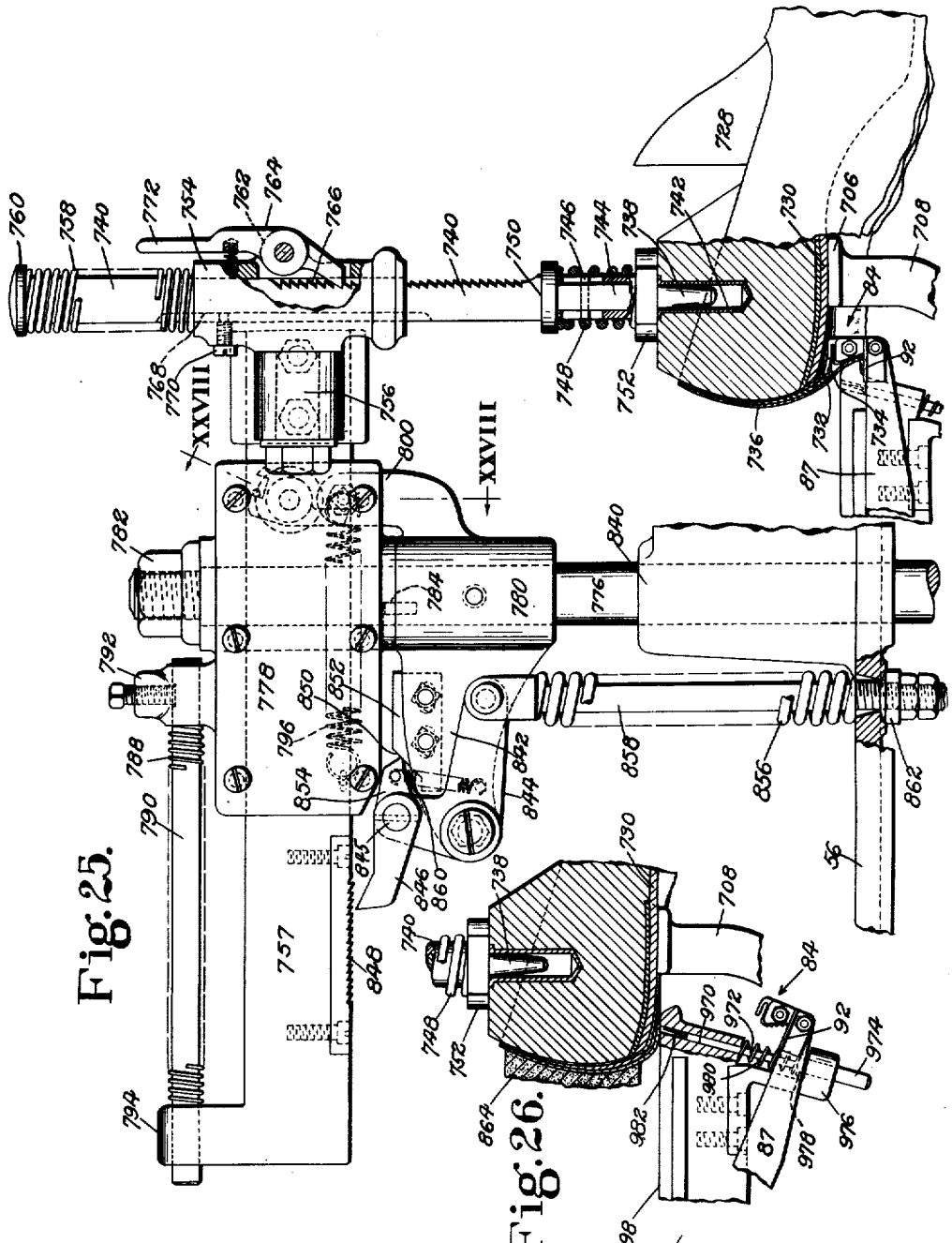

Dec. 20, 1938.                C. F. PYM                2,140,546
METHOD OF AND MACHINE FOR USE IN MANUFACTURING SHOES
Filed July 3, 1936           20 Sheets-Sheet 15
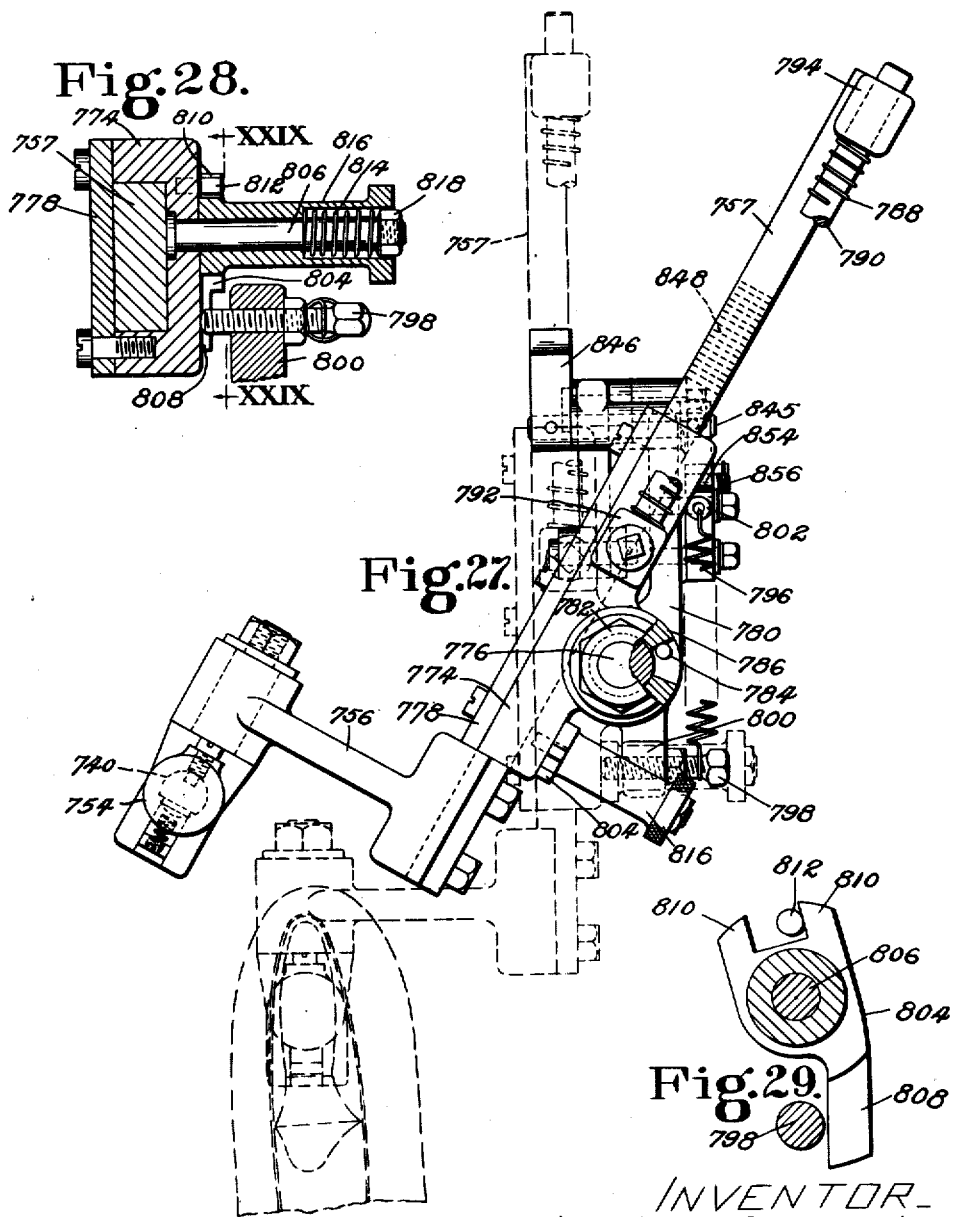

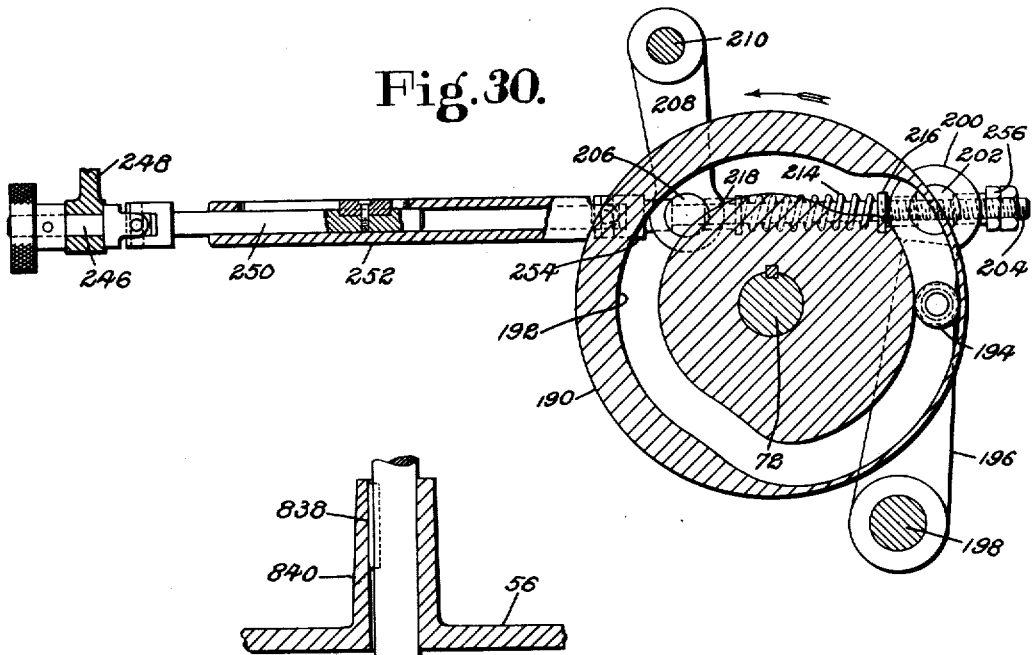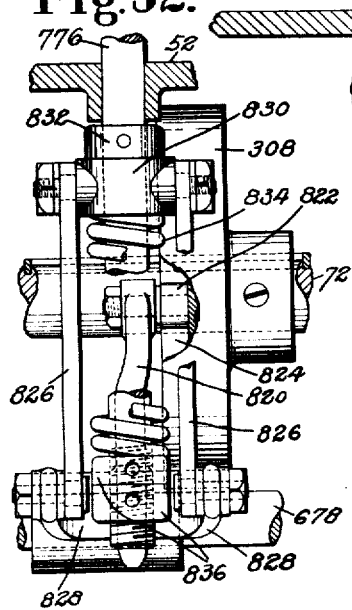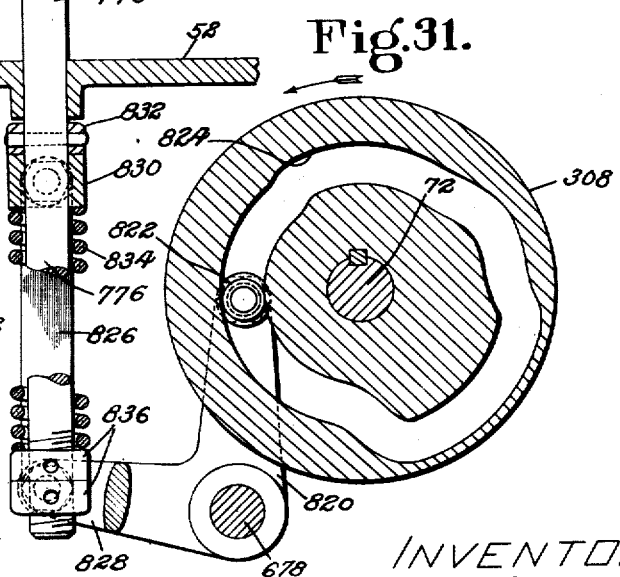

Dec. 20, 1938.  C. F. PYM  2,140,546
METHOD OF AND MACHINE FOR USE IN MANUFACTURING SHOES
Filed July 3, 1936  20 Sheets-Sheet 17
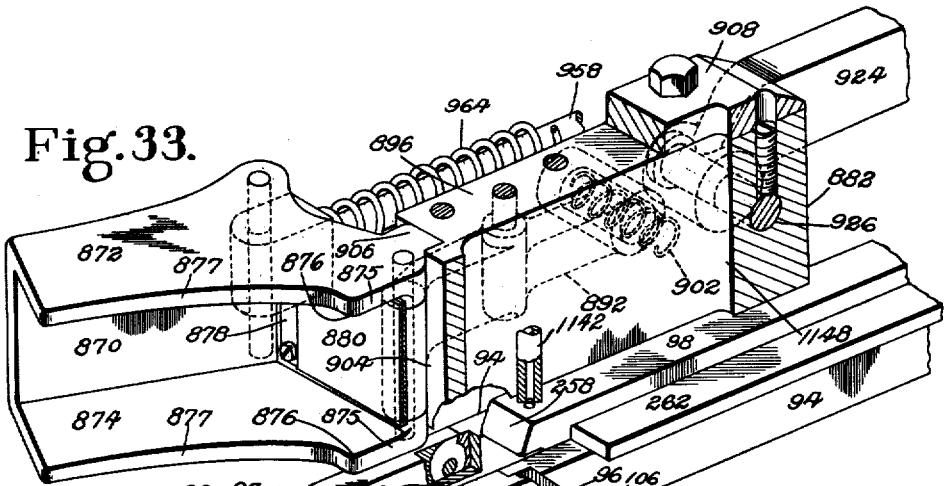
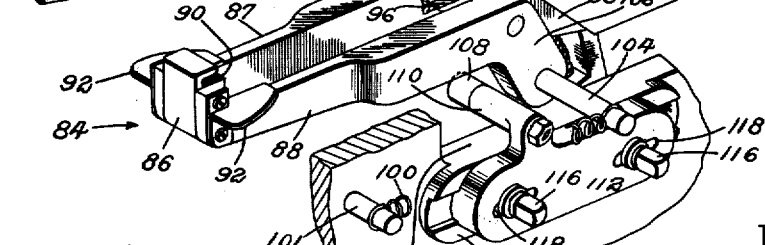
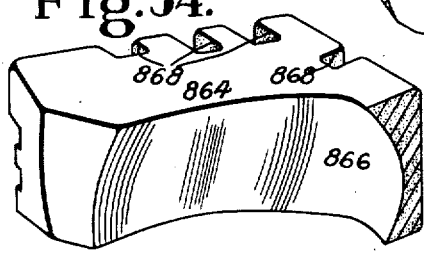
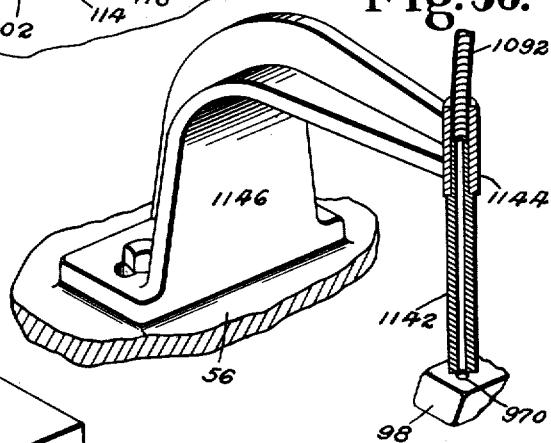
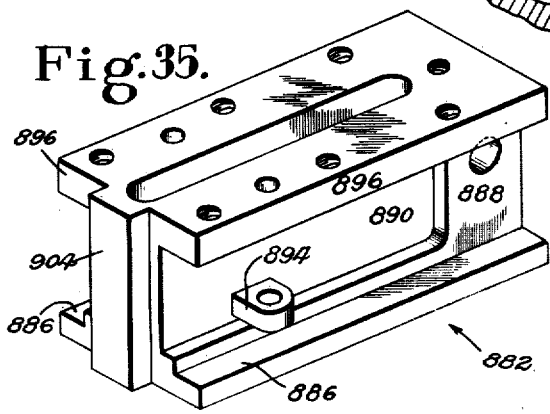

Dec. 20, 1938.  C. F. PYM  2,140,546
METHOD OF AND MACHINE FOR USE IN MANUFACTURING SHOES
Filed July 3, 1936   20 Sheets-Sheet 18
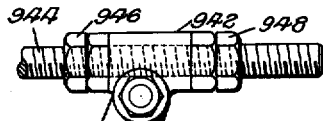
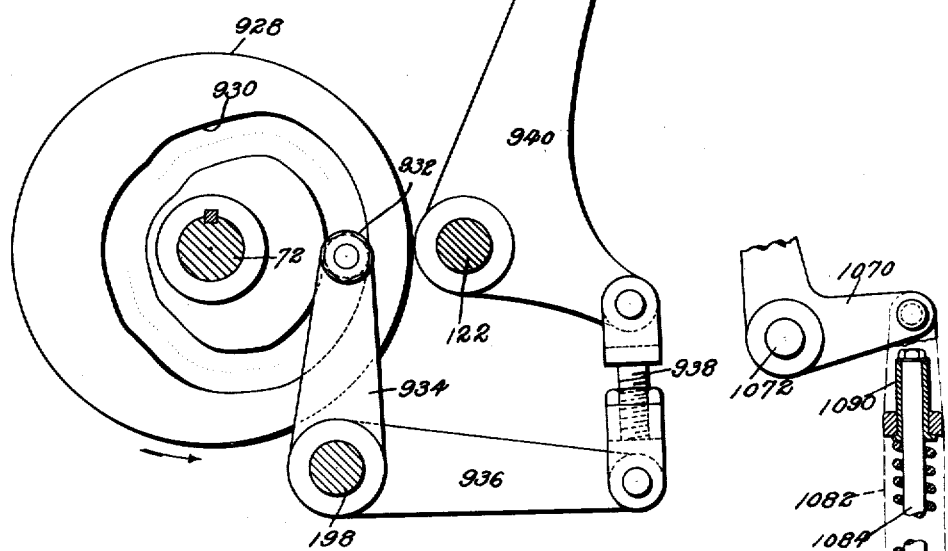
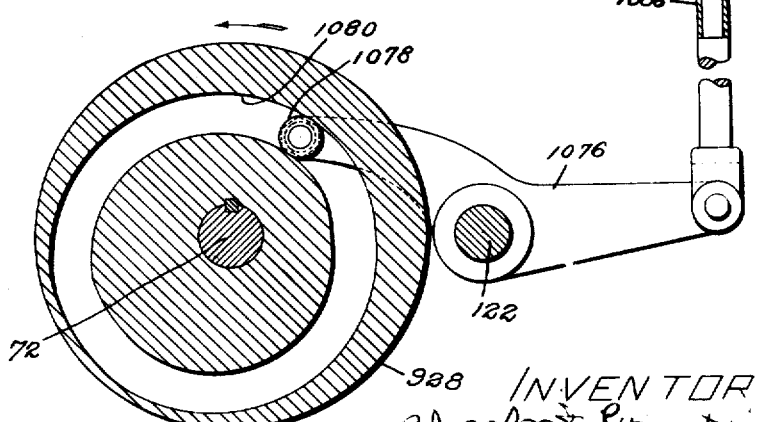

Dec. 20, 1938.  C. F. PYM  2,140,546
METHOD OF AND MACHINE FOR USE IN MANUFACTURING SHOES
Filed July 3, 1936  20 Sheets-Sheet 19
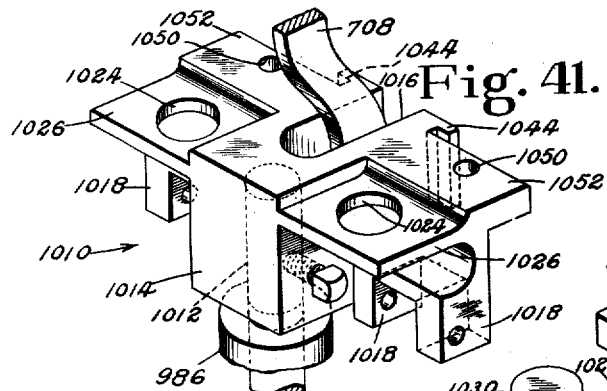
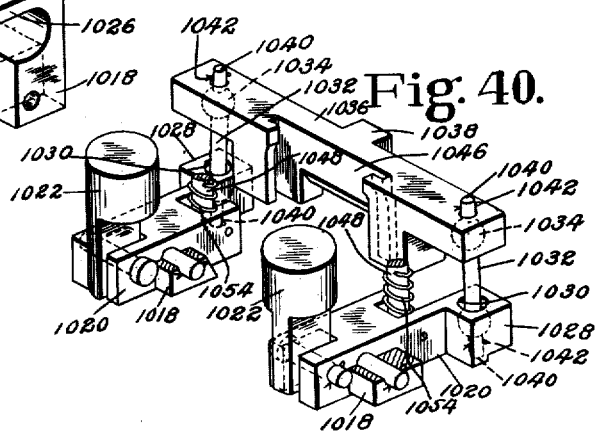
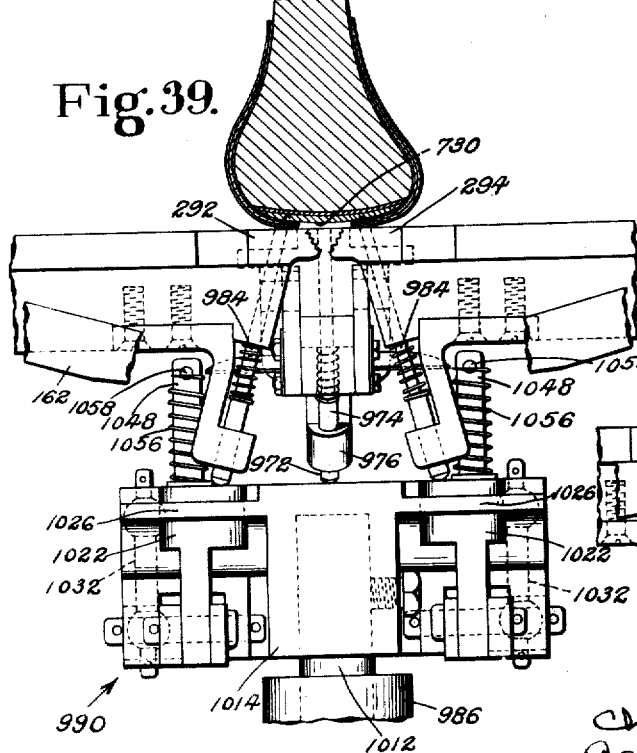
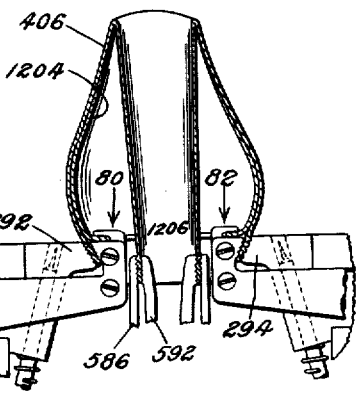
INVENTOR
Charles F. Pym, deceased
Arthur F. Pym, Executor
By his Attorney,
Harlow M. Davis Dec. 20, 1938.  C. F. PYM  2,140,546
METHOD OF AND MACHINE FOR USE IN MANUFACTURING SHOES
Filed July 3, 1936   20 Sheets-Sheet 20

Patented Dec. 20, 1938

2,140,546

UNITED STATES PATENT OFFICE 2,140,546

METHOD OF AND MACHINE FOR USE IN MANUFACTURING SHOES

Charles F. Pym, deceased, late of Beverly, Mass., by Arthur F. Pym, executor, Swampscott, Mass., assignor to United Shoe Machinery Corporation, Paterson, N. J., a corporation of New Jersey Application July 3, 1936, Serial No. 88,818

185 Claims. (Cl. 12—4)

The present invention relates to methods of and machines for use in the manufacture of shoes and is herein illustrated in its application to methods of assembling and shaping shoe parts such, for example, as lined uppers and heel stiffeners, and to machines for use in the assembling and shaping operation. It is to be understood, however, that the invention is not limited in its scope to methods and machines adapted to be employed in the assembling of shoe parts, the invention in certain of its aspects being applicable to operations subsequent to the assembling operation.

In assembling heel stiffeners in lined uppers it is the usual practice to apply adhesive to the heel stiffener and manually to insert the stiffener, which in most cases is a molded counter, between the lining and upper at the rear or heel portion of the shoe and then to apply pressure manually to the heel portion of the lining and upper in order to secure a permanent bonding of said parts. This method of assembling uppers and counters is slow and unreliable and it is often necessary during the lasting operation to relocate the counter wings in order to position them correctly on the last. In many cases this necessitates breaking the bond between the counter and the lining and also breaking the bond between the counter and the upper.

It is an object of the present invention to provide a machine for securing the heel portion of a lined upper in determinate relation to a cement-treated counter. With this in view a feature of the invention consists in the provision in an assembling machine of means, herein illustrated as a heel-embracing pad, constructed and arranged to operate against the outer surface of the heel portion of shoe upper parts to apply pressure locally at the region of the back seam, cooperating pressing means which operates upon a heel former, herein illustrated as a last, positioned within the upper in the machine to press the last against the inner surface of the heel portion of the upper, and means for attaching the lasting margin of the heel portion of the shoe parts to an insole which, as herein illustrated, is temporarily attached to the last bottom. After the heel pad has pressed the heel end portion of the upper against the counter it is closed on the upper to apply pressure to the sides of its heel portion.

In order to insure a smooth lining at the heel portion of the shoe it is considered desirable to wipe the lining heightwise of the upper toward its lasting margin. This operation is usually performed by hand in connection with the cement attachment of the counter to the upper and lining. It is an object of the present invention to provide mechanism for effecting the desired wiping of the lining and, accordingly, a further feature of the invention comprises means for moving the last, or other heel former, heightwise of an upper supported in the machine in order to effect the desired wiping action on the heel portion of the lining, the upper being held from heightwise movement during the heightwise movement of the last by means constructed and arranged to engage its outer surface, such means in the illustrated machine being the heel-embracing pad above referred to.

For insuring a correct position of the counter in the upper there is provided in the illustrated machine, in accordance with a further feature of the invention, means for supporting a loose counter, that is, a counter which has not been positioned in its upper, while the heel portion of the upper is urged against the counter to effect a cement attachment of said parts. For insuring a correct position of the upper heightwise thereof relatively to the counter there is provided in the illustrated machine, in combination with the counter-supporting means, means for positioning the upper in predetermined relation to the counter heightwise thereof. The illustrated supporting means comprises a series of arms provided, respectively, with means for supporting a molded counter by engagement with its flange only and provided also with gaging surfaces for positioning an upper heightwise thereof relatively to the counter. For securing the upper in position after it has been located on the work-supporting arms there is provided, in combination with said supports, grippers for engaging the bottom margin of the upper and holding the upper in position. In the illustrated machine the inner jaws of the upper grippers are formed on the work-supporting members while the outer jaws are formed in the end faces of heel-lasting wipers which operate to position the lasting margin of the upper for attachment to the insole after the heel portion of the shoe has been gripped against the last by the heel-embracing pad above referred to.

For positioning the upper lengthwise thereof relatively to the supported counter the invention provides, in combination with the counter-supporting means, means herein illustrated as a toe gripper for effecting lengthwise tension of an upper the rear part of which is arranged to embrace the supported counter and is held by the counter from movement forwardly thereof.

As herein illustrated, the positioning of the counter and the upper in the machine, the tensioning of the upper lengthwise thereof, and the gripping of the lasting margin of the heel portion of the upper all occur prior to the positioning of a last within the upper. Since the last is to be advanced into the supported upper through its bottom opening it is also desirable to hold the lining against misplacement heightwise thereof during the movement of the last into the supported upper. Accordingly, a further feature of the invention consists in the provision in combination with the counter and upper-positioning means of means herein illustrated as grippers for holding the rear part of the lining by its bottom margin while the last is introduced into the rear part of the supported upper.

While the illustrated machine requires the use of a last as the inner heel former, it is to be understood that the invention is not thus limited in its scope but on the contrary it is within the scope of the invention to provide a heel former which does not extend into the forepart of the upper and, furthermore, the heel former, if desired, may be a permanent part of the machine.

In its application to methods of manufacturing shoes the present invention in one aspect thereof consists in applying adhesive to a counter, supporting the treated counter independently of its upper, then positioning the upper in determinate relation to the counter heightwise thereof, and then effecting adhesive attachment of the upper to the counter, for example, by operating on said shoe parts with an inner presser member and an outer presser member. In another aspect of the invention the upper is pulled lengthwise thereof against the back of the counter, after the counter and upper have been positioned in determinate relation to each other heightwise thereof, in order to arrange the upper for the reception of a last.

These and other aspects and features of the invention will now be described with reference to the accompanying drawings and pointed out in the appended claims.

In the drawings,

Fig. 3 is a plan view illustrating parts of the work supporting and lasting mechanisms;

Fig. 4 is a left side elevation of the lower part of the machine;

Fig. 6 is a side view illustrating particularly the heel-embracing pad and its operating mechanism including the pad-advancing cam and related parts, the latter being illustrated in section on the line VI—VI of Fig. 5;

Fig. 7 is a sectional view taken substantially on the line VII—VII of Fig. 6;

Fig. 8 is a sectional view taken substantially on the line VIII—VIII of Fig. 5;

Fig. 9 is a detail right side elevation of mechanism associated with the lining grippers;

Fig. 10 is a sectional view taken substantially on the line X—X of Fig. 5;

Fig. 11 is a front elevation illustrating the left counter wing support and side wiper and parts related thereto;

Fig. 12 is a sectional view taken substantially on the line XII—XII of Fig. 11;

Fig. 13 is a sectional view taken substantially on the line XIII—XIII of Fig. 11;

Fig. 16 is a perspective view illustrating a last and upper supported in the machine and held by the toe gripper and the lining grippers;

Fig. 17 is a plan view partly in section illustrating the toe gripper mechanism shown in Fig. 16;

Fig. 18 is a perspective view illustrating one pair of lining grippers and the plate on which they are mounted;

Fig. 19 is a plan view illustrating particularly the heel pad mechanism and certain parts of the toe gripper mechanism;

Fig. 20 is a sectional view taken substantially on the line XX—XX of Fig. 5;

Fig. 21 is a sectional view taken substantially on the line XXI—XXI of Fig. 20;

Fig. 22 is a sectional view taken substantially on the line XXII—XII of Fig. 5;

Fig. 23 is a sectional side elevation of the lining gripper mechanism and associated parts, taken substantially on the center line extending from front to back of the machine;

Fig. 24 is a front elevation illustrating the mechanism shown in Fig. 23;

Fig. 25 is a left side elevation illustrating parts of the last-depressing mechanism;

Fig. 26 is a detail view showing certain of the parts illustrated in Fig. 25 as they are positioned at a later stage in the machine cycle;

Fig. 27 is a plan view of parts of the last-depressing mechanism, the position of said parts as illustrated in Fig. 25 being indicated in broken lines in Fig. 27;

Fig. 28 is a sectional view taken substantially on the line XXVIII—XXVIII of Fig. 25;

Fig. 29 is a sectional view taken substantially on the line XXIX—XXIX of Fig. 28;

Fig. 30 is a sectional view taken substantially on the line XXX—XXX of Fig. 5;

Fig. 31 is a sectional view taken substantially on the line XXXI—XXXI of Fig. 5;

Fig. 32 is a detail view of parts illustrated in Fig. 31;

Fig. 33 is a perspective view illustrating the mechanism for carrying the left portion of the heel-embracing pad and illustrating also the heel end wiper and counter support;

Fig. 34 is a perspective view illustrating the left half of the heel-embracing pad;

Fig. 35 is a perspective view of one of the parts illustrated in Fig. 33;

Fig. 36 is a perspective view illustrating part of the mechanism whereby tacks are delivered to the heel end wiper;

Fig. 37 is a sectional view taken substantially on the line XXXVII—XXXVII of Fig. 5;

Fig. 38 is a sectional view taken substantially on the line XXXVIII—XXXVIII of Fig. 5;

Fig. 39 is a front elevation illustrating the side wipers at the limit of their wiping movement and illustrating also certain parts of the tack-driving mechanism at the limit of their tack-driving movement;

Fig. 40 is a detail perspective view of part of the tack-driving mechanism;

Fig. 41 is a detail perspective view of another part of the tack-driving mechanism;

Fig. 42 is a detail front elevation illustrating a counter mounted on the counter wing supports, an upper gripped between the wing supports and the side wipers, and a lining tensioned by the lining grippers;

Fig. 43 is a detail sectional view illustrating part of the tack-inverting mechanism;

Fig. 44 is a detail sectional view looking at the left end of the tack inverter.

Figure 1:
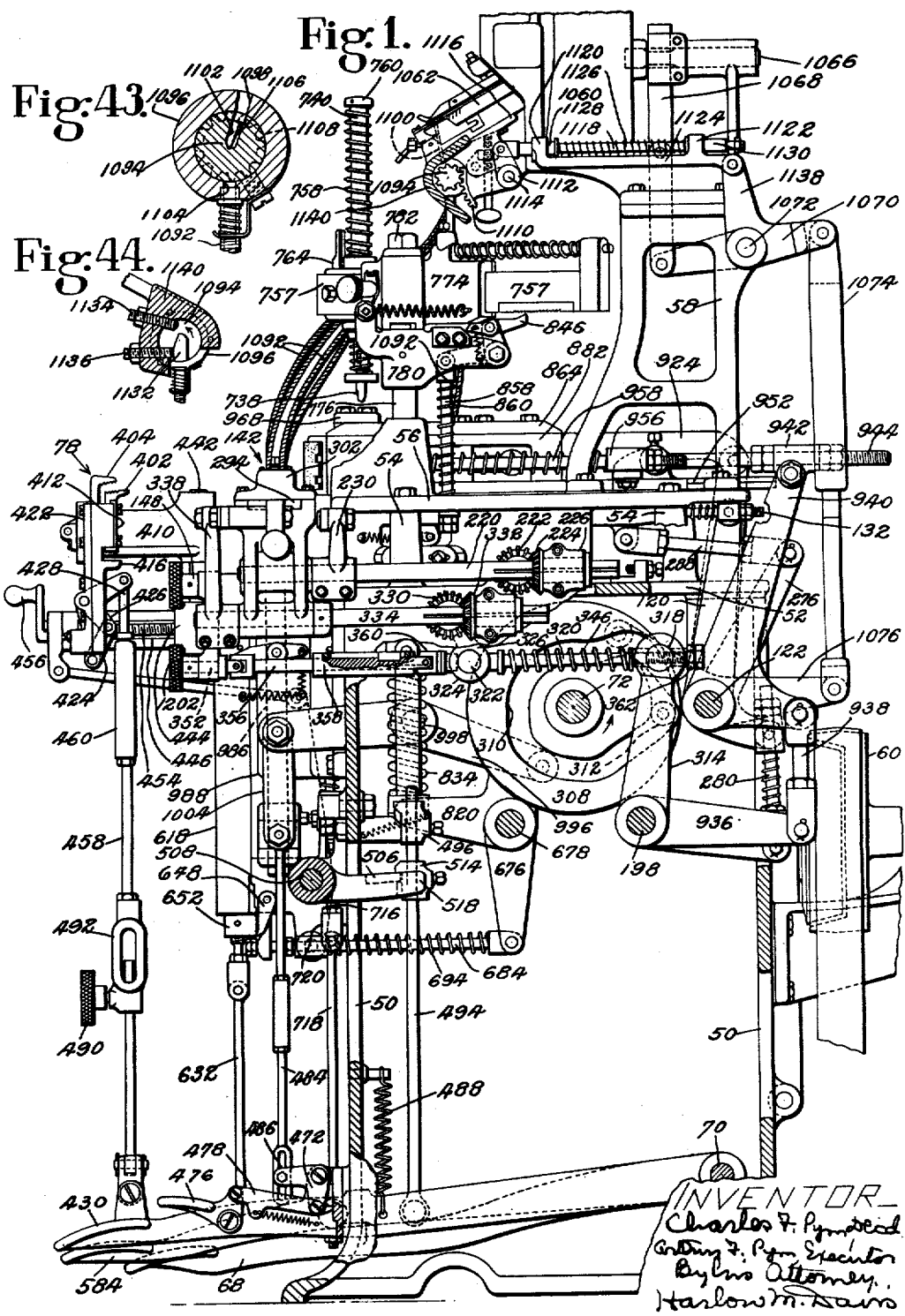
Fig. 1 is a right side elevation of a machine embodying the features of the present invention.

The general organization of the illustrated machine includes means for supporting a loose molded counter in upright position comprising an arm provided with means for engaging the flange of the counter at the back of the counter and a pair of arms provided with means for engaging the flanges of the counter wings, respectively. In their respective operative positions the counter-supporting arms are horizontal and their upper surfaces provide gages for locating a lined upper heightwise of the supported counter. The heel portion of the upper is held in the heightwise position in which it is located by the counter-supporting arms by grippers which engage the heel portion of the lasting margin at the beginning of the machine cycle and remain in engagement with the upper until a last has been inserted into the supported upper and a heel-embracing pad closes on the supported upper and by its frictional engagement therewith holds the upper against heightwise movement. The grippers above referred to comprise an end gripper and two pairs of grippers which engage, respectively, the opposite sides of the heel portion of the lasting margin, said grippers being hereinafter referred to as the side grippers. The toe portion of the upper is held by a toe gripper which is manually operated before the last is inserted into the upper to close the gripper jaws on the work and to impart a preliminary lengthwise tension to the upper, and is power-operated after the insertion of the last to stretch the upper lengthwise thereof. The end gripper and the side grippers are closed during the first part of the power cycle of the machine. After the grippers have closed, the machine stops in order to permit the insertion of the last into the supported upper through its bottom opening before the second and final part of the power cycle takes place. For holding the heel portion of the lining while a last is inserted into the supported upper two pairs of lining grippers are positioned between the side grippers above referred to for engagement with the lasting margin of the lining. The lining grippers are closed by depressing a treadle, which also operates after the grippers have been closed on the work to move the grippers downwardly thereby to impart a slight tension to the lining. After the last has been positioned within the upper a last pin carried by a slide which is movable lengthwise and widthwise of the upper is manually inserted into the pin hole in the heel portion of the last. During the beginning of the second part of the machine cycle the last-pin slide is moved downwardly, and such downward movement of the slide operates to connect the slide to a member which in the first instance holds the last against movement toward the toe end of the supported upper and later in the cycle presses the last into the heel end of the upper. After such downward movement of the last-pin slide the toe grippers are power-actuated to stretch the upper lengthwise thereof and at the same time the heel-embracing pad is moved bodily into engagement with the heel portion of the upper to apply local pressure to the upper in the region of the back seam. As the pad is pressed against the heel end of the upper the side portions of the pad tend to move widthwise of the shoe into engagement with opposite sides of its heel portion. The illustrated machine is provided with mechanism for controlling this tendency and preventing the exertion of any appreciable pressure by the pad against the sides of the heel portion of the upper during the bodily movement of the pad. After the pad has been pressed against the end of the upper said mechanism operates to move the side portions of the pad toward each other to apply pressure to the opposite sides of the heel portion of the upper. During the advancement of the side portions of the pad against the upper the last-pin slide is again moved downwardly and yieldingly urged rearwardly against the heel end portion of the lining in order to wipe the lining downwardly toward the flange of the counter. After the side portions of the pad have come to the limit of their movement toward each other further downward pressure is applied to the heel portion of the last in order to hold the last against upward movement while the margins of the upper parts are tacked to an insole on the last bottom.

The outer gripper jaws of the side grippers and the outer gripper jaw of the end gripper are formed in the end faces of lasting wipers which operate, after the jaws have opened, to wipe the lasting margin of the heel portion of the upper against the flange of the counter and to hold it for the reception of lasting tacks which are driven by tack-driving mechanism including drivers carried by the wipers. The lasting wipers at the sides of the heel seat perform part of their wiping operation befoe the last is moved downwardly to wipe the lining toward the flange of the counter and during such downward movement of the last the side wipers support the counter and prevent downward displacement thereof. The upper is held from downward movement during the downwiping of the lining by the frictional engagement of the heel-embracing pad therewith.

In the illustrated machine the tacks which secure the margin of the upper materials to the heel portion of the insole are driven by the upward movement of a tack-driving head which operates against the lower ends of the tack drivers carried by the wipers. The tack-driving head automatically adjusts itself to the plane of the lasted margin of the supported upper, thus insuring that all of the tacks will be completely driven.

Referring now to Fig. 1, the illustrated machine comprises a frame 50 which is generally rectangular in plan view and is provided at its upper extremity with a top plate 52. Projecting upwardly from the top plate are supports or posts 54 which support at their upper ends two platforms 56 the inner edge faces of which, as illustrated in Fig. 3, are parallel to each other and equally distant from a center line A extending from front to back of the machine. The inner edge faces of the platforms provide a guideway for certain operating parts of the machine as hereinafter described. The platforms 56 are provided with rearward extensions on which there is mounted a frame 58 (Fig. 1) which extends upwardly therefrom and supports at its upper end tack-supplying mechanism hereinafter described.

The power operations of the machine are produced by a power-driven pulley 60 (Fig. 2) which is freely mounted on a driving shaft 62 extending forwardly from the back of the machine and journaled in bearings offset from the left side of the frame. The power-driven pulley 60 is operatively connected to the driving shaft 62 by a clutch mechanism which is operated by the depression of a treadle 68 secured to a treadle shaft 70 extending transversely of the lower portion of the frame 50 near the back of the frame. The driving shaft 62 operates a cam shaft 72 extending transversely of the upper portion of the frame 50, the driving shaft 62 being provided with a worm 74 which meshes with a worm gear 76 secured to the left end of the cam shaft 72. During the first part of the cycle the cam shaft rotates 50° to close the gripper mechanism which engages the heel portion of the lasting margin of an upper supported in the machine. During the second and final part of the cycle the cam shaft 72 rotates 310°, thus completing one rotation thereof. Before the operator depresses the treadle 68 to start the first cycle of the power operation of the machine, a gripper 78 (Fig. 1) is manually closed on the toe portion of the upper and is moved in a direction to pull the upper lengthwise thereof in order to draw the heel part of the upper closely about a molded counter supported in the machine. This initial pull on the upper is not intended to stretch the stock but merely to position the upper for the succeeding power operations and to hold the upper during the introduction of the last thereinto.

For supporting a loose molded counter in upright position, the illustrated machine is provided with wing supports 80 and 82 (Fig. 3) and a rear support or central support 84, all of which are constructed and arranged to support the counter by engagement with its flange. Referring now to Figs. 6 and 33, the rear support 84 comprises a member or block 86 secured between the forward ends of a pair of parallel arms 87 and 88 which in their operative position, as illustrated in Fig. 33, are horizontal. The block 86 is located centrally of the width of the frame 50 and centrally, widthwise of the machine, of the parts which operate on the heel portion of a shoe in the machine. For the reception of the flange of a counter the upper portion of the block 86 is provided with a recess or groove 90 extending forwardly from the rear wall of said block, the plane of said groove being substantially parallel to the arms 87 and 88. For supporting the heel end of an upper and positioning the upper heightwise thereof relatively to a counter supported in the block 86 the arms 87 and 88 are provided at their forward ends with ears 92 which are secured to the upper surfaces of said arms and extend outwardly therefrom. The ears 92 support an upper in the machine by its bottom edge, the back seam of the upper being positioned in the center of the space between the arms 87 and 88. The ears provide upper-supporting surfaces the extent of which is sufficient to enable the operator to gage the position of the upper thereby without taking special pains to obviate bending or crumpling of the lasting margin of the upper thereon such as might occur if the upper were supported by its edge face on a narrow surface. The arms 87 and 88 are carried by parallel arms 94 which are slidably mounted for movement from front to back of the machine and are located at opposite sides of the center line A (Fig. 3). As illustrated in Fig. 7, the arms 94 are slidably mounted on shoulders provided in the upper portions of parallel vertical walls 102 and 103 extending upwardly from the top plate 52 of the frame. Said walls serve also to support the adjacent margins of the platforms 56. For providing a pivotal connection between the arms 87 and 88 and their supporting arms 94 the rear end portions of the arms 87 and 88 are cut away at their inner surfaces, as illustrated in Fig. 33, for the reception of ears 96 projecting forwardly from the arms 94, said ears being pivoted to the reduced end portions of the arms 87 and 88. The inner side walls and the top faces of the arms 87 and 88 and 94 are in alinement with each other and provide a support on which the heel wiper member 98 is slidably mounted. The arms 87 and 88 are yieldingly held in their operative position, as illustrated in Fig. 33, by a spring 100 one end of which engages a pin 101 projecting outwardly from the wall 102 and the opposite end of which engages a pin 104 projecting outwardly from an extension 106 of the arm 88, which extension is directed downwardly and rearwardly. The operative position of the central counter support 84 heightwise of the counter is determined by the engagement of the upper portion of the end face of the arm 87 with a shoulder provided in that arm 94 to which the arm 87 is pivoted. When the machine is at rest the central counter support is at the limit of its rearward movement and remains in that position until the heel-embracing pad hereinafter described engages the upper and holds it from movement heightwise thereof. After the heel-embracing pad has engaged the upper the counter support moves forwardly to disengage the block 86 from the flange of a counter supported thereon and after the block 86 has moved far enough to effect the removal of the flange of the counter from the groove 90 in the block 86 the arms 87 and 88 are swung downwardly to provide clearance for the advancement of the wiper member 98. In the illustrated machine the downward movement of the block 86 is effected by the engagement of the extension 106 of the arm 88 with a roll 108 pivotally mounted on a boss 110 projecting laterally from a plate 112 and positioned in the path of movement of the extension 106. The plate 112 is mounted on the outer surface of the vertical wall 102 and, as illustrated in Fig. 33, is provided with a tongue and groove connection to an offset portion 114 on said wall in order to facilitate horizontal adjustment of the plate. For clamping the plate 112 to the wall 102, headed screws 116 extend through slots 118 in the said plate and into tapped holes in said wall. It will be seen that the arms 87 and 88 are swung downwardly by the engagement of the extension 106 of the arm 88 with the roll 108 during the forward movement of the counter-supporting assembly and that the timing of such downward movement of the arms 87 and 88 is determined by the adjustment of the plate 112. A change in the adjustment of said plate would be required only when changing, for example, from adults' shoes to children's shoes, in which case there would be a substantial difference in the width of the counter flange and it would be desirable to restrict the forward movement of the block 86 as much as possible in order to avoid interference between the rear support 84 and the wing supports 80 and 82. Referring now to Fig. 8, the arms 94 and the counter-supporting assembly carried thereby are positioned by and receive their movements from the cam shaft 72 through a cam lever 120 which is journaled on a fixed shaft 122 extending transversely of the machine and is provided at the end of its horizontal arm with a cam roll 124 which travels in a cam path or groove 128 provided in a disk 128 secured to the cam shaft 72. The upper end of the vertical arm of the cam lever 120 is pivoted to a block 130 (Fig. 6) which is slidably mounted on a rod 132 swiveled on a crosspin 134 mounted in the rear ends of the arms 84. The block 130 is positioned endwise of the rod 132 between a compression spring 136 which surrounds said rod and a stop nut 138 on the threaded end of said rod.

Figure 2:
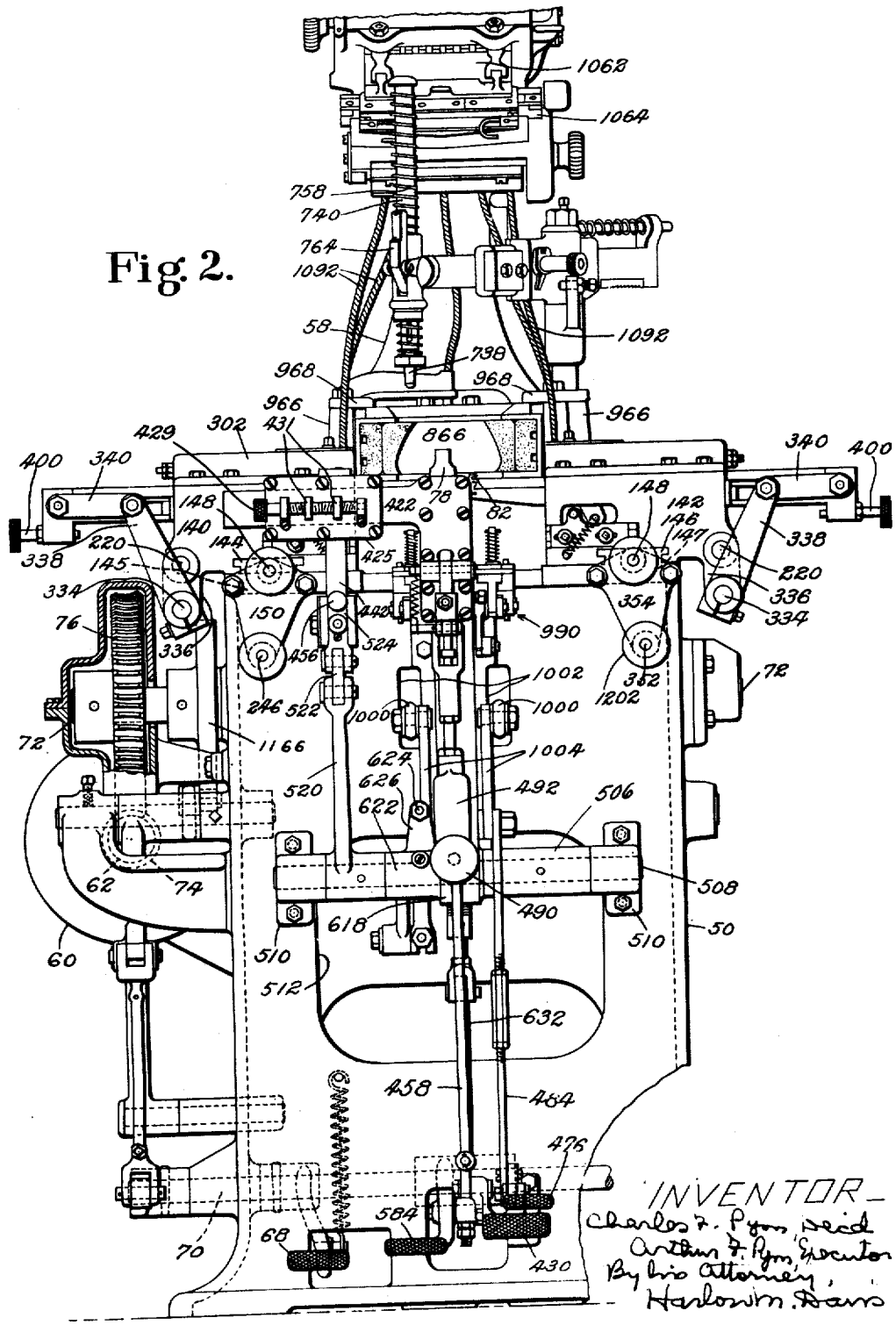
Fig. 2 is a front elevation of the machine.

Referring now to Fig. 2, the counter wing supports are carried by heads 140 and 142, respectively, each of which is provided with a T groove in the center of its bottom surface for sliding engagement with T-shaped tongues 144 and 146 formed in fixed blocks 145 and 147, respectively, mounted on the top plate 52 of the frame at opposite sides thereof, said tongues extending rearwardly of the machine from the forward edge of said top plate. The heads 140 and 142 are individually adjustable forwardly or rearwardly of the machine in order to position the operating parts carried thereby to operate on different sizes of shoes. Referring now to Figs. 11 and 12, the head 140 is adjustable by turning a thumb screw 148 which is journaled in a plate 150 secured to the front end face of the block 145. The screw 148 extends lengthwise of a groove 152 (Fig. 12) provided in the block 145 for threaded engagement within a tapped hole in a lug 154 projecting downwardly into the groove 152 from the base of the head 140. A collar 156 on the thumb screw 148 cooperates with the head of said screw to hold the screw from endwise movement.

Referring now to Fig. 11 illustrating the counter wing support 80 which is located to the left of the center line of the machine, said support comprises a block 158 the construction of which is the same as the construction of the block 86 of the rear counter support 84 and therefore need not be described in detail. The block 158 is secured between the free ends of parallel arm 160 and 162 (Fig. 3), said arms in turn being pivotally connected at their outer ends to the ends of parallel sliding arms 164 and 166. The adjacent end portions of the counter-supporting arms 160 and 162 and the sliding arms 164 and 166 are cut away to permit the opposite side faces of the pivotally connected arms to be positioned in common planes. The free end portions of the arms 160 and 162 are cut away as indicated at 168 (Fig. 3) in order to permit the wing support 80 to be positioned close enough to the rear counter support 84 to provide a suitable support for counters adapted for use in small children's shoes. The sliding arms 164 and 166 are mounted in a guideway in the top of the head 140 arranged to extend transversely of the machine. For holding the counter-supporting arm 160 and 162 in operative position, as illustrated in Fig. 11, a spring 172 has one end connected to a downward extension 174 of the arm 160 and has its opposite end connected to a pin 176 projecting forwardly from the base of the head 140. The operative position of the counter support 80 heightwise of a shoe in the machine is determined by the engagement of the arms 164 and 166 with the overlying side wiper plate 292 (Fig. 12) which, in turn, is held from upward movement by a top plate 302 on the sliding head 140. The motions of the counter wing supports 80 and 82 to disengage them from the flange of the counter and to move them downwardly out of the path of movement of the side wiper members is similar to the corresponding movement of the central counter support 84. As illustrated in Figs. 11 and 12, the downward movement of the counter wing support 80 is effected by the engagement of the downward extension 174 of the counter-supporting arm 160 with a roll 178 on a sliding plate 180 corresponding to the sliding plate 112 provided for the central counter support. The plate 180 has a tongue and groove connection with an offset portion 182 on the front of the head 140 whereby said plate is adjustable horizontally to change the position of the roll 178. For clamping the plate to the front of the head 140 clamping screws 184 are arranged to extend through slots 186 into the plate and into tapped holes in front of the head 140. To provide clearance for the movement of the extension 174 of the arm 160 and also for the adjustive movement of the sliding plate 180 an opening 188 (Fig. 11) is provided in the front wall of the head 140.

The construction and arrangement of the counter-wing-supporting assembly at the right side of the machine corresponds to the construction and arrangement of the counter-wing-supporting assembly at the left side of the machine and consequently will be understood from the foregoing description.

Figure 5:
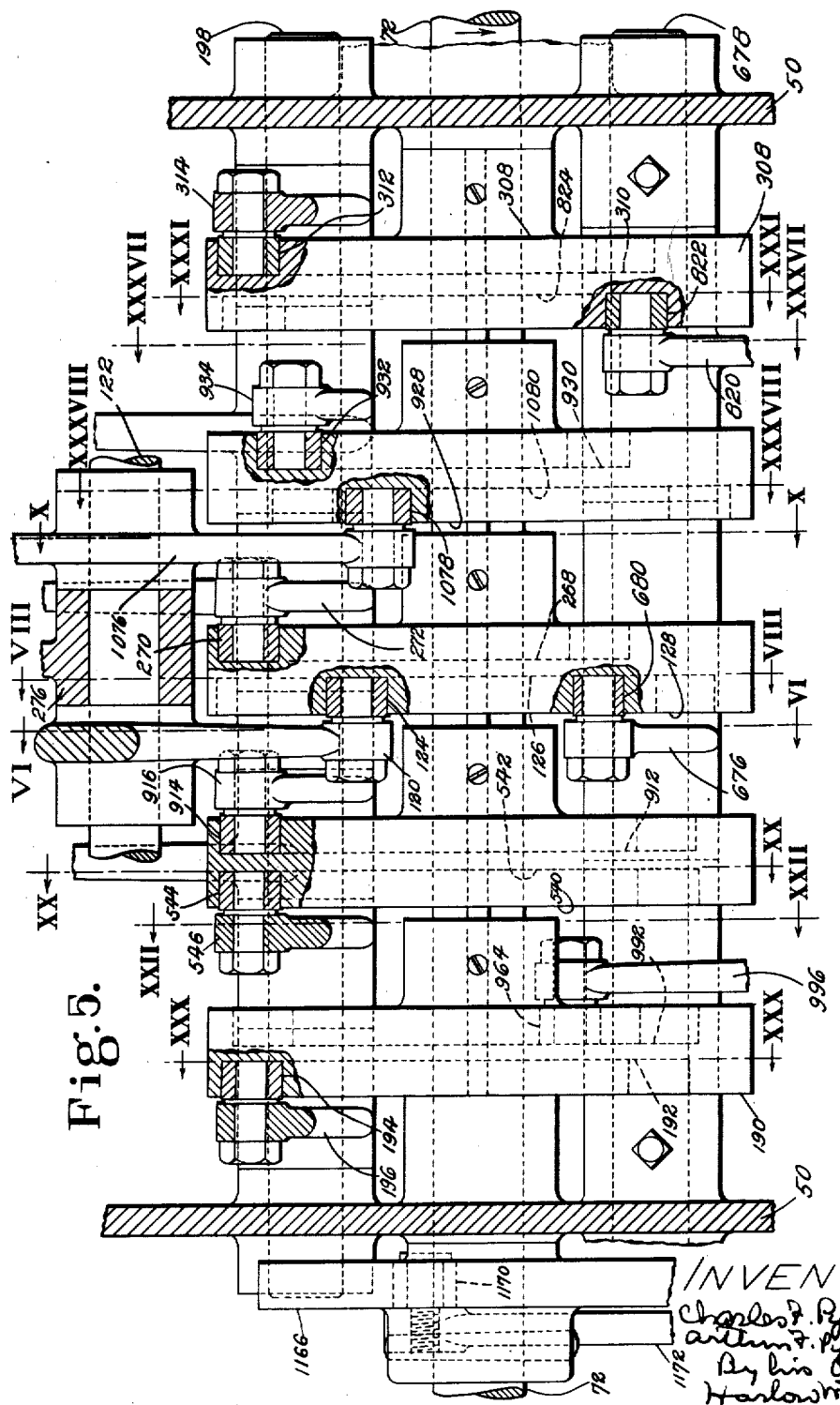
Fig. 5 is a sectional plan view illustrating the cams and certain parts operated thereby.

For simultaneously retracting the wing supports 80 and 82 there is secured to the cam shaft 72 a disk 190 (Figs. 5 and 30) which is provided with a cam path or groove 192 within which travels a roll 194 which is pivotally mounted on a cam lever 196 which is journaled on a fixed shaft 198 extending transversely of the rear part of the machine. At its upper end the lever 196 is provided with a pair of upwardly extending parallel ears 200 (Fig. 3) within which there is pivoted a double-headed cylindrical pivot block 202 which is provided with a diametrical tapped hole within which there is mounted the threaded end of a rod 204. The forward end of the rod 204 extends through a diametrical bore in a double-headed cylindrical pivot block 206 carried by parallel ears at the lower extremity of a swinging arm 208 which is secured to a shaft 210 extending transversely of the machine above the top plate 52, the opposite ends of said shaft being journaled in mountings 212 projecting upwardly from opposite sides of the top plate. For transmitting the swinging movement of the lever 196 to the arm 208 a spring 214 is provided on the rod 204 between the cylindrical blocks 202 and 206. The rear end of said spring engages a headed collar 216 slidably mounted on the rod 204 and positioned between the upwardly projecting ears 200 of the lever 196, the small end of said collar engaging a flat face on the cylindrical block 202. The forward end of said spring engages a similar headed collar 218 slidably mounted on the rod 204 and positioned between the downwardly extending ears of the swinging arm 208, the small end of the collar 218 engaging a flat face on the cylindrical block 206. The turning movement imparted to the shaft 210 by the rotation of the cam disk 190 through the connections above described is transmitted to parallel shafts 220 at opposite sides of the top plate 52, beveled gears 222 being provided at opposite ends of the shaft 210 and arranged to mesh with beveled gears 224 on the rear portions of the parallel shafts 220, respectively. The beveled gears 224 are provided, respectively, with hubs 226 which are journaled in housings the inner portions of which are formed in the journal mountings 212 and the outer portions of which are semi-cylindrical shells 228 which, as illustrated in Fig. 1, are secured by screws to the mountings 212. The rear ends of the hubs 226 are flanged outwardly to prevent endwise movement of the hubs in their housings. The forward ends of the parallel shafts 220 are journaled in the heads 140 and 142, respectively, and travel with the heads during their adjustive movement, the rear portions of the parallel shafts being splined to the beveled gears 224. For transmitting the rotary movements of the parallel shafts 220 to the counter wing supports 80 and 82 said shafts have secured thereto adjacent to the rear walls of the heads 140 and 142, respectively, upwardly extending arms one of which is illustrated at 230. The arm 230 has pivoted to its upper end one end of a link 232 (Fig. 3) the opposite end of which is pivoted to a round extension 234 (Fig. 13) of the head 236 of a screw 238 mounted in the sliding arms of the counter-wing-supporting assembly illustrated in Fig. 11. Collars 240 (Fig. 3) secured to the forward ends of the parallel shafts 220, respectively, hold the shafts from endwise movement relatively to the heads 140 and 142. Referring now to Fig. 13 illustrating the connection between the sliding arms 164 and 166 in the head 140 and the link 232, the screw 238 on which the link is mounted extends through a slot 242 in the rear wall of the head 140 and through a hole in the sliding arm 166, the threaded end of said screw being mounted in a tapped hole in the sliding arm 164. For accurately determining the distance between the sliding arms 164 and 166 a spacing sleeve 244 is mounted on the screw 238 between said sliding arms.

In changing the adjustment of the counter supports for operating on different sizes of shoes it is desirable to change the distance between the counter wing supports 82 and 84 to correspond to the width of counters to be mounted thereon. In the illustrated machine this adjustment is effected by turning a short shaft 246 (Figs. 3, 11 and 30) journaled in a downward extension 248 of the plate 150. The rear end of the shaft 246 has a universal connection to the forward end of a rod 250 (Fig. 30) which is mounted in the forward portion of a sleeve 252 and splined thereto. The rear end of said sleeve has a universal connection to a headed collar 254 secured to the forward end of the rod 204. The small end of the collar 254 engages a flat face in the cylindrical block 206 carried by the swinging arm 208. It will be seen that turning movement of the short shaft 246 imparts like movement to the rod 204 thereby moving said rod endwise thereof by reason of its threaded engagement with the cylindrical block 202 carried by the lever 196. Such endwise movement of the rod 204 is, of course, imparted to the swinging arm 208 and through the operating connections above described (Fig. 3) to the counter-wing-supporting assemblies. In order to prevent the rod 204 from being entirely withdrawn from the cylindrical block 202 the end portion of said rod is provided with a stop nut 256.

Referring now to Fig. 6, the illustrated end wiper 98 is provided with a plane beveled end face 258 and the counter-supporting block 86 is provided with an end face 260 parallel to the end face 258 of the wiper. Said end faces cooperate to grip the lasting margin of the back-seam portion of the upper in order to hold the upper against heightwise misplacement during the interval between the positioning of the heel portion of the upper on the upper-supporting members and the engagement of the upper by the heel-embracing pad hereinafter described. For providing sufficient gripping action of the block 86 on the lasting margin of the upper its beveled end face 260 is provided with horizontal corrugations. As illustrated in Figs. 6 and 7, the heel wiper member 98 is positioned between the sliding members 94 of the rear counter-supporting assembly and is supported thereon by flanges 262 projecting outwardly from the opposite sides of the wiper member and extending forwardly from the rear end of said member and terminating a short distance from the beveled end face of the wiper. The edge faces of the flanges 262 bear against shoulders in the platforms 56 which guide the movements of the wiper member. For providing a support for certain operating parts of the machine the platforms 56 are provided with flanges 264 which extend inwardly over the flanges 262 of the wiping member, said flanges extending from front to back of the central portion thereof. For operating the wiper member 98 the right side face of the disk 128 (Fig. 10) on the cam shaft 72 is provided with a cam groove 268 within which travels a roll 270 which is carried at the upper end of the vertical arm of a bell crank lever 272 journaled on a fixed shaft 198 extending widthwise of the machine. The vertical motion of the end of the horizontal arm of the bell crank lever 272 is imparted to a bell crank lever 276 journaled on the fixed shaft 122 through a spring 278 surrounding a pin 280 extending upwardly from a block 282 pivoted to the end of the horizontal arm of the bell crank lever 272. The pin 280 is slidably mounted in a vertical hole in a pivot block 284 carried by the horizontal arm of the bell crank lever 276, said pivot block being located endwise of the pin 280 between the upper end of the spring 278 and an adjustable stop nut 286 on the upper end of the pin. The bell crank lever 276 has pivoted to its upper end one end of a link 288 the opposite end of which is pivoted to a lug 290 projecting downwardly from the rear portion of the wiper member 98. It will be seen that by adjusting the stop nut 286 on the pin 280 the initial position of the wiper member 98 may be adjusted in order to bring the tack-receiving opening in the wiper into alinement with a tack-delivering member hereinafter described. The advancement of the end wiper 98 is limited by an adjustable stop screw 291 (Fig. 6) in a bracket 293 on the top plate 52, which stop screw arrests the forward movement of the upwardly extending arm of the bell crank lever 276 and thus positions the wiper 98 for the tack-driving operation.

For wiping the lasting margin at opposite sides of the heel portion of an upper in the machine against the flange of a counter in the machine, side wiper members 292 and 294 (Fig. 3) are slidably mounted in the heads 140 and 142, respectively, for equal and opposite movement widthwise of the forward portion of the machine toward and from the center line A. Referring now to Fig. 11, the illustrated side wiper 292 is provided with a corrugated beveled end face 296 and the counter wing support 80 is provided with a corresponding corrugated beveled face 298 which cooperates with the beveled face in the wiper to grip the lasting margin of the upper thereby to cooperate with the central counter support and the wiper 98 and with the opposite counter wing support and the side wiper 294 to hold the heel portion of an upper in the machine against misplacement heightwise thereof during the interval between the positioning of the upper in the machine and the engagement of the upper by the heel-embracing pad hereinafter described. As illustrated in Fig. 3, the wiping ends of the wiper members 292 and 294 are narrower than the major portions of said members in order to permit the operation of said members in the limited space afforded by small shoes for the operation of heel wipers thereon. As illustrated in Fig. 13, the side wiper member 292 is slidably mounted on shoulders 300 in the head 140, the shoulders being positioned in a plane common to the upper edge faces of the sliding members 164 and 166 of the counter-wing-supporting assembly. The movements of the wiper member 292 are guided by the engagement of the opposite side faces of the wiper member with guiding faces provided in the head 140. The top faces of the head 140 lie in a plane common to the upper surface of the wiper member 292, and the top plate 302 secured to the head 140 holds the wiper member 292 against vertical displacement. As illustrated in Fig. 13, the wiper member 292 is T-shaped in cross section and the downwardly extending portion 304 of said wiper is positioned between the inner walls of the sliding members 164 and 166 of the counter-wing-supporting assembly. The downwardly extending portion 304 of the wiper member 292 is provided with a slot 306 (Fig. 11) through which passes the screw 238 and the spacing sleeve 244. Said slot permits movement of the wiper relatively to the screw between the sliding members 164 and 166 (Fig. 13). For operating the side wiper members 292 and 294 there is secured to the cam shaft 72 adjacent to the right wall of the frame 50 a disk 308 (Fig. 1) the right side face of which is provided with a cam groove 310 within which travels a roll 312 pivotally mounted on an arm 314 journaled on the fixed shaft 198. The upper end of the arm 314 is provided with parallel ears 316 (Fig. 3) which carry a double-headed cylindrical pivot block 318 which is provided with a diametrical tapped hole for the reception of the threaded rear end portion of a rod 320 the forward end of which extends through a diametrical hole in a double-headed cylindrical pivot block 322 carried by parallel ears 324 projecting downwardly from a swinging arm 326 (Fig. 1) secured to a cross shaft 328 near its right end, said cross shaft being journaled in bearings in the opposite side walls of the frame 50. The forward movement of the lever 314 is transmitted to the arm 326 through a spring 346 surrounding the rod 320 and confined between headed collars 348 and 350 loosely mounted on the rod 320. The collar 348 is positioned between the ears 316 of the lever 314 and bears against the pivot block 318. The collar 350 is positioned between the ears 324 of the arm 326 and bears against the pivot block 322 carried by said arm. For simultaneously operating the side wiper members 292 and 294 the cross shaft 328 has secured to its opposite ends bevel gears 330 which mesh with bevel gears 332 which operate parallel shafts 334 which are located directly below the parallel shafts 220 which retract the counter wing supports 80 and 82. The shafts 344 extend through bearings in downward extensions 336 (Fig. 11) of the heads 140 and 142, respectively, and have secured to their forward ends and positioned adjacent to the front walls of said heads upstanding arms 338 the upper ends of which are connected by links 340 to lugs 342 at the rear ends of the wiper members, respectively. In order to accommodate the adjustive movements of the heads 140 and 142, the bevel gears 332 are splined to their shafts 334 and are journaled in housings 344 secured to the side walls of the frame 50, the bevel gears 332 being provided with hubs which are journaled in the housings. The construction and arrangement of the bevel gears 332 and their housings correspond generally to the construction and arrangement of the bevel gears 224 and their housings 228.

The operating movements of the end wiper 98 and the side wipers 292 and 294 are divided into two parts, the first of which occurs during the first part of the power cycle and the second during the final part of the power cycle. During the first part of their wiping movements the wipers are advanced into the position illustrated in Fig. 42, in which position the wipers cooperate with the counter supports to grip the lasting margin of the upper. The final part of the wiping movement of the wipers occurs after the heel-embracing pad has gripped the upper against the last and after the counter supports have been withdrawn to provide clearance for such wiping movements. It will be seen that for each adjustment of the counter wing supports 80 and 82 to accommodate different sizes of counters there must be a corresponding adjustment of the position in which the side wipers 292 and 294 come to rest at the end of the first part of the power cycle in order to insure a gripping action of the side wipers against the lasting margin of the upper. For effecting such adjustment of both of the wipers 292 and 294 in one adjusting operation the illustrated machine is provided, as illustrated in Figs. 1 and 2, with manually operated mechanism for turning the rod 320 carried by the cam lever 314. As the rod 320 is turned it moves endwise thereof because of the threaded connection of said rod with the pivot block on the lever 314 and thus effects adjustive movement of the connections from said rod to the side wipers 292 and 294. As herein illustrated, the mechanism for adjusting the rod 320 comprises a short shaft 352 journaled in a downward extension of a plate 354 (Fig. 2) secured to the front end face of the block 147 on the top plate 52. The rear end of the short shaft 352 has a universal connection to the forward end of a rod 356 which is splined to a sleeve 358 mounted on said rod and having a universal connection at its rear end to a collar 360 secured to the forward end of the rod 320, the rear end of which collar engages the pivot block 322 carried by the arm 326. In order to prevent removal of the rod 320 from the pivot block 318 by turning movement of the short shaft 352 said rod is provided at its rear end with a stop nut 362.

It will be seen that the adjustment of the side wipers 292 and 294 by the manipulation of the shaft 352 not only adjusts the gripping position of the edge faces of the wipers relatively to the counter supports but it also varies the retracted position of the wipers and therefore the tack tubes which deliver tacks to the side wipers must be adjusted to the retracted position of the wipers in order that said tubes may be in alinement with the tack pockets in the wipers when the wipers are in their respective retracted positions. In the illustrated machine the arrangement of the tack tubes relatively to the wipers is such that the tack pockets in the wipers come into alinement with the tack tubes before the wipers come to the limit of their retracting movement and during the remaining part of the retracting movement the tack tubes and their supporting members travel with the wipers and are held in their respective positions of alinement with the tack pockets in the wipers. Referring now to Figs. 11 and 12 illustrating the side wiper 292 and the mechanism for positioning the tack tubes relatively thereto the illustrated tack tubes 1092 are loosely mounted in the upper portions of vertical holes 370 in a carrier block 372 and supported on frusto-conical surfaces connecting the upper portions of the holes to lower portions of reduced diameter. The block 372 is provided with a slotted extension 374 (Fig. 11) through which extends a clamping screw 376 whereby the block 372 is adjustably secured to a slide 378, the outer end of which is provided with a downwardly extending rounded boss 380 which is positioned in a groove 382 provided in the upper surface of the side wiper 292. The groove 382 terminates near the longitudinal central portion of the wiper 292 in a shoulder 384 which engages the inner end face of the boss 380 during the retractive movement of the wiper 292. The slide 378 is mounted in a groove 386 in the central portion of the top plate 302 which groove communicates with an open-ended slot 390 at the right end of the top plate. The walls of the combined groove and slot in the top plate are parallel to the direction of motion of the side wiper 292 and provide a guideway for said slide. The top plate is secured to the top of the head 140 and its bottom face 388 provides a guiding surface for the top face of the side wiper 292, thus completing the enclosure through which the wiper operates and providing means for preventing downward displacement of the work-supporting end of the wiper when downward pressure is imparted to the last to resist the upward thrust of the tack drivers against the work. The opening provided in the top of the plate 302 by the open-ended slot 390 receives the carrier block 372. During the advancement of the side wiper 292 the slide 378 is advanced with it to a predetermined limit by a compression spring 392 surrounding a stem 394 one end of which is secured in the slide 378. Both the stem and the spring extend longitudinally thereof through the center of a recess or bore provided in the slide and the left end of the stem extends through a hole in an end wall 396 provided in the top plate. The advancement of the slide 378 by the spring 392 is terminated by the engagement of a stop nut 398 on the threaded end of the stem 394 with the outer face of the end wall 396. It will be seen that the spring 392 operates to hold the slide 378 in a position in which it will be engaged by the shoulder 384 in the wiper 292 during the retractive movement of the wiper and also operates during the advancement of the wiper to return the slide 378 to said position.

For determining the positions of the wipers 292 and 294 widthwise of a shoe in the machine when the tacks carried thereby are driven, the lugs 342 at the outer ends of the wipers are extended downwardly, as illustrated in Fig. 11, and provided with adjustable abutment screws 400 which engage the heads 140 and 142, respectively, to arrest the advancement of the wipers. Referring now to Fig. 1, it will be seen that further movement of the lever 314 after the wipers have been arrested by the abutment screws 400 is taken up by the spring 346.

Figure 14:
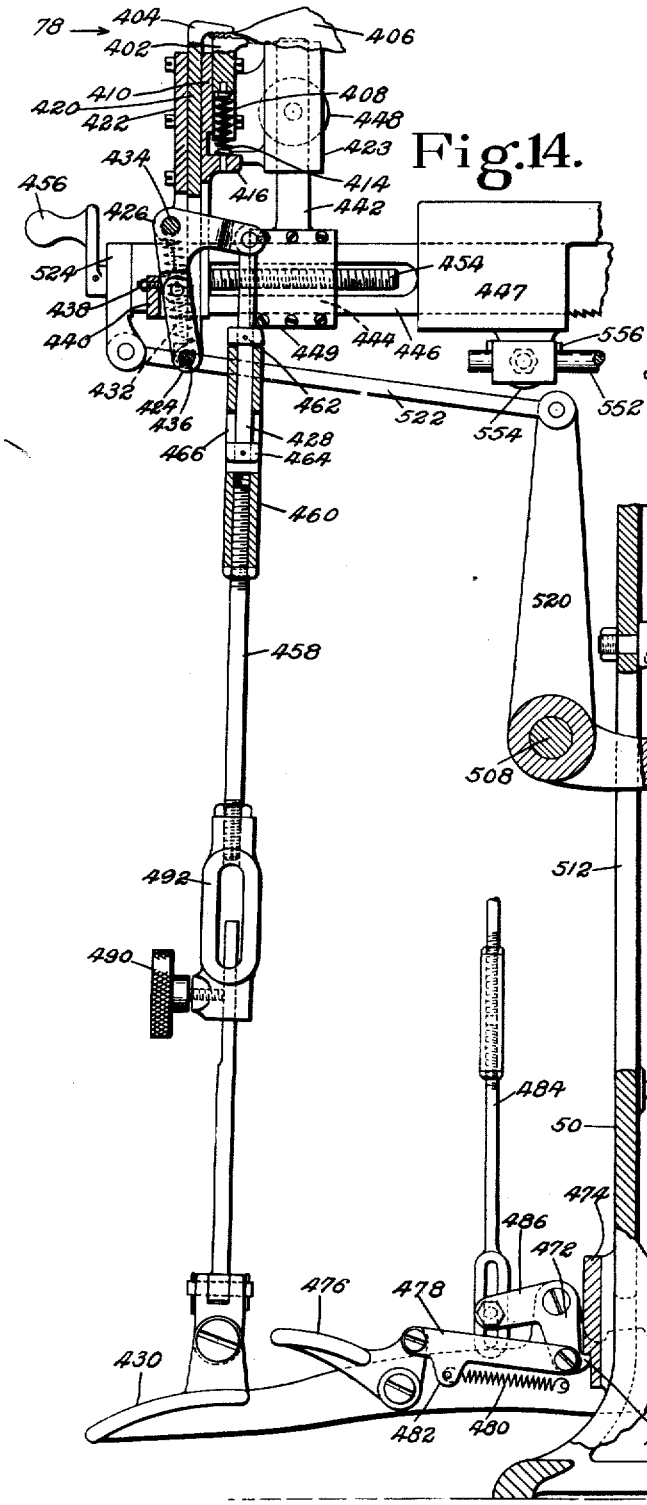
Fig. 14 is a right side elevation illustrating parts of the toe gripper mechanism.

The illustrated toe gripper 78 comprises a lower gripper jaw 402 (Fig. 14) and an upper gripper jaw 404 the gripping surfaces of which are horizontal and are arranged to engage and support the toe portion of an upper 406, the heel portion of which has been positioned relatively to a counter mounted on the counter supports. The shank portion 408 of the lower gripper jaw 402 is slidably mounted in a vertical groove in the rear surface of a frame member 410 and is retained within said groove by gibs 412 (Fig. 17) secured to the back of said frame member. The lower gripper jaw is positioned between a compression spring 414 contained within an open-ended slot in the lower portion of the shank 408 and supported by a rearward extension 416 of the frame member 410 and the upper end portions 418 of the gibs 412 which, as illustrated in Fig. 17, are bent over the top of the frame member 410 and provide stops for the engagement of shoulders at the top of the shank 408 of the lower gripper jaw. The upper gripper jaw 404 is provided with a downwardly extending shank 420 which is slidably mounted in a groove in the front face of the frame member 410 (Fig. 17) and is retained within said groove by a plate 422 secured to the front of the frame member. The plate 422 is extended laterally to the left, as seen in Figs. 2 and 19, and is slidably mounted in a transverse groove in a head 423 the rear portion of which is provided with a vertical hole whereby said head is slidably mounted on a vertical rod or post 442. The plate 422 provides a support for the toe gripper assembly and is slidable in the head 423 in order to adjust the position of the gripper widthwise of the machine, particularly when changing from a right to a left upper or vice versa. For gaging the position of the toe gripper for right and left shoes, there is provided on the head 423 a plate 425 which is provided with forwardly extending lugs 427 within which there is journaled a right and left threaded screw 429 on which there are threaded for equal and opposite movement blocks 431 the rear surfaces of which are arranged to slide against the plate 425. The block 431 provide gages for a stop pin 433 which extends forwardly from the plate 422 through a slot in the plate 425. The gage blocks 431 are adjusted for a given run of shoes by turning the screw 429 to move said blocks toward or from each other as the case may be. It will be understood that when the stop pin 433 is in the center of the space between the gage blocks 431 the toe gripper 78 is positioned on the center line A extending from front to back of the machine. It will also be understood that the adjustment of the toe gripper 78 for right and left shoes and the adjustment of the gage blocks 431 for different sizes and styles of shoes permits the toe gripper to engage the center of the toe end of an upper in the machine while the back seam of the upper is positioned in vertical alinement with said center line. The shank 420 of the upper gripper jaw 404 and the plate 422 extend downwardly beyond the extension 416 which supports the lower gripper jaw, the lower portions of said parts being divided into parallel vertical arms between which there is positioned a treadle-actuated toggle. The illustrated toggle comprises a lower link 424 pivoted between the lower ends of the arms and an upper link 426 which, as illustrated in Fig. 14, is the vertical arm of a bell crank lever the horizontal arm of which is pivoted at its free end to the upper end of a rod 428 which provides a part of the linkage to a gripper-closing treadle 430. The bell crank lever 426 is pivoted at its elbow between bosses on the plate 422 and a tension spring 432 connects crosspins 434 and 436 at the upper and lower ends, respectively, of the toggle and holds the toggle in its straightened position, as illustrated in Fig. 73

14, or in its bent position as illustrated in Fig. 1. In its straightened position the toggle links have moved sufficiently beyond their dead center position to enable the spring 432 to operate to hold the toggle in that position, which position, as illustrated in Fig. 14, is determined by the engagement of the lower end of the vertical arm of the bell crank lever 426 with an adjustable stop screw 438 in a plate 440 secured to the lower portions of the plate 422. The post 442 on which the head 423 is slidably mounted extends upwardly from a sliding block 444 carried by a horizontal gripper-supporting bar 446 slidably mounted in a downward extension 447 of the top plate 52. As illustrated in Fig. 21, the block 444 is provided with parallel horizontal grooves which extend inwardly from the right side wall of the block and receive, respectively, the upper and lower sections of the forward part of the bar 446. The block 444 is held in position on the bar 446 by a side plate 449 which is secured to the right side wall of the block 444. The member 410 is vertically adjustable on the post 442 in order to effect vertical adjustment of the toe gripper 78 relatively to the heel-supporting means thereby to arrange the toe gripper to operate on shoes of different types and styles without requiring any change in the angular disposition of the heel portion of a supported upper. The member 410 is secured in its adjusted position on the post 442 by a hand screw 448 threaded to the member 410 and arranged to bear against the post 442. For adjusting the gripper 78 lengthwise of a shoe in the machine that portion of the sliding block 444 between its parallel grooves is provided with a tapped hole 450 (Fig. 21) within which there is mounted a hand screw 454 arranged to extend lengthwise of the bar 446 and operable by a handle 456 (Fig. 20) to vary the position of the post 442 and the gripper mechanism carried thereby lengthwise of an upper in the machine. For connecting the toggle to the treadle 430 there is provided an extensible link 458 (Fig. 14) the upper end of which carries a head 460 which is slidably mounted on the rod 428 between upper and lower collars 462 and 464, respectively, the head 460 being provided with an opening 466 to permit a predetermined vertical movement of the collar 464 relatively to the head. The lost motion of the link 458 thus provided occurs at the beginning of the upward movement of the treadle 430 and during this initial upward movement of the treadle a tooth 470 in a latch dog 472 pivoted to an upward extension of the treadle engages a shoulder in a plate 474 secured to a forwardly offset portion of the front wall of the frame 50. The latch 472 holds the treadle from further upward movement with the gripper mechanism in a position illustrated in Fig. 14 wherein the gripper-actuating toggle is in its straightened position and the gripper jaws are closed on the work. If after closing the gripper jaws on the work the operator finds it desirable to change the position of the gripper relatively to the work the gripper may be released by depressing a latch-releasing treadle 476 which is pivotally mounted on the treadle 430 and provided with an upward extension which is connected by a link 478 to the lower extremity of the latch dog 472. The treadle 476 is yieldingly held in its elevated position by a spring 480 one end of which is connected to a lug 482 extending downwardly from the link 478 near its forward end while its opposite end is connected to the treadle 430. The spring 480 also operates to hold the latch dog 472 in its operative position, as illustrated in Fig. 14. During the latter part of the power cycle of the machine after the lasting margin of the upper has been secured to an insole on the bottom of a last positioned within the upper the latch dog 472 is disengaged from the plate 474 by the upward movement of an extensible link 484 by the upward movement of the tack-driving mechanism to which the upper end of said link is connected, as illustrated in Fig. 24. The lower end of said link has a pin and slot connection to a forward extension 486 of the latch dog 472. After the latch dog has been disengaged from the plate 474 a treadle spring 488 connected to the treadle 468 lifts said treadle, bringing the upper end of the head 460 on the link 458 against the upper collar 462 on the rod 428 and operating the bell crank lever 426 to break the gripper-actuating toggle and return the gripper jaws to their open position. For timing the breaking of the gripper-actuating toggle during the upward movement of the treadle 430 the head 460 of the link 458 is adjustable relatively to the collar 462 by varying the length of the link 458. As illustrated in Fig. 14, the length of the link 458 may be varied by releasing a clamping screw 490 at the lower end of a buckle 492 which connects the upper and lower sections of the link 458 and by sliding said buckle on the lower section of said link in order to effect the desired adjustment whereupon the screw 490 is again clamped against the lower section of the link 458 in order to maintain the adjustment. It will be seen that the length of the link 458 must be adjusted after adjusting the position of the toe gripper assembly on the post 442.

For yieldingly moving the toe gripper toward the operator after it has closed on the work thereby to draw the upper forwardly against the back of a counter supported in the machine and thus to hold the upper for the reception of a last there is provided in the illustrated machine mechanism operated by the continued downward movement of the treadle 430 after the toe gripper is closed on the work for effecting forward movement of the slide 446 which carries the post 442. The upper-tensioning movement of the toe gripper above referred to follows a rearward movement of the gripper by the treadle 430 from its position in Fig. 1 into position to engage the toe end of the upper and the upper-tensioning movement of the gripper 78 in the illustrated machine is a return movement of the toe gripper from its gripping position toward its rest position in Fig. 1. Referring now to Fig. 14, the toe-gripper-actuating mechanism comprises an upwardly extending link 494 pivoted at its lower end to the treadle 430 near the rear surface of the front wall of the frame 50 and is provided at its upper end with a cam block 496 which is yieldingly drawn forwardly toward a fixed block 498 projecting rearwardly from the front wall of the frame by a tension spring 500 one end of which is connected to the cam block 496 and the other end of which is connected to the fixed block 498. The forward portion of the cam block 496 is provided with an undercut cam face 502 which is arranged to engage a beveled end face 504 of the block 498 for a purpose hereinafter described. During the first stage of the depression of the treadle 430 downward movement is imparted to the link 494 and such movement of the link operates connections hereinafter described to move the slide 446 rearwardly to position the toe gripper 78 for engagement with the toe end of the upper 406. During the greater part of the rearward movement of the slide 446 the gripper 78 remains open and the head 460 of the link 458 moves downwardly to bring said head into engagement with the collar 464 on the rod 428. As the gripper nears the toe end of the upper the head 460 engages the collar 464 and the gripper begins to close. The lost motion of the head 460 of the link 458 is adjustable by varying the length of the link 458 as above described and preferably is of sufficient duration to permit the rearward movement of the toe gripper to be completed immediately after the toe gripper jaws close on the work. The connections from the link 494 for imparting rearward movement to the slide 446 include a horizontal arm 506 fixed to a cross shaft 508 which is journaled in bearings provided in brackets 510 (Fig. 2) projecting forwardly from the opposite sides of the front wall of the frame 50. The arm 506 extends rearwardly from the rock shaft 508 through an opening 512 provided in the front wall of the frame 50 for engagement by a member 514 fixed to the link 494 and provided with a shoulder 516 which, during the first stage of the depression of the treadle 430, engages the upper surface of the arm 506 and swings it downwardly. For positioning the member 514 widthwise thereof relatively to the arm 506 said arm is provided with rearward extensions 518 which engage opposite sides of the member 514 and prevent widthwise movement thereof. It will be seen that the member 514 is yieldingly held in position to engage the top of the arm 506 during the first stage of the downward movement of the treadle 430 by the spring 500 connecting the cam block 496 to the fixed block 498. Downward movement of the arm 506 during the first part of the depression of the treadle 430 rocks the shaft 508 and thereby imparts rearward movement to the upper end of a vertical arm 520 secured to said shaft and arranged to extend upwardly therefrom. The vertical arm 520 has pivoted to its upper end the rear end of a link 522 the forward end of which is pivoted between downwardly extending ears on an end plate 524 secured to the slide 446. During the latter part of the movement of the toe gripper 78 toward the upper through the connections above described the cam face 502 on the cam block 496 slides on the beveled face 504 of the fixed block 498 thereby swinging the link 494 rearwardly. The rearward movement of the link 494 disengages the member 514 from the top face of the arm 506 in order to permit return movement of the toe gripper by means hereinafter described. The disengagement of the member 514 from the arm 506 is timed to take effect after the toe gripper 78 has closed on the work.

For imparting return movement to the toe gripper 78 in order to tension the upper lengthwise thereof a rod 526 (Fig. 20) is secured to the rear end of the slide 446 and is arranged to extend rearwardly therefrom from front to back of the machine and through an opening in the rear wall of the frame 50. The rod 526 carries a compression spring 528 which is confined between the rear wall of the frame 50 and a collar 530 secured to the rod 526 near its forward end. During the rearward movement of the toe gripper 78 by the depression of the treadle 430 the spring 528 is compressed and after the member 514 disengages the top face of the arm 506 the spring 528 operates to move the toe gripper forwardly and thus to impart a light tension to the upper. In order that the forward movement of the toe gripper 78 may be arrested without a violent shock to the toe gripper assembly if the toe gripper should be operated without a shoe in the machine the rod 526 is provided with a rearward extension 532 of smaller diameter than the rod itself and a spring 534 is mounted on the extension 532 and confined between a collar 536 loosely mounted on the extension 532 and a stop nut 538 on the threaded end of said extension. In order to impart a heavy lengthwise pull to the upper thereby to stretch the upper somewhat before its lasting margin is tacked to the counter and insole, power-operated means is provided for imparting further forward movement to the toe gripper 78 after a last has been positioned in the upper. Such power-operated means includes a disk 540 fixed to the cam shaft 72 and provided with a cam path or groove 542 within which travels a roll 544 pivotally mounted on one side of a lever 546 which is journaled on the fixed shaft 198. Pivotally mounted in parallel ears 548 extending upwardly from the lever 546 is a pivot block 550 which is provided with a central diametrical hole through which extends the rear portion of a rod 552 the forward end of which is slidably mounted in a bearing block 553 pivoted between ears 554 extending downwardly from the extension 447 of the machine frame. The rod 552 is held against turning movement by a key 556 which is positioned in alined grooves in the block 553 and the rod, respectively. The rod 552 is positioned endwise thereof relatively to its pivot block 550 by a collar 558 secured to the end of the rod and arranged to engage a flat rear surface of the pivot block and a loose collar 560 arranged to engage a flat front face of the pivot block against which it is held by a spring 562 surrounding the rod 552 and confined between the collar 560 and a collar 564 fixed to said rod. Near its forward end the rod 552 carries a fixed collar 566 which is provided with upwardly extending ears 568 between which there is pivotally mounted a detent or rocker arm 570 having a tooth at its forward end which is constructed and arranged to be brought into engagement with a ratchet plate 572 mounted in a recess in the bottom of the slide 446 by a tension spring 574 one end of which is connected to the rear portion of the detent 570 while its opposite end is connected to the collar 566. When the machine is at rest the detent 570 is held out of engagement with the ratchet plate 572 by the engagement of a pin 576 projecting laterally from the rear end of the detent 570 with a block 578 adjustably secured to the lower end of a bracket 580 extending downwardly from the top plate 52 of the machine frame. The block 578 is provided with a beveled surface 582 which the pin 576 engages during the rearward or return movement of the rod 552 to rock the detent in a counter-clockwise direction, as seen in Fig. 20, in order to disengage it from the ratchet plate 572. The amount of stretch which is imparted to the upper by the toe gripper 78 through the power-operated mechanism above described may be varied by adjusting the block 578 forwardly or rearwardly of the machine, forward adjustment of said block operating to retard the engagement of the ratchet plate 572 by the detent 570 and therefore to decrease the stretching of the upper. Conversely it will be seen that the rearward adjustment of said block advances the engagement of the ratchet plate 572 by the detent 570 and therefore increases the stretch imparted to the upper.

Figure 15:
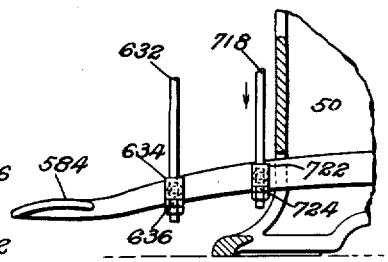
Fig. 15 is a sectional elevation illustrating the lining gripper treadle and related parts.

During the interval between the first part of the machine cycle and the second and final part of the machine cycle lining grippers illustrated in Figs. 16 and 18 are brought into engagement with the lasting margin of the lining at opposite sides of the heel portion of an upper in the machine by the depression of a treadle 584 (Fig. 1) and by further depression of said treadle the grippers are moved downwardly to impart a light tension to the lining, such tension being maintained while a last is inserted into the supported upper through its bottom opening. Referring now to Fig. 18 illustrating one pair of lining grippers, said grippers comprise an outer swinging arm 586 which is pivotally mounted on a pin 588 extending from front to back of the left side portion of a horizontal carrier plate 590 and an inner swinging gripper arm 592 pivotally mounted on the pin 588 and formed to extend upwardly and rearwardly to position its end portion opposite the end portion of the arm 586, the gripping surfaces of the arms 586 and 592 being provided with horizontal corrugations for gripping engagement with the lasting margin of the lining. The lining gripper arms are confined between lateral extensions 594 of the plate 590, which extensions carry the pivot pin 588. The arms 586 and 592 are yieldingly urged away from each other by compression springs 596 and 598 which operate on the arms 586 and 592, respectively. The spring 596 is contained within a socket extending upwardly into a lateral extension 600 of the bottom portion of the arm 586 and surrounds a headed screw 602 (Figs. 18 and 24) extending downwardly through the extension 600 and through the socket provided therein. The screw 602 extends into a tapped hole corresponding to the hole 603 (Fig. 18) in a recessed portion of the carrier plate 590 and is provided with a screw driver groove to facilitate vertical adjustment thereof for the purpose of adjusting the arm 586 toward or from the arm 592 in accordance with the adjustment of the counter wing supports widthwise of the machine. The spring 598 which operates on the arm 592 is contained within a socket extending upwardly into a lateral extension 605 (Fig. 18) of the bottom portion of the arm 592 and arranged to bear against an ear 606 extending outwardly from the forward extremity of the carrier plate 590. For swinging the inner gripper arm 592 in a direction to close the lining gripper on the work the lower portion of said arm is provided with an extension 607 which is positioned within a transverse groove 610 in the carrier plate 590 and has its end positioned beneath a hub 612 projecting upwardly from the carrier plate and arranged to engage the upper end face of a sleeve 614 (Fig. 24) which is slidably mounted on a rod 616 to the upper end portion of which the carrier plate 590 is secured. The upper portion of the sleeve 614 enters a counterbore (not shown) in the carrier plate 590. As illustrated in Fig. 23, the rod 616 is slidably mounted in bearings in a hollow cylindrical support 618 which is provided at its lower end with a rearward extension 620 which is provided with a hub 622 (Fig. 2) whereby the support 618 is journaled on the shaft 508. The support 618 swings toward and from the front wall of the frame 50 and its movement toward the frame is limited by an adjustable stop screw 624 mounted in the end of an arm 626 extending upwardly from the hub 622. The support 618 is yieldingly held at the limit of its movement toward the frame 50 by a tension spring 628 (Fig. 9) one end of which is connected to the support 618 and the opposite end of which is connected to a forward extension 630 of the frame. The rod 616 extends downwardly from the lower end of the support 618 and is connected by a link 632 (Fig. 15) to the treadle 584. The lower end of the link 632 extends through a pivot block 634 swiveled on the treadle 584 and is provided with a nut 636 against which the pivot block operates to impart downward movement to the link. The grippers are yieldingly held against downward movement by a spring 638 surrounding the rod 616 and confined between a shoulder 640 in the lower portion of the support 618 and a collar 642 pinned to the rod 616. The initial position of the grippers is determined by the engagement of a collar 652 secured to the rod 616 with the lower end of the support 618. It will be seen that the illustrated connection of the link 632 to the treadle 584 permits the treadle to return to its elevated position while the link 632 is held at the limit of its downward movement by mechanism hereinafter described, thus permitting upward movement of other parts operated by the treadle 584 without corresponding movement of the link 632. The sleeve 614 is yieldingly supported against downward movement by a spring 644 surrounding the rod 616 and confined between the lower end of the sleeve and the top face of a crosshead 646 in the support 618. Upward movement of the sleeve 614 by the spring 644 is limited by the engagement of a shoulder provided at the lower end of said sleeve with the bearing in the upper portion of the support 618. During the first stage of the downward movement of the rod 616 by the depression of the treadle 584 the sleeve 614 is held against downward movement by the spring 644 and the extensions 607 of the inner gripper arms engage the upper edge of the sleeve (Fig. 24) and swing into gripping engagement with the lining. Further depression of the treadle 584 after the lining grippers have closed on the work causes the rod 616 and the sleeve 614 to move downwardly together, the spring 644 maintaining gripping engagement of the lining grippers with the work. For holding the rod 616 at the limit of its downward movement by the treadle 584 a detent 648 (Fig. 23) is secured to a crosspin 658 pivotally mounted in ears 650 extending rearwardly from the bottom of the support 618. The detent is positioned between said ears and is arranged to extend downwardly therefrom for engagement with ratchet teeth formed in the rear face of the collar 652 on the rod 616. The detent 648 is yieldingly held in ratchet-engaging position by a spring 654 contained in a socket in the upper end of a vertical rocker arm 656 which is secured to an extension of the crosspin 658. The sleeve 614 is held at the limit of its downward movement by a detent 660 positioned in an opening in the front of the support 618 near its upper end and secured to a crosspin 662 pivotally mounted in the support. The detent 660 extends downwardly from the crosspin 662 and is provided at its lower end with a tooth which engages ratchet teeth formed in the forward portion of the head of the sleeve 614. The detent 660 is yieldingly held in ratchet-engaging position by a spring 664 positioned between a tail 666 extending upwardly from the detent and the support 618. For maintaining a proper orientation of the lining grippers the collar 652 at the lower end of the rod 616 is provided with an upward extension 668 the front face of which is arranged for sliding engagement with a plane surface 670 on the support 618. At the beginning of the second part of the power cycle of the machine the detent 648 is disengaged from the collar 652 by mechanism hereinafter described, whereupon the spring 638 moves the rod 616 upwardly, the detent 660 remaining in operative position to hold the sleeve 614 against upward movement. The upward movement of the rod 616 which occurs at this stage of the machine cycle is limited by the engagement of a pin 672 in the rod 616 at the upper extremity of a slot 674 in the sleeve 614 through which the pin 672 travels and such upward movement of the rod 616 is sufficient to permit the lining grippers to open but does not permit any considerable upward movement of said grippers since said grippers at this stage in the operation must be held in their lower position so that there will be clearance between the grippers and the last bottom for movement of the grippers hereinafter described. The detent 660 remains in engagement with the sleeve 614 during the operations on the shoe and is disengaged from the sleeve near the end of the machine cycle by mechanism hereinafter described to permit the return of the sleeve and the rod 616 to their initial positions. At the beginning of the second part of the machine cycle the detent 648 is disengaged from the collar 652 by power-operated mechanism illustrated in Fig. 8 comprising a cam lever 676 pivotally mounted on a fixed shaft 678 and provided at its upper end with a roll 680 which travels in a cam path or groove 682 provided in the disk 128 on the cam shaft 72. The lever 676 has pivoted to its lower end the rear end of a link 684 the forward portion of which is slidably mounted in a pivot block 686 (Fig. 23) which is swiveled at the end of a downward extension 688 of the support 618. The forward end of the link 684 extends through an open-ended slot in the lower end of the rocker arm 656 and carries at its forward extremity a nut 690 which engages the rocker arm during the rearward movement of the link 684 thereby rocking the arm 656 in a counterclockwise direction as seen in Fig. 23, thus disengaging the detent 648 from the collar 652 and permitting upward movement of the rod 616 to the extent permitted by the pin and slot connection of the rod to the sleeve 614. After the detent 648 has been disengaged from the collar 652 the link 684 continues its rearward movement in order to swing the support 618 forwardly thereby to position the lining grippers out of the path of movement of the counter wing supports. As illustrated in Fig. 23, the forward swinging movement of the support 618 is effected by the engagement of a nut 692 on the link 684 with the forward end of the pivot block 686, the engagement of said nut with the pivot block being timed to occur immediately upon disengagement of the detent 648 from the collar 652. For assisting the return of the support 618 to its initial position after the completion of the operations on the shoe a spring 694 is coiled about the link 684 and positioned between the head at the rear end of the link and the rear face of the pivot block 686. During such return movement of the support 618 a tripping member or rocker arm 696 (Fig. 9) engages an arm 698 secured to and extending downwardly from one end of the pin 662 and disengages the detent 660 (Fig. 23) from the sleeve 614, thus permitting the return of the sleeve 614 and the rod 616 to their respective initial positions. During continued return movement of the support 618 after the detent 660 has been disengaged from the sleeve 614 by the rocker arm 696 a pin 700 projecting outwardly from the support 618 engages a cam face or bevel 702 provided in the upper surface of the rocker arm 696 near its forward end, thereby swinging the arm 696 in a counterclockwise direction as seen in Fig. 9, thus disengaging said arm from the arm 698 and permitting the return of the detent 660 to ratchet-engaging position. It will be seen that the detent 660 is not disturbed by the rocker arm 696 as the support 618 swings forwardly and the rocker arm is returned to its tripping position by a tension spring 704 the upper end of which is connected to the rear end of the rocker arm and the lower end of which is connected to the forward extension 630 of the frame 50.

For supporting a last within an upper in the machine there is provided a heel rest 706 which, as illustrated in plan in Fig. 19, has the form of the heel seat portion of a last bottom on a reduced scale and is positioned on the center line A of the machine between the counter wing supports 80 and 82. The central portion of the heel rest 706 is recessed sufficiently to insure engagement of its margin with the last, or with an insole thereon. As illustrated in Fig. 23, the heel rest 706 comprises a horizontal plate at the upper end of a bracket 708 secured to the top of a vertical sliding member 710 in the forward extension 630 of the frame. For supporting the heel rest 706 in last-supporting position a spring 712 is contained within a bore extending upwardly into the sliding member 710 and is seated on a member 714 projecting forwardly from the frame. For drawing the heel rest 706 downwardly in order to facilitate the introduction of a last into an upper in the machine the illustrated machine is provided with connections from the heel rest to the lining gripper treadle 584 comprising a rod 716 the upper end of which is secured to the upper portion of the slide 710 and extends downwardly through the spring 712 and through a vertical bore in the support 714. Referring now to Fig. 1, the rod 716 is connected to the treadle 584 by a link 718 the upper end of which is pivoted to a head 720 at the lower end of the rod 716. The lower end of the link 718 is slidably mounted in a pivot block 722 (Fig. 15) swiveled on the treadle 584, the lower end of the link 718 being provided with a nut 724 against which the pivot block 722 operates to impart downward movement of the last-supporting assembly. It will be seen that the illustrated connection between the link 718 and the treadle 584 permits downward movement of the last support by last depressing mechanism hereinafter described without moving the treadle 584. As illustrated in Fig. 23, the vertical position of the heel rest 706 relatively to the counter supports when the heel rest is in its elevated position is determined by the engagement of a stop nut 726 on the threaded end of the rod 716 with the bottom of the support 714 on the machine frame and it will be seen that the vertical position of the heel rest may be varied by adjusting said stop nut. Preferably the vertical position of the heel rest relatively to the counter supports is such that a last, for example the last 728 illustrated in Fig. 25, is supported with the heel seat portion of the insole 730 on said last spaced above the counter supports sufficiently to permit a downward movement of the last to wipe the heel portion of the lining 732 against the flange 734 of the counter 736.

For effecting such downward movement of the last 728 the illustrated machine is provided with last-depressing mechanism comprising a last pin 738 at the lower end of a slide 740 which is manually movable downwardly to position the last pin in a socket 742 provided in the last 728 and is power-actuated to move the last downwardly from its position in Fig. 25 to its position in Fig. 26. For mounting the last pin 738 in the lower end of the sliding rod 740 the last pin is provided with an upwardly extending stem 744 which is slidably mounted in a socket extending upwardly into the sliding rod 740 from its lower end. The stem 744 is retained within said socket by a crosspin 746 the opposite ends of which travel through slots provided in the hollow end of the rod. The downward power pressure exerted on the sliding rod 740 acts against a spring 748 surrounding the lower end of the rod and confined between a flange 750 on the rod and a flange 752 on the stem 744. The sliding rod 740 is mounted in a hollow vertical head 754 at the forward end of a horizontal arm 756 (Fig. 27) extending laterally from the forward end of a slide or plate 757 and is yieldingly held at the limit of its upward movement by a spring 758 (Fig. 25) coiled about the upper portion of the sliding rod 740 and confined between a head 760 on said rod and the upper surface of the head 754. The last pin 738 is normally positioned above a last in the machine by the spring 758 and is movable downwardly at the will of the operator to position the last pin in the socket provided in the last. For holding the last pin in its downward position there is pivotally mounted between ears 762 projecting forwardly from the head 754 a detent 764 constructed and arranged to engage ratchet teeth 766 provided in the slide 740. For maintaining a proper orientation of the ratchet 766 relatively to the detent the rod 740 is provided with a longitudinal groove 768 within which there is positioned the end of a screw 770 mounted in the head 754. The detent 764 is provided with an upwardly extending tail 772 to facilitate manual disengagement thereof from the ratchet teeth 766 after the completion of the cycle of operations on the shoe. Referring now to Figs. 27 and 28, the sliding plate 757 which carries the rod 740 is mounted for horizontal sliding movement in a channel plate 774 which is swiveled on the upper end of a vertical rod 776 slidably mounted in the top plate 52 and the platform 56, the plate 757 being retained within the channel plate by a cover plate 778 secured thereto. The plate 774 is supported by a head 780 (Fig. 25) pinned to the rod 776 and is held against upward movement on the rod 776 during the downward movement of said rod by a stop nut 782 on the threaded end of the rod. For limiting the swiveling movement of the channel plate 774 on the rod 776 a stop pin 784 (Fig. 27) projects upwardly from the top of the head 780 into a segmental groove in the lower portion of the hub 786 of the plate 774. The sliding plate 757 is yieldingly held at the limit of its rearward movement as indicated in full lines in Fig. 27 by a compression spring 788 surrounding a rod 790 secured to an upwardly extending boss 792 on the channel plate 774 and slidably mounted in an upward extension 794 of the plate 757, the spring 788 being confined between said upward extension and the boss 792.

In order that the operator may have a clear view of the counter and the upper as he positions them in the machine the channel plate 744 and the parts mounted thereon are yieldingly held in their position indicated in full lines in Fig. 27 by a tension spring 796 the forward end of which is connected to a screw 798 on an upward extension 800 of the head 780 and the opposite end of which engages a screw eye 802 on the channel plate. It will be seen that the swiveling movement of the channel plate by the spring 796 is limited by the engagement of the hub 786 of said plate with the stop pin 782 in the head 780. The channel plate 744 and parts mounted thereon are manually swung from their position indicated in full lines in Fig. 27 to their position illustrated in broken lines therein and the sliding plate 757 is manually moved forwardly to position the last pin 738 for engagement within the socket of a last in the machine. For facilitating the location of the last pin in last-engaging position a screw 798 in an upward extension 800 of the head 780 provides a stop for arresting the swiveling movement of the channel plate 774 and positioning the last pin accurately widthwise of the shoe. The position of the last pin widthwise of the shoe varies slightly when changing from a left shoe to a right shoe, or vice versa, and in order to permit the last pin assembly to be located accurately for either a right or a left shoe by swinging the channel plate 774 against the stop screw 798 a spacing plate 804 (Figs. 28 and 29) is pivotally mounted on a stud 806 projecting laterally from the plate 774 and is provided with a downward extension 808 which, in one position of the plate 804, is in alinement with the stop screw 798 as the last pin assembly is swung into its operating position. In its opposite position the plate 804 is positioned, as illustrated in Fig. 29, with its extension 808 out of alinement with the screw 798. To facilitate the adjustment of the spacing plate 804, it is provided, as illustrated in Fig. 29, with upward extensions 810 which engage alternately a stop pin 812 in the plate 774. The spacing plate 804 is held in its adjusted position by its frictional engagement with the channel plate 774 and in order to provide sufficient pressure of the plate 804 against the channel plate to create the required friction a compression spring is mounted in a counter bore in a hub 816 projecting from the plate 804 and confined therein by a nut 818 on the end of the stud 806. For moving the rod 776 downwardly in order to force the last 728 into the supported upper a bell crank lever 820 (Fig. 31) is journaled on the fixed shaft 678 and has mounted at the upper end of its vertical arm a cam roll 822 which travels in a cam path or groove 824 in the disk 308 secured to the cam shaft 72. The rotation of the cam shaft swings the bell crank lever 820 in a counterclockwise direction, as seen in Fig. 31. For transmitting the downward movement of the horizontal arm of the bell crank lever 820 to the rod 776 a pair of links 826 (Fig. 32) are pivoted to the ends of a yoke 828 at the end of said arm. Said links extend upwardly from the bell crank lever and are pivoted at their upper ends to opposite sides of a sliding block 830 on the rod 776. When the machine is at rest the block 830 is positioned heightwise of said rod between a collar 832 pinned to the rod and a compression spring 834 surrounding the rod 776 and supported by capstan nuts 836 on the lower end of said rod. It will be seen that further downward movement of the block 830 after the last has come to the limit of its downward movement compresses the spring 834 and thus increases the downward pressure on the last. For holding the rod 776 against rotation and thus maintaining the head 780 secured thereto in its position illustrated in Fig. 25, said rod is provided with a spline 838 (Fig. 31) constructed and arranged to travel in a suitable splineway provided in an upward extension 840 of the platform 56. In order to provide the proper direction of movement of the last 728 during the downwiping of the lining rearward movement is imparted to the last during the downward movement thereof by mechanism which will now be described. As illustrated in Fig. 25, the head 780 secured to the rod 776 is provided with a rearward extension 842 on which there is pivotally mounted a bell crank lever 844 which has freely mounted in the upper end of its vertical arm a crosspin 845 which has secured thereto a detent 846 which is positioned to engage ratchet teeth 848 in the bottom face of the sliding plate 757 when said plate is in its position indicated by broken lines in Fig. 27. When the rod 776 is at the limit of its upward movement, as illustrated in Fig. 25, the detent 846 is held out of ratchet-engaging position by the engagement of a cam face 850 on a plate 852 secured to the rearward extension of the head 780 with the end of a short arm 854 secured to the crosspin 845 which carries the detent. During the downward movement of the rod 776 the bell crank lever 844 is swung in a counterclockwise direction, as seen in Fig. 25, by a spring 856 surrounding a rod 858 pivoted to the horizontal arm of the bell crank lever and extending downwardly therefrom through an opening in the platform 56. During the first stage of the counterclockwise movement of the bell crank lever the detent 846 moves rearwardly from the plate 852 and a spring 860 which connects the arm 845 to the rearward extension of the head 780 swings the detent into ratchet-engaging position and further counterclockwise movement of the bell crank lever thereafter imparts rearward movement to the sliding plate 757 and the last pin assembly carried thereby. During the upward or return movement of the rod 776 a collar 862 on the lower end of the rod 858 engages the bottom face of the platform 56 and further upward movement of the rod 776 thereafter swings the bell crank lever 844 in a clockwise direction to return the detent 846 to its initial position.

When the final downward pressure against the last occurs the heel-lasting wipers 98, 292 and 294 are at the limit of their wiping movement and provide a support against which the downward pressure on the last is exerted. The downward pressure against the last not only seats its heel portion within the heel portion of the supported upper but also holds the last against upward movement during the thrust of the tack-driving mechanism.

Before the final downward pressure on the last occurs, the members 92 on which the upper was initially supported have swung downwardly, as illustrated in Fig. 26, to provide clearance for the wiping movement of the end wiper 98, and the heel portion of the upper has been engaged by the heel-embracing pad 864 which frictionally engages the heel portion of the upper and holds it against downward movement during the downward movement of the last. The heel pad 864 also operates to press the counter wings and the adjacent portions of the upper and lining firmly against the last and to hold them in said position while the flanges of the counter wings and the lasted margins of the upper and lining are tacked to the insole. Referring now to Fig. 34 which illustrates the left portion of the heel pad 864 the illustrated pad is formed from a block of relatively soft resilient material, for example vulcanized rubber. The block has formed therein centrally of its width an inner face 866 which has the general shape of the heel portion of a shoe when the pad is in its closed position. The rear face of the heel pad is a vertical plane surface which, when the pad is positioned in the machine, is arranged at right angles to the center line A (Fig. 19) extending from front to back of the machine and the side faces of said pad are vertical plane surfaces which in the normal open position of the pad converge rearwardly of the machine. The central portion of the pad is made as thin as practicable in order to facilitate the closing movement of the pad on the shoe. The side and end portions of the pad are provided with recesses or grooves 868 in order to increase the resiliency of the pad thereby to facilitate conformation of the pad to the shape of the heel portion of a shoe in the machine. While the illustrated pad will conform to the shape of any size or style of shoe when it is forcibly brought into engagement with the end and side portions of the rear part of a shoe in the machine, the illustrated construction permits the removal of the pad in the machine and the substitution therefor of a pad better suited to operate on a particular run of work. The heel pad is mounted in a pair of containers 870 having rear walls and side walls which engage, respectively, the rear face and the side faces of the pad and having top flanges 872 and bottom flanges 874 which engage, respectively, the top and bottom faces of the pad and prevent heightwise movement of the pad within the containers. The inner edge faces 875 of the containers extend forwardly from the rear wall of the containers a distance somewhat less than the thickness of the central portion of the top face of the pad, said edge faces being in engagement with each other at the center line A (Fig. 19) when the pad is in its open position. At the forward extremities of said inner edge faces rounded faces 876 are formed to provide a pivot point upon which the containers swing as they move to close the heel pad on the work. The edge faces 877 of the containers extend laterally from the rounded faces 876 a short distance and then forwardly and outwardly along lines substantially parallel to the side walls of said containers. The edge faces of the containers are set back sufficiently from the inner face 866 of the heel pad to prevent engagement of said edge faces with the heel portion of the shoe as the pad is closed upon it. It will be seen that as the pad containers swing upon the rounded faces 876 provided therein there is a separation of the rear walls of the containers. In order to bridge the opening thus created between the rear walls of the containers and to provide a support for the central portion of the rear wall of the heel pad when the containers are at the limit of their movement toward each other a thin plate 878 is secured to the forward surface of the rear wall of the container illustrated in Fig. 33 adjacent to the side wall thereof and arranged to extend partially across the rear wall of the opposite container and a similar plate 880 is secured to the rear wall of the opposite pad container adjacent to the side wall thereof and arranged to slide against the plate 878 as the containers move to close the heel pad on the shoe. The containers are supported upon the platforms 56 and are moved toward and from the heel end of a shoe in the machine by a slide 882 which, as illustrated in Fig. 7, is mounted on the opposite marginal portions of the platforms 56 and guided by gibs 884 secured to the platforms, respectively, and arranged to engage flanges 886 provided at opposite sides of the base of the slide. The slide 882 has a central longitudinal wall 888 (Fig. 35) extending upwardly from its base portion and having recessed portions 890 extending rearwardly of the slide from its forward end throughout the greater part of its length. Mounted in each of said recesses is a rocker arm 892 (Fig. 19) which is positioned between a lug 894 (Fig. 35) projecting from the base of the recess 890 and a flange 896 extending laterally from the top of said wall and is pivotally mounted on a vertical pin 898 (Fig. 19) extending through said flange and said lug. The forward ends of the rocker arms 892 are pivotally mounted in grooves provided in the adjacent portions of the rear walls of the containers 870 while the rear end portions of said rocker arms are provided, respectively, with hollow bosses 900 extending outwardly therefrom and opening toward the recess 890 in the slide 882. The bosses 900 carry compression springs 902 which bear against the slide 882 and urge the forward ends of the rocker arms toward each other. It will be seen that the rocker arms 892 yieldingly hold the containers 870 in engagement with each other, as illustrated in Fig. 19, while permitting the containers to pivot upon the rounded faces 876 (Fig. 33) during the closing of the heel pad on the shoe. For centralizing the containers 870 widthwise of the machine the slide 882 is provided with a forwardly extending abutment 904 and the containers 870 are provided, respectively, with rearward extensions 906 constructed and arranged to engage opposite side faces of the abutment 904, two of said extensions being located above and two below the rocker arms 892. For holding the containers 870 against upward movement a top plate 908 (Fig. 19) is secured to the top face of the slide 882 and arranged to extend forwardly of the slide over said containers. The forward portion of said top plate substantially covers the top faces of the containers and is provided with a rearwardly extending recess 910 to provide clearance for the last. For moving the slide 882 through its guideway on the platforms 56 the disk 540 (Fig. 6) on the cam shaft 72 is provided with a cam path or groove 912 within which there is mounted a cam roll 914 carried at the upper end of an arm 916 journaled on the fixed shaft 198 and arranged to extend upwardly therefrom. A horizontal arm 918 extends rearwardly from the hub of the arm 916 and has pivoted to its rearward end the lower end of a link 920 the upper end of which is pivoted to the horizontal arm of a bell crank lever 922 which is journaled on the fixed shaft 122. The vertical arm of the bell crank lever 922 has pivoted to its upper end a horizontal link 924 which extends forwardly from the bell crank lever and has its forward end pivoted to a headed stud 926 projecting laterally from the rear portion of the slide 882. As the heel pad 864 is brought into engagement with the heel end of a shoe in the machine by the cam-actuated mechanism above described the rear portion of the pad is spread somewhat by its engagement with the heel end of the shoe and the containers 870 separate somewhat to accommodate the spreading movement of the heel pad. Further forward movement of the heel-embracing assembly after the containers 870 have separated from each other as above described tends to swing the side portions of the container toward each other and thus to bring the side portions of the heel pad against the shoe. In order to hold the side portions of the heel pad out of engagement with the shoe until the heel pad has come to the limit of its forward movement, mechanism is provided which operates during the forward movement of the heel-embracing assembly to restrict the movement of the containers 870 toward each other and which operates after the forward movement of the heel-embracing assembly has been completed to swing the containers 870 toward each other thereby to press the side portions of the heel pad 864 against the heel portion of the shoe. As illustrated in Fig. 37, this mechanism comprises a disk 928 secured to the cam shaft 72 and provided with a cam path or groove 930 within which travels a cam roll 932 at the upper end of an arm 934 journaled on the fixed shaft 198 and arranged to extend upwardly therefrom. A horizontal arm 936 extends rearwardly from the hub of the arm 934 and has pivoted to its rear end the lower end of a link 938, the upper end of which is pivoted to the horizontal arm of a bell crank lever 940 journaled on the fixed shaft 122. The upper end of the vertical arm of the bell crank lever 940 is pivoted to a hollow block 942 which is adjustably mounted on the threaded end of a rod 944 and secured in adjusted position between nuts 946 and 948 mounted on said rod. The forward end of the rod 944 (Fig. 19) is pivoted to an upwardly extending head 950 at the forward end of a slide 952 which travels in a rearward extension of the guideway in which the slide 882 is mounted. The head 950 of the slide 952 has outwardly extending arms 954 which carry at their opposite ends hollow swivel blocks 956 within which are slidably mounted the rear end portions of parallel rods 958 the headed forward ends of which are pivotally mounted between ears 960 projecting rearwardly from the pad containers 870, respectively. Mounted on the threaded rear portions of the rods 958 are stop nuts 962 which engage the rear end faces of the swivel blocks 956 and limit the forward movement of the rods 958 relatively thereto. For yieldingly imparting the forward movement of the vertical arm of the bell crank lever 940 to the pad containers in order to close the pad on the heel portion of a shoe in the machine springs 964 are mounted on the rods 958, respectively, and confined between the headed ends of said rods and the swivel blocks 956. For preventing upward movement of the heel-embracing assembly as the heel pad is closed on the work the platforms 56 are provided near their forward ends with upward extensions 966 (Fig. 2) and retaining plates 968 are secured to the top faces of the extensions 966 and arranged to extend over the top plate 908 on the slide 882.

After the heel-embracing pad 864 has been closed on the work and the end wiper 98 and side wipers 292 and 294 have operated to wipe the overlasting margins of the upper and lining under and against the insole 730 (Fig. 39), the overlasted margins of the upper and lining, together with the flange of the counter, are secured to the insole by means of tacks which are carried by pockets provided in the lasting wipers. The position of the end wiper 98 for the tacking operation is illustrated in Fig. 26 and the position of the side-lasting wipers 292 and 294 for the tacking operation is illustrated in Fig. 39. The illustrated machine drives five tacks to secure the overlasted materials to the insole, one at the center of the rear margin of the heel seat and two at each side of the heel seat. The five tacks are driven simultaneously by a driving mechanism illustrated in part in Fig. 39. It will be understood that the work is held against misplacement during the tack-driving operation by the last-engaging and depressing mechanism hereinbefore described.

Referring now to Fig. 26, illustrating the tack-driving means carried by the end wiper 98, said wiper is provided at its forward end with a hole 970 which extends downwardly and rearwardly from the top face of the wiper and has mounted therein a tack-driving pin 972 which projects downwardly from the bottom of the wiper and has its head 974 slidably mounted in a hole in a bracket 976 secured to the bottom of the wiper plate 98, said hole being in alinement with the hole 970 provided in the wiper. The pin 972 is supported on the bracket 976 by a flange 978 at the upper extremity of the head of the pin. For returning the pin to its position, illustrated in Fig. 26, after the tack-driving operation a spring 980 surrounds the exposed portion of the pin and is confined between the flange 978 and the bottom of the wiper plate. When the driving pin 972 is at the limit of its downward movement its upper end face provides the base of a tack pocket which receives a tack in inverted position, for example, a tack 982 illustrated in Fig. 26. The tack drops into the pocket provided in the wiper 98 after the wiper has been retracted and is driven in the following operation of the machine. Referring now to Fig. 39, the side-lasting wipers 292 and 294 each carrying two driving pins 984, one of the pins carried by each of the wipers being illustrated in Fig. 39. The construction and arrangement of the driving pins 984 is substantially the same as the construction and arrangement of the driving pin 972 and will be clearly understood from the above description of the pin 972. For simultaneously operating the tack-driving pins 972 and 984 there is provided, as illustrated in Fig. 23, a vertically sliding rod 986 which is mounted in the forward extension 630 of the frame 50 and has secured to its upper end a tack-driving head 990 which provides means adapted to drive all five tacks flush to the work regardless of the inclination and shape of the heel seat portion of the last. For imparting upward movement to the rod 986 there is provided in the cam disk 190 (Fig. 22) on the cam shaft 72 a cam path or groove 992 within which travels a roll 994 at the rear end of a cam lever 996 which is mounted for rocking movement on a horizontal stud 998 projecting inwardly from the right side wall of the machine frame. At its forward end the lever 996 carries a yoke the parallel arms 1000 of which project forwardly through vertical openings 1002 (Fig. 2) provided in the front wall of the frame 50. Pivoted to the forward ends of the arms 1000 are links 1004 which extend downwardly from the arms 1000 and are pivoted at their lower ends to a trunnion block 1006 (Fig. 23) slidably mounted on the threaded lower end of the rod 986 and positioned thereon between capstan nuts 1008. Referring now to Fig. 41, the head 990 on the vertical rod 986 comprises a fixed member or block 1010 secured to a stud 1012 projecting upwardly from the upper end of the rod 986 and into a socket in the central portion 1014 of said block. As illustrated in Fig. 23, the rear portion of the tack-driving head 990 extends into a recess provided in the forward extension 630 of the machine frame and is held from turning movement by the engagement of the vertical portion 710 of the last-supporting member 708 within a vertical open-ended slot 1016 (Fig. 41) extending forwardly from the rear portion of the block 1010. The slot 1016 also provides clearance for the upwardly extending portion of the last support 708 which projects forwardly and upwardly from the member 710. Pivoted between downwardly extending lugs 1018 on the block 1010 are rocker arms 1020 (Fig. 40) which carry at their forward ends plungers or hammers 1022 which are slidably mounted in holes 1024 (Fig. 41) provided in thin portions 1026 of the block 1010 extending laterally from its central portion. The rear end portions 1028 (Fig. 40) of the rocker arms 1020 are offset laterally from the main portions of said arms and are provided with sockets 1030 within which are mounted the ball ends of upwardly extending links 1032 which are provided near their upper ends with balls 1034 which are mounted in suitable sockets provided at the opposite ends of a horizontal member 1036 which is provided with a rearward extension or boss 1038 which operates against the driving pin 972. In order to prevent disengagement of the horizontal member 1036 from the rocker arms 1020 the links 1032 are provided with reduced end portions or studs 1040 which extend loosely through apertures which communicate with the sockets which receive the ball ends of said links and are provided with cotter pins 1042 which retain the ball ends of said links within their respective sockets. For guiding the vertical movements of the horizontal member 1036 the block 1010 (Fig. 41) is provided at opposite sides of the slot 1016 with laterally extending gibs 1044 which engage within a T-way 1046 in the member 1036. In order to permit a limited rocking movement of the horizontal member 1036 the gibs 1044 fit somewhat loosely in the T-way 1046 except at the upper portion of said T-way which is made somewhat narrower than the main portion of the T-way and thus permits gibs 1044 to position the member 1036 widthwise of the block 1010. Referring to Fig. 40, it will be seen that the plungers 1022 are much closer to the fulcrum points of the rocker arms 1020 than are the ball-ended links 1032 which carry the member 1036, the arrangement being such that substantially uniform forces are exerted against the five tacks during the tack-driving operation. The ends of the plungers 1022 which engage the tack-driving pins 1084 and the portion of the member 1036 which engages the tack-driving pin 972 are yieldingly maintained in the plane of the upper surface of the block 1010 by pins 1048 (Figs. 39 and 40) pivotally mounted in the rocker arms 1020 between the lugs 1018 and the links 1032 and arranged to extend upwardly through holes 1050 (Fig. 41) provided in rearward extensions 1052 of the block 1010. As illustrated in Fig. 40, each of the pins 1048 is acted on by a spring 1054 surrounding the pin and confined between the rocker arm 1020 and the lower face of the rearward extension 1052 and is also acted on by a spring 1056 (Fig. 39) surrounding the pin and confined between the upper surface of the extension 1052 and a cotter pin 1058 at the upper end of the pin 1048. When the machine is at rest the springs 1054 and 1056 act on the rocker arms 1020 to maintain a substantially horizontal position of said rocker arms, as illustrated in Fig. 40, in which position the upper faces of plungers 1022 and the upper surface of the member 1036 are positioned in the plane of the upper surface of the block 1010. It will be seen that during the tack-driving operation the horizontal member 1036 may move downwardly relatively to the block 1010 in order to permit the tack-driving pins to be uniformly spaced from the work during their driving stroke or, conversely, the plungers 1022 or either of them may move downwardly relatively to the block in order to elevate the member 1036. It will also be seen that after the required self-adjustment of the tack-driving pins to the work has taken place further upward movement of the tack-driving rod 986 advances the tack-driving pins simultaneously to drive the tacks and to position their ends uniformly with respect to the exposed surface of the overlasting margin of the upper. The extent to which the tacks are driven is determined by the adjustment of the trunnion block 1006 on the rod 986. Preferably said block is so adjusted that the heads of the tacks are left substantially flush with the exposed surface of the overlasting margin of the upper.

For providing the tack pockets in the wipers with tacks there is illustrated in Fig. 1 tack-supplying mechanism which is for the most part of well-known construction. The characteristic features of this mechanism are similar to the disclosure of Letters Patent No. 663,777, granted on December 11, 1900, upon an application of R. F. McFeely, with improvements shown in other Letters Patent including No. 1,002,422, granted on September 5, 1911, upon an application of said McFeely. The illustrated tack-supplying mechanism comprises an oscillatory tack hopper 1060 from which tacks are delivered to a plurality of raceways formed in a raceway block 1062. From the lower ends of these raceways the tacks are separated and dropped by a separator 1064 (Fig. 2). The tack hopper is secured to a shaft 1066 which also operates the separator as in the well-known prior construction. It will be understood that by turning movement of the shaft 1066 in one direction the separator is moved into position to receive the lowermost tacks in the raceways and that by movement of the shaft in the opposite direction the separator is operated to deliver the tacks. The shaft 1066 is turned in both directions by movement of a vertical rack bar 1068 connected to a pinion on the shaft 1066. The rack bar 1068 is moved up and down by a rocker arm 1070 which is mounted on a cross shaft 1072 in the upper portion of the frame 58. At its forward end the rocker arm 1070 is pivoted to the lower end of the rack bar and at its rear end said arm is pivoted to the upper end of a yielding link 1074. For imparting upward and downward movements to the link 1074 a cam lever 1076 (Fig. 38) is journaled on the cross shaft 122 and provided at its forward end with a roll 1078 which travels in a cam path or groove 1080 in the disk 928 on the cam shaft 72 while the rear end of said lever is pivoted to the lower end of the link 1074. The link 1074 comprises a sleeve 1082 which is pivoted to the rocker arm 1070 and a rod or plunger 1084 which is pivoted to the cam lever 1076 and extends upwardly therefrom into the sleeve. The reduced upper portion of the plunger 1084 has mounted thereon a collar 1086 which is normally held against a shoulder at the upper end of the lower portion of the plunger by a spring 1088 surrounding the upper portion of the plunger and engaging at its upper end a collar 1090 at the upper end of the plunger. During the normal operation of the machine the spring 1088 holds the spring-engaging flanges of the collars in engagement with corresponding flanges in the sleeve 1082.

The tacks are, of course, delivered by the separator 1064, point downward. Since they are to be driven upwardly into the heel bottom there is associated with the tack-supplying mechanism means for inverting the tacks and for delivering them head downward into tubes 1092 (Fig. 1) by which they are carried into position to be received within the tack pockets provided in the wipers as the wipers return to their respective retracted positions. The tack-inverting mechanism comprises an oscillatory invertor 1094 (Fig. 43) mounted in a bearing formed in a cylindrical sleeve 1096 which is detachably mounted under the separator 1064 and is provided with a plurality of tack passages one of which is shown at 1098 for receiving the tacks delivered by the separator into passages 1100 (Fig. 1) that aline with the passages 1098. The invertor 1094 is provided with a plurality of tack pockets one of which is illustrated at 1102 in Fig. 43. In one position of the invertor the tack pockets are arranged to aline with the passages 1100 and in another position thereof are arranged to aline with passages 1104 in the sleeve 1096 with which passages the tack tubes 1092 communicate. For rocking the invertor 1094 in order to invert the tacks that have been delivered thereto, for example the tack 1106 illustrated in Fig. 43, the invertor is provided with a pinion 1108 which is turned by a gear segment 1110 (Fig. 1) which is formed at the end of one arm of a bell crank lever 1112 fast on a rock shaft 1114 journaled in a bracket 1116. For operating the gear segment 1110 there is pivoted to the end of the upwardly extending arm of the bell crank lever 1112 a rod 1118 which extends through lugs 1120 and 1122 formed on a bar 1124. The rod 1118 is surrounded by a spring 1126 which is confined between sleeves 1128 and 1130 which extend through bearings in the lugs 1120 and 1122, respectively, and have flanges engaged by the ends of the spring 1126. It will be seen that by movements of the bar 1124 in opposite directions, corresponding movements are imparted yieldingly in the same direction to the rod 1118 and thence to the invertor 1094. In order to insure proper alinement of the tack pockets 1102 in the invertor with the tack passages 1100 and 1104 there is provided at one end of the invertor 1094 a boss or stop 1132 which, as illustrated in Fig. 44, engages alternately stop screws 1134 and 1136 mounted in a guard plate 1140 in front of the invertor. The bar 1124 is operated by the same connections from the cam shaft 72 which operate the tack hopper and the separator, the rocker arm 1070 being provided with a central upward extension 1138 which has pivoted to its upper end the rearward end of the bar 1124. Referring now to Fig. 36, the rear tack tube through which tacks are delivered for the end wiper 98 communicates at its lower end with a hollow vertical rod 1142, the upper end of which is mounted in a hollow vertical head 1144 at the end of the horizontal arm of a bracket 1146 which is secured to the platform 56. The upper portion of the hollow head 1144 receives the lower end of the rear tack tube and positions it in alinement with the rod 1142. When the end wiper 98 is in its retracted position, as illustrated in Fig. 36, the hole 970 provided therein is in alinement with the hole in the rod 1142. As illustrated in Fig. 33, the hollow rod 1142 extends through a vertical slot 1148 extending lengthwise of the slide 882 which carries the heel pad and through a similar slot in the top plate 908, said slots extending rearwardly from the rod and permitting forward movement of said slide to bring the heel pad into heel-embracing position.

For starting and stopping the driving shaft 62 the illustrated machine is provided with a clutch and brake mechanism which is similar in its main features to the mechanism disclosed in Patent No. 672,056, granted April 16, 1901 on an application of Davey et al. As illustrated in Fig. 4, this mechanism comprises a rotor 1150 which is loosely mounted on the shaft 62 and has formed at one end thereof a frusto-conical clutch member 1152 and has formed at its opposite end a hollow brake member 1154. The rotor 1150 is moved endwise of the shaft 62 into engagement with a clutch surface formed in the power-driven pulley 60 by a spring 1156 which surrounds the hub 1158 of the rotor 1150 and the hub 1160 of a collar 1162 secured to the shaft 62 and is confined between said collar and the end of the rotor. The rotor is operatively connected to the shaft 62 by tongue and groove connections with the collar 1162. For moving the rotor in a direction to disengage the clutch member 1152 from the pulley 60 and to bring the brake member 1154 into engagement with a fixed brake member secured to the gear housing 1164, a cam 1166 is secured to the shaft 72. The periphery of said cam is provided with projections 1168 which engage a cam roll 1170 mounted at the end of the horizontal arm of a bell crank lever 1172 journaled on a stud 1174 projecting outwardly from the left side wall of the frame 50. The downwardly extending arm of the bell crank lever 1172 has secured to its lower end face a plate 1176 having a downward extension which engages a crossbar 1178 connecting the parallel end portions of a link 1180 the opposite end of which is pivoted to the central portion of a vertical lever 1182. The lever 1182 is pivoted at its lower end to the frame 50 and is provided at its upper end with a roll which is mounted in a peripheral groove 1184 provided in the rotor 1150 between the clutch member and the brake member. The free end of the link 1180 is yieldingly urged upwardly to position its crossbar 1178 for engagement by the plate 1176 by means of a spring 1186 one end of which is connected to said link and the other end of which is connected to the downwardly extending arm of the bell crank lever 1172. When it is desired to start the machine the operator depresses the treadle 68 thereby imparting downward movement to an arm 1188 secured to that end of the treadle shaft 70 which projects outwardly from the left wall of the frame 50. The arm 1188 has pivoted to its forward end a tripping member 1190 which extends upwardly from said arm and has its upper end positioned between parallel portions of the link 1180. At its upper end the member 1190 has secured to its rear face a plate 1192 which is rabbeted at its lower margin to provide a shoulder for engagement with a plate 1194 connecting the parallel portions of the link 1180. The plate 1192 is yieldingly held in position to engage the plate 1194 by a spring 1196 one end of which is connected to the tripping member and the other end of which is connected to the link 1180. In order to permit the link 1180 to be returned to its operative position immediately after starting the driving shaft 62 the tripping member 1190 is disengaged from the plate 1194 during the latter part of the depression of the treadle 68 by a short arm 1198 extending upwardly from the arm 1188 at its forward end for engagement with the end of a screw 1200 mounted in the tripping member 1190 near its lower end and projecting rearwardly therefrom. It will be seen that the downward movement of the arm 1188 after the arm 1198 has engaged the screw 1200 not only moves the tripping member downwardly but also swings it forwardly, causing the plate 1192 to disengage the plate 1194 and permitting the return of the link 1180 to its operative position as seen in Fig. 4.

To prepare the illustrated machine for operation on a given shoe, the operator is required to make certain adjustments. The mechanisms for effecting said adjustments have been heretofore described but a recapitulation of the various adjustments may serve to promote a better understanding of the invention. The counter wing supports 80 and 82 are adjusted toward or from each other in accordance with the size of counter to be mounted thereon by turning the shaft 246 (Fig. 3). The counter wing supports 80 and 82 are individually adjusted toward or from the central support 84 by turning the thumb screws 148 (Fig. 2) at opposite sides of the machine and thereby moving the heads 140 and 142 forwardly or rearwardly of the machine as the case may be. It will be understood that this adjustment not only positions the counter wing supports relatively to the central support 84 in accordance with the size of shoe to be operated upon but also positions the side wipers 292 and 294 for their respective operations on the shoe since the wipers, as well as the counter supports, are carried by the heads 140 and 142. It will be understood that the adjustment of the counter wing supports 80 and 82 toward or from each other necessitates a corresponding adjustment of the upper-clamping position of the side wipers 292 and 294, that is, the position of said wipers at the end of the first part of the power cycle of the machine (Fig. 42). This adjustment is effected by turning the knurled knob 1202 (Figs. 2 and 3) secured to the forward end of the shaft 352. The position of the side wipers 292 and 294 for the tack-driving operation is determined by adjusting the stop screws 400 carried thereby. The toe gripper 78 is adjusted toward or from the counter supports in accordance with the length of shoe to be operated on by means of the hand screw 454 (Fig. 14) and is adjusted vertically by releasing the clamping screw 448 and sliding the gripper-carrying head 423 on the post 442. The toe gripper 78 is adjusted for left and right shoes within a given run by sliding the plate 422 (Fig. 19) on which the gripper is mounted widthwise of a shoe in a machine through its guideway in the head 423, the stops 431 determining the respective positions of the gripper. To determine the extent of this adjustment the stops 431 are adjusted toward or from each other by turning the right and left threaded screw 429. It will be understood that a vertical adjustment of the toe gripper 78 necessitates a corresponding adjustment of the length of the treadle link 458 (Fig. 14) in order to maintain the desired timing of the closing of the gripper jaws on the work.

Figure 45:
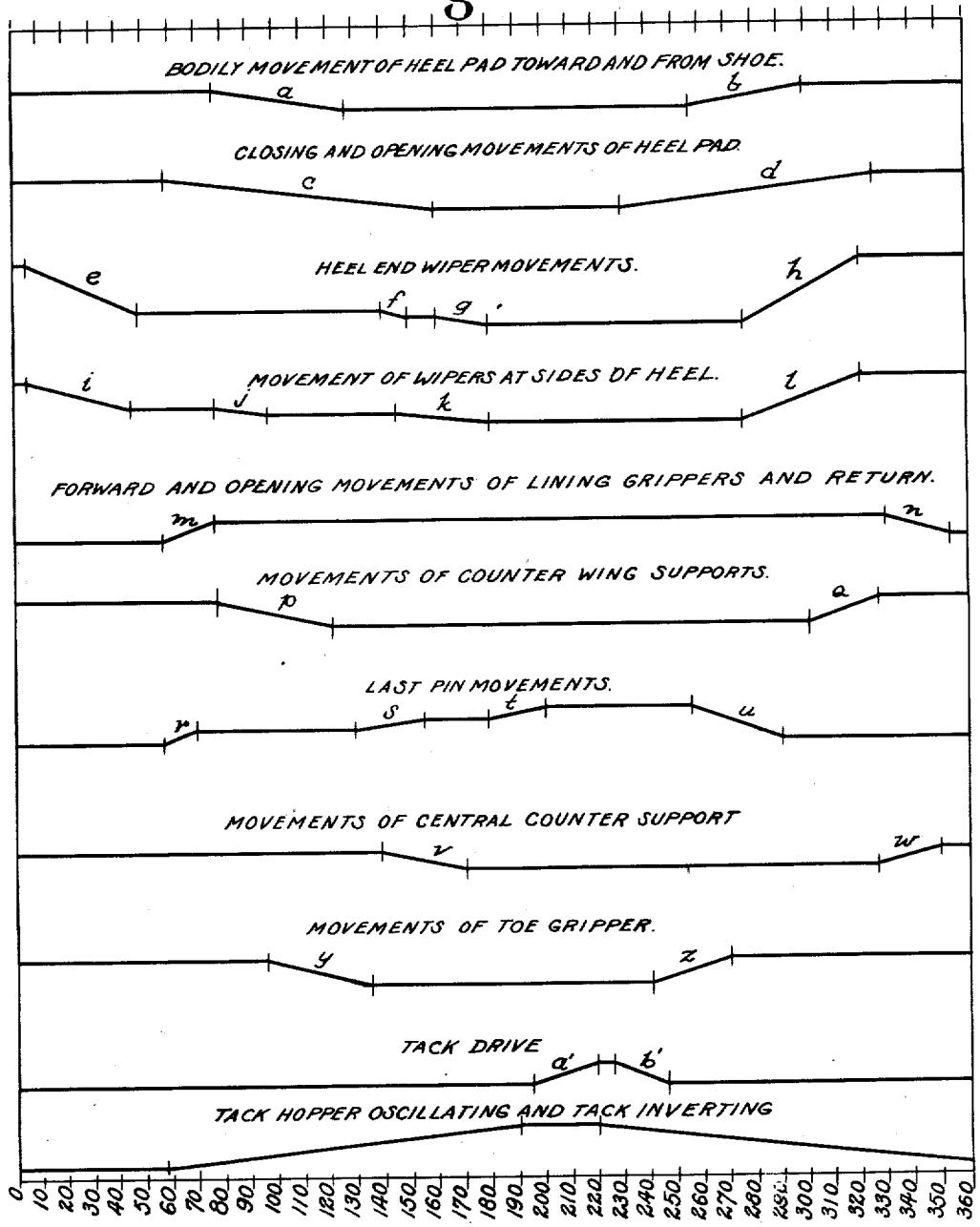
Fig. 45 is a chart of the cam motions of the machine.

In practicing the method of the present invention with the aid of the illustrated machine a molded counter 1204 (Fig. 24) which has been treated with cement is arranged in upright position and is supported by its flange on the central counter support 84 and on the counter wing supports 80 and 82. The upper 406 is then positioned relatively to the counter and its lining 1206 is positioned between the jaws 586 and 592 of the lining grippers. After the operator has determined that the heel portion of the shoe is in proper relation to the counter and to the operating parts of the machine he positions the toe end of the upper for engagement by the toe gripper 78 and draws forwardly on the toe end of the upper while he depresses the treadle 430 to move the toe gripper 78 into upper-engaging position. After the gripper has closed on the upper the spring 528 illustrated in Fig. 20 moves the gripper 78 in a direction to tension the upper lengthwise thereof. Having thus held the upper in position to be operated upon the operator depresses the clutch treadle and the rear wiper 98 and side wipers 292 and 294 are brought into engagement with the overlasting margin of the upper 406 (Fig. 42), in which position they cooperate with the gripper jaws provided in the counter supports to hold the heel portion of the upper in the position in which it has been located by the operator. The operator next depresses the lining gripper treadle 584, thereby closing the lining gripper jaws on the lasting margin of the lining and moving said jaws downwardly after they have been closed to tension the heel portion of the lining heightwise thereof. The depression of the treadle 584 also operates to impart downward movement to the last-supporting member 708 in order to provide clearance for the introduction of a last into the supported upper. While the treadle 584 is held at the limit of its downward movement a last is inserted into the upper through its bottom opening. The last having been inserted into the upper, the treadle 584 is permitted to return to its initial position, thus permitting the return of the last support 708. The last pin 738 (Fig. 25) is then positioned in the socket 742 provided in the last by manual downward movement of the vertical sliding bar 740. The operator now depresses the clutch treadle a second time to start the second part of the power cycle of the machine. The order of the various operations of the machine during the second part of its cycle will be best understood by reference to the cam chart in Fig. 45. In this chart the cam-actuated motions of the operating parts are indicated by reference letters applied to the lines indicating the movements of the respective cams. At the beginning of the second part of the power cycle a slight downward movement is imparted to the last as indicated at $r$ on the cam chart. This motion insures a firm engagement of the insole 730 on the last bottom with the heel rest 706 and also brings the ratchet 848 (Fig. 25) into engagement with the detent 846, thereby holding the last pin assembly and therefore the last against movement forwardly of the upper during the power operation of the toe gripper. At the same time the lining grippers are swung forwardly as indicated at $m$. Preliminary to the forward movement of the lining grippers the detent 648 (Fig. 23) which holds the grippers closed on the work is disengaged by the cam motion $m$ but the detent 660 which holds the grippers at the limit of their downward movement remains in operative position in order to hold the lining grippers in a position in which they will not interfere with the downward movement of the counter wing supports 80 and 82 nor with the wiping movement of the side wipers 292 and 294. As soon as the motion $m$ of the lining grippers is completed the counter wing supports are moved toward each other and swung downwardly by the cam motion indicated at $p$ in order to provide clearance for the wiping movements of the side wipers 292 and 294. During the movements of the lining grippers and the counter wing supports the heel-embracing pad is moved toward the heel end of the shoe and closed against the shoe as indicated at $a$ and $c$, respectively. As the counter wing supports move inwardly and downwardly away from the shoe bottom the side wipers move inwardly a short distance as indicated at $j$ in order to support the counter in the position heightwise thereof in which the counter supports have located it. After this movement of the side wipers has been completed the toe gripper 78 is moved horizontally in a direction to stretch the upper lengthwise thereof as indicated at $y$ and the tension thus imparted to the upper is maintained until after the driving of the tacks which secure the lasted margin of the upper to the insole. It will be seen that the forward movement imparted to the upper by the toe gripper brings the lining at the heel portion of the shoe firmly into engagement with the heel end of the last and thus positions the heel portion of the upper for the downward wiping of the lining by the depression of the last which takes place immediately after the completion of the toe-gripper movement as indicated at $s$. It will be recalled that the downwiping action effected by the depression of the last has a rearward component of movement by reason of the operation of the bell crank lever 844 (Fig. 25) on the detent 846 during the downward movement of the head 780 which carries the last-depressing assembly. Thus there is provided a lining-wiping action by the last substantially in the direction of the upper portion of the back seam of the supported upper. During the depression of the last the central counter support begins its forward and downward movement, as indicated at $v$, to provide clearance for the downward movement of the last and for the forward movement of the heel end wiper. The depression of the last is limited by its engagement with the lasting wipers, all of which are partially advanced under the last before the last completes its downwiping movement, the initial wiping movement of the heel end wiper being indicated at $f$. During the downward wiping movement of the last the upper is held against downward misplacement by the heel-embracing pad which at this time has completed its bodily movement $a$ toward the shoe and has very nearly completed its closing movement $c$. The end wiper and the side wipers now complete their wiping movement as indicated at $g$ and $k$, respectively, and downward pressure is imparted to the last as indicated at $t$ in order to hold the last against upward movement during the tack-driving operation which occurs immediately thereafter, as indicated at $a'$. The cam motion $t$ operates against the spring 834 (Fig. 31), compressing said spring and thus increasing the pressure on the last. The return movement $b'$ of the tack-driving head occurs immediately after the tacks have been driven and is followed by the return movement $z$ of the toe gripper and upward movement $u$ of the last-depressing mechanism. At the same time the rearward movement $b$ and opening movement $d$ of the heel-embracing pad takes place. After the last-depressing mechanism has moved upwardly sufficiently to release the heavy pressure against the last the heel wipers are retracted as indicated at $h$ and $l$, respectively, whereupon the counter supports are returned to their initial positions, as indicated at $q$ and $w$, and finally the return movement $n$ of the lining grippers takes place. After the power cycle has been completed the operator disengages the detent 764 (Fig. 25) from the ratchet 766 and the spring 758 returns the sliding bar 740 to its initial position, disengaging the last pin 738 from the last and permitting the removal of the shoe from the machine.

While it is believed that the method above set forth is best adapted to the assembling of most types of uppers on their lasts, this method may be modified without departing from the present invention. For example, the counter may be positioned in the upper before the parts are mounted in the machine rather than placing the upper over the counter after the counter has been mounted in the machine as above described. In some types of work it may be found desirable to eliminate entirely the forward pull on the upper by the toe gripper and this may be done by merely withdrawing the toe gripper into a position in which it cannot grip the toe end of the upper during its rearward movement. When the toe gripper movement is dispensed with it may also be desirable to dispense with the tacks at the opposite sides of the heel portion of the shoe in order, for example, to permit this portion of the shoe to be stretched lengthwise of the last by means of a pulling-over machine. The elimination of the side tacks may conveniently be effected by preventing delivery of tacks from the hopper 1060 to the tack tubes which communicate with the side wipers. If the interior of the heel portion of the upper were operated on by a machine part rather than by a last, as herein illustrated, it would probably be desirable to eliminate all of the tacks and rely on the cement on the counter to secure the shoe parts in assembled position.

Having thus described the invention, what is claimed as new and desired to be secured by Letters Patent of the United States is:

1. In an assembling machine, means for supporting a loose counter without the aid of a heel form, and means for urging the heel portion of an upper against the outer face of the counter.

2. In an assembling machine, means for supporting a loose molded counter by engagement with its flange only, and rear-part pressing means for pressing the rear part of an upper against the outer face of the supported counter.

3. In an assembling machine, means for supporting a loose counter for the reception of the rear portion of an upper, and a heel-end-embracing pad, said supporting means and pad being relatively movable to press the rear part of an upper against the outer face of the counter.

4. In an assembling machine, means for supporting a loose molded counter by engagement with its flange only, a rear part embracing member for pressing the rear part of an upper against the outer face of the supported counter, such pressure being opposed by a member within the rear part of the upper, and means for lasting the rear part of the upper to a sole on said member.

5. In an assembling machine, means for supporting a counter in upright position for the reception of the rear part of an upper, a rear part embracing pad for pressing the shoe parts against a member within the rear part of the upper, and means for wiping the lasting margin of the rear part of the upper to the heel seat portion of an insole on said member.

6. In an assembling machine, means for supporting a loose counter for the reception of an upper, means for gaging the position of the upper heightwise thereof relatively to the counter, a rear part embracing pad, means for advancing the pad to press the rear end of the upper against the supported counter, such pressure being opposed by a last positioned within the upper, means for moving the opposite sides of the pad toward each other thereby to press the upper against the wings of the counter, and means for wiping the lasting margin of the rear part of the upper against an insole on the last bottom.

7. In an assembling machine, a series of work-supporting members provided respectively with means for supporting a flanged counter by engagement with its flange only, at least one of said members being provided with a gaging surface for positioning an upper heightwise thereof relatively to the counter, a rear part embracing member for pressing the shoe parts against a last in the upper, and lasting wipers for wiping the lasting margin of the rear part of the upper to an insole on the last bottom while the upper is held from movement heightwise of the last by said embracing member.

8. In an assembling machine, means for supporting a loose counter for the reception of an upper, a heel-end-embracing pad, a carrier in which the pad is removably mounted, means for advancing the carrier to cause the pad to press the heel end of an upper against the supported counter, and means for moving the opposite sides of the carrier toward each other thereby to cause the pad to press the upper against the wings of the counter.

9. In an assembling machine, means for supporting a loose counter, a heel-end-embracing pad, and a pair of pad containers in which the opposite sides of the pad are mounted, said containers being arranged for swinging movement to move the side portions of the pad toward each other thereby to press the heel portion of an upper against the wings of the supported counter, said containers being movable bodily widthwise of the supported counter in order to permit the pad to conform to the heel portion of the shoe.

10. In an assembling machine, means for supporting a loose counter without the aid of a heel form, and means for positioning an upper in predetermined relation to the counter heightwise thereof.

11. In an assembling machine, means for supporting in upright position a counter which has not been secured to its upper, and means for gaging the position of the upper heightwise of the counter.

12. In an assembling machine, means for supporting a loose molded counter by engagement with its flange only, and means for gaging the position of the heel portion of an upper heightwise thereof relatively to the counter.

13. In an assembling machine, supporting means constructed and arranged to support a counter before it has been positioned in its upper and to position the heel portion of an upper heightwise thereof relatively to the supported counter, and means for pressing said parts together.

14. In an assembling machine, a series of work-supporting arms provided, respectively, with means for supporting a flanged counter by engagement with its flange only, at least one of said arms being provided with a gaging surface for positioning an upper heightwise thereof relatively to the counter.

15. In an assembling machine, a series of work-supporting arms provided, respectively, with openings constructed and arranged to receive the flange of a molded counter, and provided also with gaging surfaces for positioning the heel portion of an upper heightwise thereof relatively to the counter.

16. In an assembling machine, means for supporting a loose counter without the aid of an inner form, means for positioning the heel portion of an upper heightwise thereof relatively to the counter, and grippers for engaging the lasting margin of the upper and holding the upper in position.

17. In an assembling machine, means for supporting a loose molded counter by engagement with its flange only, means for gaging the position of the rear part of an upper heightwise thereof relatively to the counter, and grippers for engaging the lasting margin of the rear part of the upper and holding it in position.

18. In an assembling machine, a series of members for supporting a loose molded counter by engagement with its flange only, upper-gaging surfaces provided in at least one of said members for positioning the rear part of an upper heightwise thereof relatively to the counter, and a series of gripper members for gripping the lasting margin of the upper against said counter-supporting members.

19. In an assembling machine, a series of arms constructed and arranged to support a loose molded counter by engagement with its flange only, and a series of gripper members constructed and arranged to grip the lasting margin of an upper against said counter-supporting arms.

20. In an assembling machine, a series of supporting arms constructed and arranged to support a loose molded counter by engagement with its flange only and provided with gaging surfaces for positioning the rear part of an upper heightwise thereof relatively to the supported counter, a series of carriers for said arms, and a series of slides mounted on the carriers, respectively, for movement to grip the lasting margin of the rear part of the upper against gripping surfaces provided in said work-supporting arms.

21. In an assembling machine, means for supporting a loose molded counter, means for pressing the rear portion of an upper against the outer face of the counter while the inner face of the counter is backed up by an inner form, means for disengaging the counter-supporting means from the counter, and a series of wipers for wiping the lasting margin of the upper against the flange of the counter.

22. In an assembling machine, means for supporting a loose molded counter for engagement with its flange only, gripper members for gripping the bottom margin of the upper against the counter-supporting means, an outer former for pressing the rear portion of an upper against the outer face of the counter while the counter is backed up by a last supported in the machine, means for retracting the counter-supporting means after the upper and counter have been engaged between the outer former and the last, and means for thereafter advancing the gripper members to wipe the lasting margin of the upper against the flange of the counter.

23. In an assembling machine, a series of work-supporting arms provided, respectively, with means for supporting a flanged counter by engagement with its flange only, an outer former for pressing the rear part of an upper against the outer face of the supported counter while the counter is backed up by an inner form, a series of wipers for wiping the lasting margin of the rear portion of the upper against the flange of the counter, and means for moving the work-supporting arms out of engagement with the flange of the counter and out of the path of movement of the wipers.

24. In an assembling machine, a series of work-supporting arms provided, respectively, with means for supporting a flanged counter by engagement with its flange only, an outer former for pressing the rear part of an upper against the outer face of the supported counter while the counter is backed up by an inner form, a series of wipers for wiping the lasting margin of the rear portion of the upper against the flange of the counter, and means for moving the work-supporting arms in the plane of the flange of the counter to disengage them from the counter and heightwise of the supported counter to remove them from the path of movement of the wipers.

25. In an assembling machine, a series of work-supporting arms provided, respectively, with means for supporting a flanged counter for engagement with its flange only, a series of gripper members for gripping the bottom margin of the rear part of an upper against said work-supporting arms, an outer former for pressing the rear part of the upper against the outer face of the counter, the counter being backed up by a last supported in the machine, means for moving the last rearwardly thereof toward the outer former, means for disengaging the work-supporting arms from the flange of the counter and moving them out of the plane of said flange, and means for advancing said gripper members to wipe the lasting margin of the upper against the flange of the counter.

26. In an assembling machine, means for supporting a loose molded counter, a resilient pad for pressing the rear portion of an upper against the outer face of the counter while the inner face of the counter is backed up by a last supported in the machine, a series of wipers for wiping the lasting margin of the upper against the flange of the counter, a driven shaft, connections from said shaft for actuating the pad, connections from said shaft for disengaging the counter-supporting means from the counter, and connections from said shaft for actuating the wipers.

27. In an assembling machine, a series of work-supporting arms provided, respectively, with means for supporting a flanged counter by engagement with its flange only, a resilient heel-end-embracing pad for pressing the rear part of an upper against the outer face of the supported counter while the counter is backed up by a last supported in the machine, a driven shaft, connections from said shaft for pressing said pad against the rear end of the upper, other connections from said shaft for closing said pad against the sides of the heel portion of the upper, and a series of wipers for wiping the lasting margin of the rear portion of the upper against the flange of the counter.

28. In an assembling machine, means for supporting a loose molded counter, means for pressing the rear portion of an upper against the outer face of the counter while the inner face of the counter is backed up by a last supported in the machine, means for wiping the lasting margin of the upper against the flange of the counter, and fastening-inserting means for securing said margin to an insole on the last bottom.

29. In an assembling machine, means for supporting a loose molded counter, means for supporting the heel portion of a last within the supported counter, a series of wipers for wiping the lasting margin of an upper against the flange of the counter, fastening-inserting means carried by the wipers, a driven shaft, and connections from the shaft for actuating said fastening-inserting means.

30. In an assembling machine, means for engaging and supporting a loose counter, means for positioning an upper relatively to the counter, and means for moving a form having the shape of the rear part of a foot heightwise thereof thereby to position it in predetermined heightwise relation to the upper.

31. In an assembling machine, means for engaging and supporting a loose counter, means for positioning an upper relatively to the counter, and means for moving a form having the shape of the rear part of a foot rearwardly thereof against the rear end of the upper.

32. In an assembling machine, means for engaging and supporting a loose molded counter, means for positioning an upper relatively to the counter, means for moving an inner form having the shape of the rear part of a foot heightwise thereof toward the flange of the counter thereby to position it in predetermined heightwise relation to the supported upper, and means for moving the form rearwardly thereof against the rear end of the upper.

33. In an assembling machine, means for engaging and supporting a loose molded counter, means for positioning an upper relatively to the supported counter, a last pin, a last support, means for actuating the last pin to move a last heightwise thereof against the last support, and means for moving the last pin in the direction of the length of the supported upper thereby to press the last against the rear end of the upper.

34. In an assembling machine, means for engaging and supporting a loose molded counter, means for positioning an upper relatively to the supported counter, a last pin, a last support, means for actuating the last pin to move a last heightwise thereof against the last support, means for moving the last pin in the direction of the length of the supported upper thereby to press the last against the rear end of the upper, and an outer former constructed and arranged to engage the rear part of the supported upper and to resist rearward movement of the last.

35. In an assembling machine, means for engaging and supporting a loose molded counter, an end-embracing member for frictionally engaging the rear part of an upper and pressing it against the supported counter, and means for moving a last which is loosely positioned in the upper toward the flange of the counter and toward the back seam portion of the upper thereby to locate the rear part of the last in predetermined relation to the supported upper.

36. In an assembling machine, means for engaging and supporting a loose molded counter, means for supporting a lined upper in predetermined relation to the supported counter heightwise thereof with the lining positioned within the counter, a heel-end-embracing pad for frictionally engaging the rear part of the supported upper and pressing it against the outer surface of the counter, and means for forcing a last which is loosely positioned within the supported upper heightwise of the upper and rearwardly thereof thereby to wipe the heel portion of the lining in the direction toward the counter flange.

37. In an assembling machine, means for supporting a loose counter and means for effecting lengthwise tension of an upper the rear part of which is arranged to embrace the supported counter and is held by the counter from movement forwardly thereof.

38. In an assembling machine, means constructed and arranged to support a loose molded counter by engagement with its flange only and to hold the counter against movement forwardly thereof, and gripping mechanism constructed and arranged to engage the toe end of an upper and to draw the upper lengthwise thereof to a limit determined by the engagement of the rear part of the upper with the supported counter.

39. In an assembling machine, means for engaging and supporting a loose molded counter, a gripper constructed and arranged to engage the toe portion of an upper the rear part of which is arranged to embrace the supported counter, manually operated means for first advancing the gripper into gripping position, then closing the gripper on the upper, and means operating automatically after the gripper has been closed on the upper to move the gripper in a direction to tension the upper lengthwise thereof.

40. In an assembling machine, means for engaging and supporting a loose molded counter, a gripper constructed and arranged to engage the toe portion of an upper the rear part of which is arranged to embrace the supported counter, manually operated means for first advancing the gripper into gripping position, then closing the gripper on the upper, means operating automatically after the gripper has been closed on the upper to move the gripper in a direction to tension the upper lengthwise thereof, and power-operated means operating thereafter to impart further lengthwise tension to the upper.

41. In an assembling machine, means for relatively positioning the rear part of a lined upper and a counter, and means for holding the rear part of the lining by its lasting margin while a form is introduced into the rear part of the supported upper.

42. In an assembling machine, means for relatively positioning the rear part of a lined upper and a counter, and means constructed and arranged to engage the lasting margin of the rear part of the lining, to tension the lining heightwise thereof and to hold the lining so tensioned while a form is introduced through the bottom opening of the supported upper and into the heel portion thereof.

43. In an assembling machine, means for relatively positioning the rear part of a lined upper and a supported counter heightwise thereof, and manually operated grippers constructed and arranged to engage the lasting margin of the rear part of the lining, to tension the lining heightwise thereof and to hold the lining so tensioned while a form is introduced through the bottom opening of the supported upper and into the heel portion thereof.

44. In an assembling machine, means for gaging the position of the rear part of a lined upper heightwise thereof relatively to a supported counter, grippers constructed and arranged to engage the lasting margin of the rear part of the lining, means for supporting the rear part of a last within the supported counter, manually operated means for first closing the lining grippers, then moving the grippers in a direction to tension the lining heightwise thereof and for moving the last-supporting means to provide clearance for the introduction of a last into a supported upper through the bottom opening thereof, latching mechanism for holding the grippers closed, and latching mechanism for holding the grippers against bodily return movement while permitting return movement of the last-supporting means.

45. In an assembling machine, means for positioning a cemented counter and the heel portion of a lined upper in determinate relation to each other heightwise thereof, and means for applying local pressure to the shoe parts in the region of the back seam throughout substantially the entire extent of said seam, said means comprising an outer presser member and cooperating means operating within the heel portion of the upper.

46. In an assembling machine, means for supporting a molded counter, means for positioning a lined upper heightwise thereof relatively to the counter, and means for applying local pressure to said shoe parts in the region of the back seam of the upper, said pressing means comprising a member constructed and arranged to engage the outer surface of the heel portion of the upper and cooperating means located within the upper.

47. In an assembling machine, means for supporting a cement-treated counter stiffener, means for positioning a lined upper heightwise thereof relatively to the counter stiffener, a last-engaging member movable to press a last against the upper in the region of the back seam, and a heel-end-embracing pad movable bodily against the rear portion of the upper thereby to apply local pressure to the upper in the region of the back seam, the end portions of the pad being movable thereafter to apply pressure to the opposite sides of the rear portion of the upper.

48. In an assembling machine, means for supporting a cement-treated counter stiffener, means for positioning a lined upper heightwise thereof relatively to the counter stiffener, a last-engaging member movable to press a last against the upper in the region of the back seam, a heel-end-embracing pad movable bodily against the rear portion of the upper thereby to apply local pressure to the upper in the region of the back seam, and means operating on the side portions of the pad during its movement against the back of the upper to prevent engagement of the side portions of the pad with opposite sides of the rear portion of the upper.

49. In a shoe machine, means for moving a heel-end former within a supported upper in one direction heightwise of the upper, means for positively holding said former from movement in the opposite direction, and means constructed and arranged to engage the outer surface of the rear portion of the upper thereby to hold the upper from movement heightwise thereof during the heightwise movement of the heel-end former.

50. In a shoe machine, means for moving a heel-end former within a supported upper in one direction heightwise of the upper, means for positively holding said former from movement in the opposite direction, and means constructed and arranged to engage the outer surface of the rear portion of the upper and by its frictional contact therewith to hold the upper from movement heightwise thereof during the heightwise movement of the heel-end former.

51. In a shoe machine, means for moving a heel-end former heightwise of a supported upper toward its overlasting margin, and a heel-end-embracing gripper having a frictional upper-engaging surface and movable into gripping engagement with the supported upper thereby to hold the upper against movement heightwise thereof during the heightwise movement of the heel-end former.

52. In a shoe machine, means for supporting the heel-end portion of an upper, yielding means for positioning heightwise of the supported upper a last loosely mounted therein, a last pin, means for moving the last pin heightwise of the last thereby to move the last toward the lasting margin of the supported upper, and means for moving the last pin lengthwise of the last toward the rear of the supported upper.

53. In a shoe machine, means for supporting the rear part of an upper in upright position, a yielding support for the rear portion of a last loosely mounted in the supported upper, a last pin, a carrier therefor in which the last pin is normally held retracted, the last pin being movable in its carrier into last-engaging position, means for moving the carrier toward the top margin of the supported upper and rearwardly of the upper thereby to impart like movements to the last, and means for holding the rear portion of the upper from heightwise movement during the movement of the last.

54. In a shoe machine, means for supporting the rear part of an upper in upright position, a yielding support for the rear portion of a last loosely mounted in the supported upper, a last pin, a carrier therefor in which the last pin is normally held retracted, the last pin being movable in its carrier into last-engaging position, means for moving the carrier toward the top margin of the supported upper and rearwardly of the upper thereby to impart like movements to the last, and a resilient heel-end-embracing pad for frictionally engaging the rear portion of the supported upper and holding it from heightwise movement during the movement of the last.

55. In an assembling machine, means for supporting a lined upper, a last pin, a slide on which the last pin is mounted for engagement within the last pin hole of a last positioned in the upper, a heel-end-embracing pad, means for moving the pad bodily against the rear end of the supported upper, means operating thereafter to close the pad on the rear portion of the upper, and means operating on the last pin slide to move the last rearwardly thereof and heightwise thereof toward the lasting margin of the upper.

56. In an assembling machine, a heel-end-embracing pad constructed and arranged to press the rear portion of an upper against the rear portion of a last and by its frictional engagement with the upper to hold the upper from movement heightwise thereof, means constructed and arranged to operate against the flange of a molded counter in the upper to hold the counter from movement heightwise thereof, and means for moving the last rearwardly thereof and heightwise thereof toward the flange of the counter.

57. In an assembling machine, means for supporting a lined upper and a counter in upright position, a heel-end-embracing pad for pressing the rear portion of the shoe parts against a last positioned in the supported upper and by its frictional engagement with the upper to hold the upper from movement heightwise thereof, means for moving the last heightwise thereof and rearwardly thereof thereby to wipe the lining toward the flange of the counter, and shoe-bottom engaging plates whereby the counter is held from downward movement during the depression of the last.

58. In an assembling machine, means for supporting a lined upper and a flanged counter in upright position, a last pin, a slide on which the last pin is mounted and from which it projects for engagement within the last-pin hole of a last in the supported upper, a heel-end-embracing pad, a plurality of heel-lasting wipers, locking means constructed and arranged to be actuated by a preliminary movement of the last-pin slide to lock said slide from movement toward the toe end of the supported upper, and power-actuated means operating successively to impart a preliminary movement to said slide thereby to actuate said locking means, to advance the lasting wipers, to advance the heel-end-embracing pad bodily against the rear end of the upper, and to move the last-pin slide in a direction to move the last heightwise thereof and rearwardly thereof, such movement being terminated by the lasting wipers.

59. In an assembling machine, means for moving a heel-end former heightwise of a supported upper to position it within the heel portion of the upper, means operating during the movement of the heel-end-former heightwise of the upper to move it rearwardly of the upper, a heel-end-embracing member for pressing the heel portion of the upper against the heel-end former and by its frictional engagement with the upper to hold the upper from movement heightwise thereof, and means constructed and arranged to prevent movement of a counter stiffener in the upper heightwise thereof.

60. In an assembling machine, means for moving a heel form downwardly into the heel portion of an upper supported in upright position, means operating during the downward movement of the heel form to move it rearwardly of the upper, a heel-end-embracing pad for pressing the heel portion of the upper against a molded counter contained therein and by its frictional engagement with the upper to hold the upper from movement heightwise thereof during the downward movement of the heel form, and means providing a non-yielding support for holding the counter from downward misplacement during the downward movement of the heel form.

61. In an assembling machine, a series of plates constructed and arranged to wipe the lasting margin of the heel portion of a lined upper supported in upright position against an insole on a last bottom, means for positioning a molded counter with the counter flange adjacent to the wiping plane of said plates, means for positioning the upper in predetermined relation to the counter heightwise thereof, means operating on a last to cause it to wipe the heel portion of the lining heightwise of the upper against the flange of the counter after the plates have been advanced sufficiently to support the counter, and a heel-end-embracing member for pressing the heel portion of the upper against the counter and by its frictional engagement with the upper to hold the upper from downward movement during the wiping of the lining.

62. In an assembling machine, means for supporting a lined upper for the reception of a heel form, means for moving the heel form heightwise of the upper toward its lasting margin, and means for gripping the lasting margin of the lining during the introduction of the heel form into the upper.

63. In an assembling machine, means for supporting a lined upper for the reception of a heel form, means for moving a heel form rearwardly of the supported upper and heightwise thereof toward its lasting margin, and a pair of grippers constructed and arranged to engage the lasting margin of the rear portion of the lining, said grippers being movable in a direction to tension the lining heightwise thereof.

64. In an assembling machine, means for supporting a counter, means for supporting a lined upper relatively to the counter, grippers constructed and arranged to engage the lasting margin of the heel portion of the lining, means for moving the grippers in a direction to tension the rear portion of the lining, and a last-engaging member movable heightwise of the supported upper toward its lasting margin and rearwardly of the upper thereby to wipe the rear part of a last against the rear part of the lining.

65. In an assembling machine, means for holding a lined upper against heightwise misplacement, and grippers constructed and arranged to engage the lasting margin of the lining only and to tension the lining relatively to the upper.

66. In an assembling machine, lining grippers constructed and arranged to engage the lasting margin of the lining at opposite sides of its rear portion, means for first closing the grippers and then moving them in a direction to tension the rear portion of the lining heightwise thereof, means for holding the grippers closed, and means for disengaging the grippers from the lining.

67. In an assembling machine, means for supporting a lined upper off its last, means constructed and arranged to engage the rear portion of the lasting margin of the lining only and to hold the lining while a last is introduced into the rear portion of the supported upper through the bottom opening thereof.

68. In an assembling machine, means for supporting the rear portion of a lined upper and a counter positioned therein, grippers constructed and arranged to engage the lasting margin of the heel portion of the lining only and to tension the lining heightwise of the supported upper, and means operating on said grippers to hold them from return movement while the rear portion of a last is introduced into the rear portion of the supported upper through the bottom opening thereof.

69. In an assembling machine, means for supporting a lined upper for the reception of a last, a support for the rear portion of a last positioned in the supported upper, grippers constructed and arranged to engage the lasting margin of the rear portion of the lining only, and means for operating the grippers to tension the lining heightwise thereof and operating simultaneously to move the last support out of its operative position thereby to provide clearance for the introduction of the rear portion of a last into the rear portion of the supported upper through the bottom opening thereof.

70. In an assembling machine, means for supporting a lined upper for the reception of a last, a vertically movable support for the rear portion of a last positioned within the supported upper, grippers constructed and arranged to engage the lasting margin of the rear portion of the lining only, a treadle, connections from the treadle for closing the lining grippers and thereafter moving them in a direction to tension the lining heightwise thereof, and connections from said treadle for moving the last support out of its operative position thereby to provide clearance for the introduction of the rear portion of a last into the rear portion of the supported upper through the bottom opening thereof.

71. In a shoe machine, means for moving a form into a supported upper provided with a molded counter, means constructed and arranged to engage the outer surface of the rear portion of the upper thereby to hold the upper from movement heightwise thereof during the movement of the heel form, and means for wiping the lasting margin of the rear portion of the upper against the flange of the counter.

72. In a shoe machine, means for moving an inner shoe form heightwise of a supported upper and a molded counter positioned therein, means constructed and arranged to engage the outer surface of the rear portion of the upper and by its frictional contact therewith to hold the upper from movement heightwise thereof during the heightwise movement of the form, and means for wiping against the flange of the counter that portion of the lasting margin of the supported upper in the region of the back seam and the portions of the lasting margin in the regions of the opposite ends of the heel breast line.

73. In a shoe machine, means for supporting the rear portion of an upper, yielding means for positioning heightwise of the supported upper a last loosely mounted therein, means for moving the last and its support into a predetermined position heightwise of the supported upper, and a plurality of lasting members constructed and arranged to operate on the rear portion of the lasting margin of the supported upper.

74. In a shoe machine, means for supporting the rear portion of an upper, yielding means for positioning heightwise of the supported upper a last loosely mounted therein, means for moving the last and its support into a predetermined position heightwise of the supported upper, a heel-end-embracing gripper having a frictional upper-engaging surface and movable into gripping engagement with the supported upper thereby to hold the upper against movement heightwise thereof during the heightwise movement of the last, and a plurality of lasting wipers constructed and arranged to operate on the rear portion of the lasting margin of the supported upper.

75. In a shoe machine, means for moving a last heightwise of a supported upper, means constructed and arranged to engage the outer surface of the rear portion of the upper thereby to hold the upper from movement heightwise thereof during the heightwise movement of the last, and means for securing the lasting margin of the rear portion of a supported upper to an insole on the last bottom.

76. In a shoe machine, means for supporting the rear portion of an upper, a last pin, means for moving the last pin heightwise of the upper and rearwardly thereof thereby to impart like movements to a last loosely mounted in the supported upper, and fastening-inserting means for securing the lasting margin of the rear portion of the upper to an insole on the last bottom.

77. In a shoe machine, means for supporting the rear portion of an upper, a last pin, means for moving the last pin heightwise of the upper and rearwardly thereof thereby to impart like movements to a last loosely mounted in the supported upper, a heel-end-embracing gripper member movable into gripping engagement with the supported upper thereby to hold the upper against movement heightwise thereof during the heightwise movement of the last, a plurality of heel-seat-lasting wipers, and fastening-inserting mechanism operating while the wipers remain at the limit of their wiping movement for securing the lasting margin of the upper to an insole on the last bottom.

78. In a shoe machine, means for supporting the rear portion of an upper, a last pin, means for moving the last pin heightwise of the upper and rearwardly thereof thereby to impart like movements to a last loosely mounted in the supported upper, a heel-end-embracing gripper member movable into gripping engagement with the supported upper thereby to hold the upper against movement heightwise thereof during the heightwise movement of the last, a plurality of heel-seat-lasting wipers, and fastening-inserting mechanism, including tack-driving members carried by the lasting wipers, respectively, operating while the wipers remain at the limit of their wiping movement for securing the lasting margin of the upper to an insole on the last bottom.

79. In a shoe machine, means for moving a last heightwise thereof relatively to a supported upper, means for tensioning the upper lengthwise thereof, means for holding the last from forward movement during the tensioning of the upper, and fastening-inserting means for securing the rear portion of the upper to an insole on the last bottom while the upper is held under tension.

80. In a shoe machine, means for supporting the rear portion of an upper, a last pin movable heightwise of the supported upper thereby to move a last heightwise of the supported upper toward its lasting margin, grippers for supporting the toe end of the upper, means for effecting relative movement of the grippers and the last pin thereby to tension the upper lengthwise thereof, and fastening-inserting means for securing the rear portion of the upper to an insole on the last bottom while the upper is held under tension.

81. In a shoe machine, means including a toe gripper for supporting an upper off its last by engagement with its lasting margin only, a last pin constructed and arranged to engage a last loosely positioned within the supported upper, and means for effecting relative movement of the last pin and the toe gripper lengthwise of the supported upper thereby to tension the upper lengthwise thereof.

82. In a shoe machine, means for supporting an upper off its last by engagement with its lasting margin only comprising a toe gripper the jaws of which in closing on the work have relative movement heightwise of an upper in the machine, and a heel end gripper and side grippers the jaws of which in closing on the work move perpendicularly to the lasting margin of the rear portion of an upper in the machine.

83. In a shoe machine, means for supporting an upper by engagement with its lasting margin only comprising a toe gripper the jaws of which in closing on the work have relative movement heightwise of an upper in the machine, a heel-end gripper and breast line grippers, the jaws of said heel-end gripper and breast line grippers in closing on the work having relative movement perpendicular to the lasting margin of an upper in the machine, means for adjusting the toe gripper lengthwise of the upper, and means for adjusting the breast line grippers widthwise of the upper.

84. In a shoe machine, means for supporting an upper by engagement with its lasting margin only comprising a toe gripper the jaws of which in closing on the work have relative movement heightwise of an upper in the machine, a heel-end gripper and breast line grippers, the jaws of said heel-end gripper and breast line grippers in closing on the work having relative movement perpendicular to the lasting margin of an upper in the machine, a counter holder carrier by the forward jaw of the end gripper, and cooperating counter holders carried by the inner jaws of the breast line grippers.

85. In a shoe machine, means for tensioning an upper on its last lengthwise thereof from its toe end, means for holding the last against forward movement during the tensioning of the upper comprising a last-engaging member, a carrier therefor, and means actuated by movement of the carrier toward the last to hold said last-engaging member against movement forwardly of the upper.

86. In an assembling machine, means for pulling an upper forwardly thereof against the heel end of a last in the upper and means for holding the last against forward movement, during the pulling of the upper, comprising a last pin, a carrier for the last pin movable lengthwise and heightwise of the last, and a member constructed and arranged to be operated by movement of the carrier in a direction to press the last into the upper to lock the last against movement forwardly thereof.

87. In an assembling machine, means for supporting an upper in upright position, a toe gripper, a last pin, a slide on which the last pin is mounted and from which the last pin projects downwardly, means for locking the slide against movement toward the toe end of the upper, power-operated means for moving the slide downwardly thereby to operate said locking means, and power-actuated means operating thereafter to move the toe gripper in a direction to tension the upper lengthwise thereof.

88. In an assembling machine, means for supporting a lined upper and a flanged counter in upright position, a toe gripper, a last pin, a last-pin slide from which the last pin projects downwardly for engagement within the last-pin hole of a last positioned within the supported upper, manually actuated means operating on the toe gripper to tension the upper lengthwise thereof against the supported counter thereby to hold the upper for the reception of a last, means for locking the last-pin slide against movement toward the toe end of the upper, power-operated means for imparting a preliminary downward movement to said slide thereby to operate said locking means, and power-actuated means operating threafter on the toe gripper to stretch the upper lengthwise thereof against the heel end of the last.

89. In an assembling machine, means for supporting a lined upper and a flanged counter in upright position, a toe gripper, a last pin, a last-pin slide from which the last pin projects downwardly for engagement within the last-pin hole of a last positioned within the supported upper, manually actuated means operating on the toe gripper to tension the upper lengthwise thereof against the supported counter thereby to hold the upper for the reception of a last, means for locking the last-pin slide against movement toward the toe end of the upper, power-operated means for imparting a preliminary downward movement to said slide thereby to operate said locking means, power-actuated means operating thereafter on the toe gripper to stretch the upper lengthwise thereof against the heel end of the last, and power-operated means operating on the slide to impart further downward movement to the last thereby to wipe the heel portion of the lining downwardly against the flange of the counter.

90. In a shoe machine, a pair of grippers including a gripper jaw constructed and arranged to engage the inner surface of the rear portion of the lasting margin of an upper, and means carried by said jaw for supporting a molded counter by engagement with its flange.

91. In a shoe machine, a pair of grippers including a gripper jaw constructed and arranged to engage the inner surface of the rear portion of the lasting margin of an upper supported in upright position, said jaw being provided with a surface for supporting a flanged counter positioned within the supported upper, and means projecting upwardly from the counter-supporting surface of the gripper jaw for gaging the position of the counter flange widthwise thereof on said surface.

92. In a shoe machine, a pair of grippers including a gripper jaw constructed and arranged to engage the inner surface of the rear portion of the lasting margin of an upper, said jaw being provided with means for engaging both surfaces and the edge of the flange of a molded counter positioned within the supported upper.

93. In a shoe machine, a pair of grippers including a gripper jaw constructed and arranged to engage the inner face of the lasting margin of the rear portion of an upper, an arm on which the gripper jaw is mounted, said arm having a surface for gaging the position of an upper heightwise thereof, and means carried by said arm for positioning a molded counter heightwise thereof relatively to the supported upper.

94. In a shoe machine, a pair of grippers including a gripper jaw constructed and arranged to engage the inner face of the lasting margin of the rear portion of an upper, and an arm on which the gripper jaw is mounted, said arm having a surface for gaging the position of an upper heightwise thereof and having an extension of said gripper jaw in which there is provided a narrow groove constructed and arranged to receive the flange of a loose counter thereby to support the counter for the reception of an upper.

95. In a shoe machine, gripping means comprising an inner jaw constructed and arranged to engage the inner face of the lasting margin of an upper, an outer jaw constructed and arranged to engage the outer face of said margin, a carrier for said jaws, said inner jaw being movable heightwise of the upper out of the path of movement of the outer jaw thereby to provide clearance for further movement of the outer jaw to wipe the lasting margin against an insole on the bottom of a last in the upper.

96. In a shoe machine, means for gripping the lasting margin of an upper comprising an inner jaw constructed and arranged to engage the inner face of said margin, an outer jaw constructed and arranged to engage the outer face of said margin, a carrier in which both jaws are mounted, means for advancing the outer jaw into gripping relation to the inner jaw while the inner jaw remains stationary, and means operating on the inner jaw to move it out of gripping relation to the outer jaw and then to move it out of the path of movement of the outer jaw thereby to provide clearance for further movement of the outer jaw.

97. In a shoe machine, means for gripping an upper by its lasting margin comprising an inner gripper jaw constructed and arranged to engage the inner face of the lasting margin of an upper, an outer jaw constructed and arranged to engage the outer face of said margin, an arm on which said inner jaw is mounted, a slide on which said arm is pivoted, a slide on which said outer jaw is formed, a carrier for said slides, means for moving said slide to open the gripper jaws, and means operating during said movement of said slide for swinging the arm heightwise of the upper thereby to provide clearance for movement of the outer gripper jaw to wipe said lasting margin against the margin of an insole on the bottom of a last in the upper.

98. In a shoe machine, a lasting wiper, a gripper jaw constructed and arranged to engage the inner surface of the lasting margin of an upper thereby to grip said margin against the wiper, an arm on which the gripper member is mounted, a slide to which said arm is pivoted, a tail projecting from said arm, yielding means operating on said arm to hold the gripper jaw in the path of movement of the wiper, and means constructed and arranged to engage the tail portion of said arm during the gripper-retracting movement of said slide thereby to move the gripper jaw out of the path of movement of the wiper.

99. In a shoe machine, gripping means comprising an inner gripper jaw constructed and arranged to engage the inner surface of the lasting margin of an upper, an arm on which said jaw is mounted, means mounted on said arm for holding a molded counter by engagement with the flange thereof, an outer gripper jaw constructed and arranged to engage the outer face of said margin, and fastening-inserting means carried by said outer gripper jaw.

100. In a shoe machine, gripping means comprising an inner gripper jaw constructed and arranged to engage the inner surface of the lasting margin of an upper, an arm on which said jaw is mounted, means mounted on said arm for holding a molded counter by engagement with the flange thereof, an outer gripper jaw constructed and arranged to engage the outer face of said margin, fastening-inserting means carried by said outer gripper jaw, means operating on the inner gripper jaw to open the grippers and then to move said gripper jaw out of the path of movement of the outer gripper jaw, means operating thereafter on the outer gripper jaw to wipe the lasting margin against the margin of an insole on the bottom of a last in the upper, and fastening-driving means constructed and arranged to operate on the fastening-inserting means carried by the outer gripper jaw to drive a fastening through the overlasted margin and the insole.

101. In a shoe machine, means for gripping an upper by its lasting margin comprising an inner gripper member constructed and arranged to engage the inner surface of said margin, a projection on said gripper member provided with a narrow groove constructed and arranged to receive the flange of a molded counter, an outer gripper jaw constructed and arranged to engage the outer surface of said margin, said outer-gripper jaw being provided with a tack-receiving opening, a tack-driving pin mounted in said jaw, a tack-way whereby tacks are delivered to the opening in said gripper jaw and means for effecting alinement of the tack-way and the opening in said gripper jaw at the limit of retraction of said jaw.

102. In a shoe machine, a gripper for operating on an upper supported in the machine comprising a pair of gripper jaws normally held open, means for closing the gripper jaws and then imparting bodily movement thereto, means for holding the gripper closed, means for holding the gripper against return bodily movement, means for rendering the first-mentioned holding means inoperative, and means for moving the open gripper out of the path of its operative movement.

103. In a shoe machine, a gripper for operating on a shoe supported in the machine comprising a pair of gripper jaws normally held open, means for first closing the gripper jaws on the work and then moving the gripper in a direction to operate on the work, a latch for holding the gripper jaws closed, means for rendering said latch inoperative while the gripper remains at the limit of its operative movement, and means for moving the gripper out of the path of its operative movement thereby to provide clearance for further operations on the supported shoe.

104. In a shoe machine, a gripper for operating on an upper supported in the machine comprising a pair of gripper jaws normally held open, manually operated means for first closing the gripper jaws on the work and then moving the gripper bodily in a direction to operate on the work, a latch for holding the gripper closed, another latch for holding the gripper from return bodily movement, power-operated means for rendering the first-mentioned latch inoperative and for thereafter moving the open gripper out of the path of its operative movement, and means operating during the return of the gripper to its path of operative movement for rendering the other latch inoperative.

105. In a shoe machine, a gripper for operating on an upper supported in the machine comprising a pair of gripper jaws normally held open, a carrier on which the gripper jaws are mounted, a slide on the carrier, means operating on the slide to effect closing movements of the gripper jaws, manually operated means for moving the carrier in a direction to impart operative movement to the gripper, means for holding the slide from movement toward the gripper, and means for effecting a limited return movement of the carrier thereby to permit the gripper to open without returning to its initial position.

106. In a shoe machine, a plurality of grippers for tensioning the work heightwise thereof, said grippers each comprising a pair of gripper jaws normally held open, a carrier for the grippers, manually operated means for moving the carrier heightwise of the supported upper, yielding means operating during the first stage of the advancement of the carrier to close the grippers upon the work, means for rendering said gripper-closing means ineffective during a partial return movement of the carrier thereby permitting the grippers to open without returning to their initial positions, and means for moving the grippers out of their respective paths of operative movement thereby to provide clearance for further operations on the supported upper.

107. In a shoe machine, a gripper for operating on a shoe supported in the machine comprising a pair of gripper jaws normally held open, a carrier on which the gripper jaws are mounted, a spring for closing the gripper jaws, a slide on the carrier between the spring and the gripper jaws, said slide having a connection to the carrier permitting limited movement of the slide on the carrier toward and from the grippers, a latch operating on the carrier to hold the gripper jaws closed, and a latch for operating on the slide for holding the grippers at the limit of their movement with the carrier while permitting movement of the carrier relatively to the slide sufficient to permit opening movement of the gripper.

108. In a shoe machine, a gripper for operating on a shoe supported in the machine comprising a pair of gripper jaws normally held open, a carrier on which the gripper jaws are mounted, a spring for closing the gripper jaws, a slide on the carrier between the spring and the gripper jaws, said slide having a connection to the carrier permitting limited movement of the slide on the carrier toward and from the grippers, a latch operating on the carrier to hold the gripper jaws closed, a latch operating on the slide to hold the grippers at the limit of their movement with the carrier while permitting movement of the carrier relatively to the slide sufficient to permit opening movement of the grippers, power-operated means for unlatching the carrier and for swinging the carrier thereby to move the gripper bodily from its path of operative movement after the jaws have opened, power-operated means for returning the carrier, and means operating automatically during the return of the carrier to unlatch the slide.

109. In a shoe machine, an end gripper comprising a pair of gripping jaws movable lengthwise of a supported upper, manually operated means for moving the gripper into upper-gripping position, manually operated means operating while the gripper is being advanced into upper-gripping position to close the gripper jaws on the upper, and means operating after the gripper jaws have closed on the upper to move the gripper in a direction to tension the upper lengthwise thereof.

110. In a shoe machine, an end gripper comprising a pair of gripping jaws movable lengthwise of a supported upper, manually operated means for moving the gripper into upper-gripping position, toggle mechanism for closing the gripper jaws and holding them in closed position, manually operated means for actuating the toggle mechanism to cause the gripper jaws to engage the upper after the gripper has been advanced into upper-gripping position, and means operating after the gripper jaws have closed on the upper to move the gripper in a direction to tension the upper lengthwise thereof.

111. In a shoe machine, a gripper for engaging an end portion of an upper and tensioning the upper lengthwise thereof comprising a pair of gripper jaws, a treadle, connections from the treadle to the gripper for advancing the gripper into gripping position, connections from the treadle for closing the gripper jaws on the work, and means operating automatically after the gripper jaws have closed on the work to move the gripper in a direction to tension the upper.

112. In a shoe machine, a gripper for engaging an end portion of an upper and tensioning the upper lengthwise thereof comprising a pair of gripper jaws, a treadle, connections from the treadle to the gripper for advancing the gripper into gripping position, connections from the treadle for closing the gripper jaws on the work, and actuating means energized by the depression of the treadle for moving the gripper in a direction to tension the upper after the gripper jaws have closed on the work.

113. In a shoe machine, a gripper for tensioning an upper lengthwise thereof comprising a pair of gripper jaws, a carrier therefor, a treadle, connections from the treadle to the carrier for advancing the gripper into gripping position, connections from the treadle to the gripper for closing the gripper jaws, means actuated by the treadle for breaking the connections from the treadle to the carrier after the gripper jaws have closed on the work, and a spring energized by the depression of the treadle for moving the gripper in a direction to tension the upper.

114. In an assembling machine, means for supporting a loose counter, a gripper for engaging the toe end of an upper the heel portion of which embraces the supported counter and for tensioning the upper lengthwise thereof, said gripper comprising a pair of gripper jaws, means for closing the jaws and holding them in closed position, a carrier for the gripper assembly movable lengthwise of the supported upper, means, including a breakable connection, for advancing the carrier to position the gripper in gripping position, means operating to close the gripper jaws on the upper, means for breaking said breakable connection, and yielding means operating thereafter to move the carrier in a direction to tension the upper lengthwise thereof against the back of the supported counter.

115. In a shoe machine, an end gripper comprising a pair of gripper jaws movable lengthwise of a supported upper, means for moving the gripper into upper-gripping position, means operating as the gripper is advanced into upper-gripping position to close the gripper jaws on the upper, an actuator for closing and opening the gripper, a latch for holding the actuator against gripper-opening movement, and means for unlatching the actuator at a predetermined time in the machine cycle.

116. In a shoe machine, a toe gripper comprising a pair of gripper jaws movable lengthwise of a supported upper to tension the upper lengthwise thereof, a treadle, connections from the treadle for closing the gripper jaws on the upper, a latch for holding the treadle against retraction, and power-operated means for unlatching the treadle at a predetermined time in the machine cycle.

117. In a shoe machine, a gripper for tensioning an upper lengthwise thereof comprising a pair of gripper jaws, a carrier therefor, a treadle, connections from the treadle to the carrier for advancing the gripper into gripping position, connections from the treadle to the gripper for closing the gripper jaws after the gripper has been advanced into gripping position, means actuated by the treadle for breaking the connections from the treadle to the carrier after the gripper jaws have closed on the work, means energized by the depression of the treadle for moving the gripper in a direction to tension the upper, a latch for holding the treadle against retraction, and manually-operated means for unlatching the treadle at the will of the operator.

118. In an assembling machine, means for supporting a loose counter, a toe gripper movable lengthwise of an upper the rear portion of which is arranged to embrace the supported counter, and a pair of adjustable stops against which the gripper may be positioned for operating alternatively on right and left shoes.

119. In an assembling machine, means for tensioning a supported upper lengthwise thereof comprising a toe gripper, a slide on which the gripper is mounted, a carrier within which the slide is movable widthwise of a supported upper for adjusting the gripper for right and left shoes, and means for locating the gripper widthwise of the upper comprising a stop carried by the slide and cooperating abutment members mounted on the carrier.

120. In an assembling machine, means for tensioning a supported upper lengthwise thereof comprising a toe gripper, a slide on which the gripper is mounted, a carrier within which the slide is movable widthwise of a supported upper for adjusting the gripper for right and left shoes, and means for adjusting the carrier lengthwise of the upper.

121. In an assembling machine, means for tensioning a supported upper lengthwise thereof comprising a toe gripper, a slide on which the gripper is mounted, a carrier within which the slide is movable widthwise of a supported upper for adjusting the gripper for right and left shoes, and means for adjusting the gripper heightwise of the upper.

122. In a shoe machine, an end gripper, a slide on which the gripper is mounted, a carrier within which the slide is adjustable widthwise of a shoe in the machine, and a post on which said carrier is mounted and on which the carrier is adjustable to vary the position of the gripper heightwise of the supported shoe, said post being movable in a direction to provide adjustment of the gripper lengthwise of the supported shoe.

123. In a shoe machine, means for supporting an upper and a last positioned therein, means for holding the last from movement lengthwise thereof, an end-embracing pad, containers for the opposite side portions of the pad constructed and arranged for movement to close the pad upon the supported upper, a slide on which the containers are mounted, said slide being constructed and arranged for movement lengthwise of the supported upper.

124. In a shoe machine, an end-embracing pad, containers in which the opposite side portions of the pad are mounted, a carrier on which said containers are pivoted, members mounted on the carrier and operating on the containers to close the pad on a shoe in the machine.

125. In a shoe machine, an end-embracing pad, a pair of containers in which the opposite side portions of the pad are mounted, a carrier for said containers, a pair of members mounted on the carrier and operating on the adjacent ends of the containers, and means operating on said members to urge the adjacent ends of said containers toward each other.

126. In a shoe machine, an end-embracing pad, a pair of containers in which the opposite side portions of the pad are mounted, a carrier for said containers, a pair of members mounted on the carrier and pivoted to the adjacent ends of the containers, and means operating on said members to urge the adjacent ends of said containers toward each other while permitting said containers to separate as the pad closes on a shoe thereby to permit the pad to conform to the shape of the shoe.

127. In a shoe machine, a resilient end-embracing pad having formed in its shoe-engaging face the general shape of an end portion of a shoe, a pair of containers for said pad, a carrier for said containers, a pair of levers mounted in said carrier and connected to the adjacent end portions of the containers, and yielding means operating on said levers to urge the adjacent end portions of the containers toward each other.

128. In a shoe machine, a resilient end-embracing pad having formed in its shoe-engaging face the general shape of an end portion of a shoe, a pair of containers for said pad, a carrier for said containers, a pair of levers mounted in said carrier and connected to the adjacent end portions of the containers, yielding means operating on said levers to urge the adjacent end portions of the containers toward each other, and means for positioning said containers and the pad mounted therein in alinement with a shoe in the machine.

129. In a shoe machine, an end-embracing pad, a pair of containers within which the opposite side portions of the pad are loosely mounted, a carrier for said containers, said carrier being constructed and arranged for sliding movement lengthwise of a shoe in the machine, power-operated means for advancing the carrier to press the pad against an end of the supported shoe, and power-operated means operating on said containers to close the pad on the end portion of the shoe.

130. In a shoe machine, a resilient end-embracing pad, a pair of containers in which the pad is removably mounted, a carrier for the containers constructed and arranged for movement lengthwise of a shoe in the machine, a pair of levers mounted in said carrier and pivoted to adjacent ends of said containers, yielding means operating on said levers to urge the adjacent ends of said containers toward each other, power-operated means operating on the carrier to advance the pad into shoe-engaging position and to press the pad against an end portion of the shoe, and power-operated means operating on said containers to swing them about their pivotal connections with said levers thereby to close the pad on the shoe.

131. In a shoe machine, end-embracing means, containers for said end-embracing means constructed and arranged for movement to cause said means to embrace an end of a shoe in the machine, a carrier for said containers, and cooperating means provided in the carrier and in the containers for positioning the containers relatively to the carrier widthwise of a shoe in the machine when the end-embracing means is in its open position, said positioning means being inoperative when the end-embracing means is closed on the shoe.

132. In a shoe machine, an end embracer, a pair of containers in which said end embracer is mounted, a carrier for the containers, and abutment members provided in the containers and the carrier, respectively, said abutment members operating when the end embracer is in its open position to position the containers widthwise of the carrier, said abutment members becoming inoperative as the containers begin to move in a direction to close the end embracer on a shoe in the machine.

133. In a shoe machine, an end embracer, a pair of containers in which the opposite side portions of the end embracer are mounted, a carrier for said containers, abutment members provided in the containers, respectively, and an abutment member in the carrier constructed and arranged for engagement with the abutment members in the containers, a pair of members on the carrier for supporting the containers, respectively, and positioning the abutments on the containers against the abutments on the carrier thereby to position the end embracer widthwise of the carrier, and means operating on the containers to close the end embracer on the work and simultaneously to disengage the abutments on the containers from the abutment on the carrier thereby permitting the end embracer to adjust itself to the work widthwise thereof.

134. In a shoe machine, an end-embracing pad, a pair of containers in which the opposite side portions of the pad are mounted, said containers being constructed and arranged for rolling motion against each other to close the pad on the work, a carrier for said containers, projections on the containers, respectively, and a stop on the carrier against which said projections abut when the pad is in its open position and from which said projections are disengaged by rolling motion of the containers upon each other to close the pad on the work.

135. In a shoe machine, an end-embracing pad, a pair of containers in which the opposite side portions of the pad are mounted, said containers being constructed and arranged for rolling motion against each other to close the pad on the work, a carrier for said containers, projections on the containers, respectively, a stop on the carrier against which said projections abut when the pad is in its open position and from which said projections are disengaged by rolling motion of the containers upon each other to close the pad on the work, a pair of members on the carrier on which the containers are respectively supported, means for moving the carrier in a direction to advance the pad bodily against the work, and means operating on the containers to close the pad on the work.

136. In a shoe machine, the combination with means for shaping uppers over lasts of a last pin, a slide in which the last pin is mounted for movement heightwise of a shoe in the machine, a carrier for the slide, and a power-operated carrier-supporting member for moving the carrier heightwise of the shoe and for moving the slide lengthwise of the shoe.

137. In a shoe machine, the combination with means for shaping uppers over lasts of a last pin, a member therefor, a slide in which the member is mounted for manual movement to position the last pin in a last in the machine, means on the slide for holding the member from return movement, a carrier for the slide, power-energized means for moving the carrier in a direction to effect heightwise movement of the last, and means operated by said movement of the carrier for moving the slide in a direction to effect rearward movement of the last.

138. In a shoe machine, the combination with means for shaping uppers over lasts of a last pin, a slide on which the last pin is supported, a carrier for the slide, a shaft extending heightwise of a shoe in the machine on which the carrier is swiveled, a fixture secured to the shaft, latching means mounted on the fixture and arranged to engage a cooperating means on the slide, means for moving said shaft downwardly, and means operating during the downward movement of said shaft to operate the latching means.

139. In a shoe machine, the combination with means for shaping uppers over lasts of a last pin, a slide on which the last pin is supported, a carrier in which the slide is mounted for horizontal movement, a shaft on which the carrier is swiveled, a fixture secured to the shaft, a latch dog supported by the fixture and movable horizontally relatively thereto, ratchet teeth formed in said slide, means for moving said shaft downwardly, and means operated by the downward movement of said shaft to cause said latch dog to engage one of said ratchet teeth and thereafter to move the latch dog horizontally relatively to the fixture.

140. In a shoe machine, the combination with means for shaping uppers over lasts of a last-engaging member, a slide in which said member is mounted for manual movement heightwise of a shoe in the machine, a carrier in which the slide is mounted for manual movement to position the last-engaging member lengthwise of a shoe in the machine, a shaft on which the carrier is swiveled for manual turning movement to position the last-engaging member widthwise of a shoe in the machine, a fixture secured to said shaft, a stop provided by said fixture for limiting turning movement of the carrier in a direction to position the last-engaging member widthwise of the shoe, and means for moving said shaft in a direction to press the last-engaging member against a last in the machine.

141. In a machine for assembling counters in uppers, a central support and wing supports constructed and arranged to support a counter independently of its upper, and means for effecting relative adjustment of the central support and the wing supports lengthwise of a supported counter.

142. In a machine for assembling counters in uppers, means for supporting a molded counter by its flange for the reception of an upper comprising a central support, supports for the counter wings, and means for independently adjusting the wing supports toward and from the central support.

143. In a machine for assembling counters in uppers, a central support, wing supports, means for adjusting the wing supports toward and from the central support, and means for adjusting the wing supports toward and from each other.

144. In a machine for assembling counters in uppers, a central support, wing supports, means for independently adjusting the wing supports toward and from the central support, and means for simultaneously and uniformly adjusting the wing supports toward and from each other.

145. In a machine for assembling counters in uppers, a central support, wing supports, means for independently adjusting the wing supports toward and from the central support, means for simultaneously and uniformly adjusting the wing supports toward and from each other, said wing supports during their adjustive movements being maintained equally distant from a center line extending from front to back of the machine.

146. In a machine for assembling molded counters and uppers, means for supporting a molded counter by its flange for the reception of an upper comprising a central support, wing supports, an actuator for moving the wing supports simultaneously toward and from each other, manually operated connections to said actuator whereby the wing supports are adjusted toward and from each other for the reception of counters of different sizes, and power-operated connections to said actuator for moving the wing supports toward each other to disengage them from a counter in the machine.

147. In a machine for assembling molded counters and uppers, means for supporting a molded counter by its flange for the reception of an upper comprising a central support, wing supports, an actuator for moving the wing supports simultaneously toward and from each other, manually operated connections to said actuator whereby the wing supports are adjusted toward and from each other for the reception of counters of different sizes, power-operated connections to said actuator for moving the wing supports toward each other to disengage them from a counter in the machine, and power-operated means for moving the central support toward the wing supports to disengage it from the counter.

148. In a machine for assembling counters in uppers, means for supporting a counter for the reception of an upper comprising wing supports, heads at opposite sides of the machine within which said wing supports are mounted for movement toward and from a center line extending from front to back of the machine, and means for adjusting said heads in paths parallel to said center line.

149. In a machine for assembling counters in uppers, means for supporting a counter for the reception of an upper comprising wing supports, heads at opposite sides of the machine within which said wing supports are mounted for movement toward and from a center line extending from front to back of the machine, means for adjusting said heads in paths parallel to said central line, and power-operated means for disengaging the wing supports from the counter.

150. In a machine for assembling molded counters in uppers, means for supporting a molded counter for the reception of an upper comprising wing supports constructed and arranged for equal and opposite movement toward and from a center line extending from front to back of the machine, heads at opposite sides of the machine within which said wing supports are mounted, an actuator for said wing supports, manually operated connections to the actuator for adjusting the wing supports for the reception of different sizes of counters, power-operated connections to said actuator for disengaging the wing supports from the counter, and manually operated means for adjusting the heads in paths parallel to said center line.

151. In a machine for assembling molded counters in uppers, means for supporting a molded counter for the reception of an upper comprising a central support, wing supports constructed and arranged for equal and opposite movement toward and from a center line extending from front to back of the machine, heads at opposite sides of the machine within which said wing supports are mounted, an actuator for said wing supports, manually operated connections to the actuator for adjusting the wing supports for the reception of different sizes of counters, power-operated connections to said actuator for disengaging the wing supports from the counter, manually operated means for adjusting the heads in paths parallel to said center line, power-operated means for disengaging the central support from the counter, and means operating during the power movement of the counter supports after said supports have disengaged the flange of the counter for moving them out of the plane of the counter flange.

152. In a shoe machine, a heel-end gripper and breast line grippers comprising, respectively, inner jaws constructed and arranged to engage the inner surface of the lasting margin of an upper in the machine, outer jaws constructed and arranged, respectively, to engage the outer surface of the lasting margin of the upper, means operating on the outer jaws to cause the grippers to engage the work, means operating on the inner jaws to open the grippers and to move the inner jaws out of the path of movement of the outer jaws, and means operating to advance the outer jaws to wipe the lasting margin against an insole on a last in the upper.

153. In a shoe machine the cycle of operations of which is separated into two parts, a heel-end gripper and breast line grippers comprising, respectively, inner jaws constructed and arranged to engage the inner surface of the lasting margin of an upper in the machine, outer jaws constructed and arranged, respectively, to engage the outer surface of the lasting margin of the upper, means operating on the outer jaws during the first part of the cycle of the machine to cause the grippers to engage the work, means operating on the inner jaws during the second part of the cycle of the machine to open the grippers and to move the inner jaws out of the path of movement of the outer jaws, means operating during the second part of the cycle to advance the outer jaws thereby to wipe the lasting margin against an insole on a last in the upper, and fastening-inserting means including drivers carried by the outer gripper jaws for securing the lasted margin to the insole.

154. In a shoe machine, a heel-end gripper and breast line grippers comprising, respectively, inner jaws constructed and arranged to engage the inner surface of the lasting margin of an upper in the machine, outer jaws constructed and arranged, respectively, to engage the outer surface of the lasting margin of the upper, means operating on the outer jaws to cause the grippers to engage the work, means operating on the inner jaws to open the grippers and to move the inner jaws out of the path of movement of the outer jaws, means operating after the jaws have opened to advance the outer jaws to wipe the lasting margin against an insole on a last in the upper, heads at opposite sides of the machine within which the breast line grippers are mounted, and means for adjusting the heads lengthwise of the upper.

155. In a shoe machine, lasting wipers, fastening-inserting means mounted therein, and fastening-delivering means constructed and arranged to move with the wipers during a part but not the whole of the retracting movement of the wipers.

156. In a shoe machine, a lasting wiper, tack-driving means carried thereby, a tack tube, a carrier for the tube constructed and arranged to move with the wiper during its retracting movement, means for effecting alinement of the tack tube with the tack-driving means, and means for maintaining such alinement during the movement of the carrier with the wiper.

157. In a shoe machine, a lasting wiper provided with a fastening-receiving pocket, fastening-delivering means, a carrier therefor, and means for transmitting retracting movement of the wiper to the carrier, such movement of the carrier commencing at that point in the retracting movement of the wiper when the fastening-receiving pocket comes into alinement with the fastening-delivering means.

158. In an assembling machine, means for supporting a lined upper, grippers for tensioning the lining heightwise thereof, a heel-end-embracing pad, manually operated means for actuating the lining grippers, power-operated means for moving the pad lengthwise of the shoe toward the supported upper, and power-operated means for closing the pad on the upper.

159. In an assembling machine, means for supporting a loose counter, means for positioning a lined upper relatively to the counter, manually operated means for tensioning the lining heightwise thereof and holding it so tensioned during the insertion of a last into the supported upper, a heel-end-embracing pad, a driven shaft, and connections from the shaft for moving the last rearwardly thereof and moving the pad into heel-embracing position.

160. In an assembling machine, means for supporting a loose molded counter, means for gaging the position of a lined upper heightwise thereof relatively to the counter, manually operated toe grippers for tensioning the upper lengthwise thereof against the back of the counter, manually operated grippers for tensioning the lining heightwise of the upper and holding it tensioned during the insertion of a last into the upper, and power-operated means for wiping the lasting margin of the rear portion of the upper against an insole on the last bottom.

161. In an assembling machine, means for supporting a loose molded counter, means for gaging the position of a lined upper heightwise thereof relatively to the counter, manually operated toe grippers for tensioning the upper lengthwise thereof against the back of the counter, manually operated grippers for tensioning the lining heightwise of the upper and holding it tensioned during the insertion of a last into the upper, power-operated means for wiping the lasting margin of the rear portion of the upper against an insole on the last bottom, power-operated means for moving the lining grippers out of the path of movement of the wipers, and means for holding the last against movement heightwise thereof during the lasting operation.

162. In an assembling machine, means for supporting a loose molded counter, means for gaging the position of a lined upper heightwise thereof relatively to the supported counter, a toe gripper, means for manually operating the toe gripper to tension the upper lengthwise thereof against the back of the supported counter and to hold the upper so tensioned for the reception of a last, a heel-end-embracing pad, and means for moving the last rearwardly thereof and simultaneously heightwise of the upper toward its lasting margin while the upper is held from movement heightwise thereof by the heel-end-embracing pad.

163. In an assembling machine, means for supporting a loose molded counter, means for gaging the position of a lined upper heightwise thereof relatively to the supported counter, a toe gripper which is manually operated to tension the upper lengthwise thereof against the back of the supported counter and to hold the upper so tensioned for the reception of a last, a heel-end-embracing pad, means for moving the last rearwardly thereof and simultaneously heightwise of the upper toward its lasting margin while the upper is held from movement heightwise thereof by the heel-end-embracing pad, and power-operated means operating on the toe grippers to impart further tension to the upper lengthwise thereof before the last has come to the limit of its movement heightwise of the last and rearwardly thereof.

164. In a power-operated assembling machine the operations of which are separated into two parts, means for supporting a loose counter, power-operated grippers comprising inner gripper jaws for engaging the inner surface of the lasting margin of the rear portion of an upper and outer gripper jaws constructed and arranged to engage the outer surface of said margin, power-operated means operating during the first part of the cycle of the machine to close the gripper jaws on the upper, a yielding last support, a last pin, power-operated means operating during the second part of the cycle of the machine to move the last pin heightwise of the upper toward its lasting margin and rearwardly of the upper, power-operated means operating during the second part of the cycle of the machine to advance the outer gripper jaws to wipe the lasting margin of the upper against an insole on the last bottom after moving the inner gripper jaws out of the path of movement of the outer gripper jaws, a heel-end-embracing pad, and power-operated means operating during the second part of the cycle of the machine to close the pad on the supported upper.

165. In an assembling machine, means for supporting a loose counter in upright position, grippers for supporting the rear portion of a lined upper relatively to the counter, a yielding support for the rear portion of a last loosely positioned within the supported upper, a last pin manually movable into the pin hole of the last, a heel-end-embracing pad, and power-operated means operating on the last pin to move the last rearwardly thereof and heightwise thereof toward the lasting margin of the supported upper while the rear portion of the upper is held from heightwise movement by the heel-end-embracing pad.

166. In an assembling machine, means for supporting a loose counter in upright position, grippers for supporting the rear portion of a lined upper relatively to the counter, a yielding support for the rear portion of a last loosely positioned within the supported upper, manually operated lining grippers for tensioning the lining heightwise thereof and holding it so tensioned during the introduction of a last into the supported upper, a last pin manually movable into the pin hole of the last, a heel-end-embracing pad, power-operated means operating on the last pin to move the last rearwardly thereof and heightwise thereof toward the lasting margin of the supported upper while the rear portion of the upper is held from heightwise movement by the heel-end-embracing pad, and a power-operated gripper for tensioning the supported upper lengthwise thereof against the back of the counter.

167. That improvement in methods of making shoes which consists in applying adhesive to a counter, supporting the treated counter independently of its upper, then positioning the upper in predetermined relation to the counter heightwise thereof, and effecting adhesive attachment of the upper to the counter.

168. That improvement in methods of making lined shoes which consists in applying adhesive to both the inner face and the outer face of a counter, supporting the treated counter independently of its upper, then positioning the upper in predetermined relation to the counter heightwise thereof with the lining adjacent to the inner face of the counter, effecting adhesive attachment of the upper to the outer face of the counter, and effecting adhesive attachment of the lining to the inner face of the counter.

169. That improvement in methods of making shoes which consists in applying adhesive to a counter, supporting the treated counter independently of its upper, then positioning the upper in determinate relation to the counter heightwise thereof, and pulling the upper lengthwise thereof against the back of the supported counter.

170. That improvement in methods of making shoes which consists in applying adhesive to a counter, supporting the treated counter independently of its upper, then positioning the upper in determinate relation to the counter heightwise thereof, gripping the rear portion of the upper by its lasting margin, and forcing the upper against the supported counter thereby to effect adhesive attachment of the upper to the counter.

171. That improvement in methods of making lined shoes which consists in applying adhesive to both the inner face and the outer face of a counter, supporting the treated counter independently of its upper, then positioning the upper in predetermined relation to the counter heightwise thereof with the lining adjacent to the inner face of the counter, forcing the upper against the supported counter thereby to effect adhesive attachment of the upper to the outer face of the counter, and operating on the rear portion of the lining with an inner former thereby to effect adhesive attachment of the lining to the inner surface of the counter.

172. That improvement in methods of making lined shoes which consists in applying adhesive to both the inner face and the outer face of a counter, supporting the treated counter independently of its upper, then positioning the upper in predetermined relation to the counter heightwise thereof with the lining adjacent to the inner face of the counter, forcing the upper against the supported counter thereby to effect adhesive attachment of the upper to the outer face of the counter, tensioning the rear portion of the lining heightwise thereof and operating on the rear portion of the lining with an inner former thereby to effect adhesive attachment of the lining to the inner surface of the counter.

173. That improvement in methods of making shoes which consists in supporting a counter independently of its upper, then positioning the upper in predetermined relation to the counter heightwise thereof, gripping the rear portion of the upper by its lasting margin, pulling the upper lengthwise thereof against the back of the counter, then positioning a last within the upper, and fastening the shoe parts together.

174. That improvement in methods of making shoes which consists in supporting a flanged counter independently of its upper, then positioning the upper in predetermined relation to the counter heightwise thereof, gripping the rear portion of the upper by its lasting margin, pulling the upper lengthwise thereof against the back of the counter, positioning a last within the upper, bringing a heel-end-embracing member into engagement with the rear portion of the upper, then pressing the rear portion of the last downwardly against the flange of the counter and rearwardly against the inner surface of the rear portion of the upper, and fastening the shoe parts together.

175. That improvement in methods of making shoes which consists in arranging an upper and a counter in predetermined relation to each other, holding the counter from movement forwardly of the upper, gripping the rear portion of the upper by its lasting margin, pulling the upper lengthwise thereof against the back of the counter, then positioning a last within the upper while the lengthwise tension is maintained, bringing a heel-end-embracing member into engagement with the rear portion of the upper, and then pressing the rear portion of the last against the inner surface of the rear portion of the upper.

176. That improvement in methods of making shoes which consists in arranging a flanged counter and a lined upper in determinate relation to each other, holding the counter from movement forwardly of the upper and heightwise thereof, pulling the upper lengthwise thereof against the back of the counter, bringing a heel-end-embracing upper-gripping member into gripping engagement with the rear portion of the upper, and then moving a form downwardly and rearwardly of the interior of the upper thereby wiping the rear portion of the lining against the inside of the counter and into the angle defined by the counter and its flange.

177. That improvement in methods of making shoes which consists in arranging a flanged counter and a lined upper in predetermined relation to each other, holding the counter from movement forwardly of the upper and heightwise thereof, pulling the upper lengthwise thereof against the outer surface of the counter, tensioning the rear portion of the lining only heightwise of the upper, and wiping the rear portion of the lining heightwise of the counter toward the flange thereof.

178. That improvement in methods of making shoes which consists in supporting a counter independently of its upper and holding it from movement heightwise thereof and forwardly thereof, positioning a lined upper in predetermined relation to the counter heightwise thereof, pulling the upper lengthwise thereof against the outer face of the counter, tensioning the lining heightwise of the upper, and moving the rear portion of a last heightwise thereof into the rear portion of the supported upper, thereby to wipe the lining heightwise of the counter toward the flange thereof.

179. That improvement in methods of making shoes which consists in supporting a counter and holding it from movement heightwise thereof and forwardly thereof, positioning a lined upper in predetermined relation to the counter heightwise thereof, pulling the upper lengthwise thereof against the outer face of the counter, tensioning the lining heightwise of the upper, bringing a heel-end-embracing upper-gripping member into gripping engagement with the rear portion of the upper, and moving the rear portion of a last heightwise thereof into the rear portion of the supported upper, thereby to wipe the lining heightwise of the counter toward the flange thereof.

180. That improvement in methods of making shoes which consists in supporting a counter and holding it from movement heightwise thereof and forwardly thereof, positioning a lined upper in determinate relation to the counter heightwise thereof, pulling the upper lengthwise thereof against the outer face of the counter, tensioning the lining heightwise of the upper, positioning a last in the upper while the upper is held under lengthwise tension, moving the rear portion of the last rearwardly thereof and toward the flange of the counter while the lining is held under tension thereby to wipe the lining heightwise of the counter toward the flange thereof, bringing a heel-end-embracing upper-gripping member into gripping engagement with the rear portion of the upper, further tensioning the upper lengthwise thereof, bringing the lasting margins of the rear portions of the upper and lining into engagement with an insole on the last bottom, and fastening said marginal portions of the upper and lining to the insole.

181. That improvement in methods of making shoes which consists in supporting a counter stiffener which has not been positioned in an upper and holding it from movement forwardly thereof, positioning an upper relatively to the counter stiffener, tensioning the upper lengthwise thereof against the outer face of the stiffener, and inserting a last into the upper while the lenthwise tension thereon is maintained.

182. That improvement in methods of making shoes which consists in supporting a counter stiffener and holding it from movement heightwise thereof and forwardly thereof, positioning a lined upper relatively to the supported stiffener, tensioning the upper lengthwise thereof, tensioning the rear portion of the lining heightwise of the upper, and inserting a last into the upper through its bottom opening while the lengthwise tension of the upper is maintained and while the heightwise tension on the rear portion of the lining is maintained.

183. That improvement in methods of making shoes which consists in supporting a counter and holding it from movement forwardly thereof, positioning an upper relatively to the counter, tensioning the upper lengthwise thereof, inserting a last into the upper while the lengthwise tension thereon is maintained, holding the last from movement forwardly thereof, and further tensioning the upper lengthwise thereof against the outer face of the counter while the counter is held from movement forwardly of the upper by the last.

184. That improvement in methods of making shoes which consists in supporting a counter and holding it from movement heightwise thereof and forwardly thereof, positioning a lined upper relatively to the counter, tensioning the upper lengthwise thereof, tensioning the rear portion of the lining heightwise of the upper, inserting a last into the upper through its bottom opening while the lengthwise tension on the upper is maintained and while the tension on the rear portion of the lining heightwise of the upper is maintained, holding the last from movement forwardly of the upper, and further tensioning the upper lengthwise thereof against the outer face of the counter while the counter is held from movement forwardly of the upper by the last.

185. That improvement in methods of making shoes which consists in supporting a counter and holding it from movement heightwise thereof and forwardly thereof, positioning a lined upper relatively to the counter, tensioning the upper lengthwise thereof, tensioning the rear portion of the lining heightwise of the upper, inserting a last into the upper through its bottom opening while the lengthwise tension on the upper is maintained and while the tension on the rear portion of the lining heightwise of the upper is maintained, holding the last from movement forwardly of the upper, releasing the tension on the lining, further tensioning the upper lengthwise thereof against the outer face of the counter while the counter is held from movement forwardly of the upper by the last, and relatively moving the rear portions of the last and upper heightwise thereof thereby to wipe the rear portion of the lining toward the lasting margin of the upper while the lengthwise tension on the upper is maintained.

ARTHUR F. PYM,
*Executor of the Will of Charles F. Pym, Deceased.*

---

CERTIFICATE OF CORRECTION.

Patent No. 2,140,546.

December 20, 1938.

ARTHUR F. PYM, EXECUTOR of

CHARLES F. PYM, deceased.

It is hereby certified that error appears in the printed specification of the above numbered patent requiring correction as follows: Page 8, second column, line 4, for the reference numeral "312" read 412; page 26, first column, line 12, claim 84, for the word "carrier" read carried; and that the said Letters Patent should be read with this correction therein that the same may conform to the record of the case in the Patent Office.

Signed and sealed this 5th day of September, A. D. 1939.

Henry Van Arsdale, (Seal)

Acting Commissioner of Patents, gripping engagement with the rear portion of the upper, further tensioning the upper lengthwise thereof, bringing the lasting margins of the rear portions of the upper and lining into engagement with an insole on the last bottom, and fastening said marginal portions of the upper and lining to the insole.

181. That improvement in methods of making shoes which consists in supporting a counter stiffener which has not been positioned in an upper and holding it from movement forwardly thereof, positioning an upper relatively to the counter stiffener, tensioning the upper lengthwise thereof against the outer face of the stiffener, and inserting a last into the upper while the lenthwise tension thereon is maintained.

182. That improvement in methods of making shoes which consists in supporting a counter stiffener and holding it from movement heightwise thereof and forwardly thereof, positioning a lined upper relatively to the supported stiffener, tensioning the upper lengthwise thereof, tensioning the rear portion of the lining heightwise of the upper, and inserting a last into the upper through its bottom opening while the lengthwise tension of the upper is maintained and while the heightwise tension on the rear portion of the lining is maintained.

183. That improvement in methods of making shoes which consists in supporting a counter and holding it from movement forwardly thereof, positioning an upper relatively to the counter, tensioning the upper lengthwise thereof, inserting a last into the upper while the lengthwise tension thereon is maintained, holding the last from movement forwardly thereof, and further tensioning the upper lengthwise thereof against the outer face of the counter while the counter is held from movement forwardly of the upper by the last.

184. That improvement in methods of making shoes which consists in supporting a counter and holding it from movement heightwise thereof and forwardly thereof, positioning a lined upper relatively to the counter, tensioning the upper lengthwise thereof, tensioning the rear portion of the lining heightwise of the upper, inserting a last into the upper through its bottom opening while the lengthwise tension on the upper is maintained and while the tension on the rear portion of the lining heightwise of the upper is maintained, holding the last from movement forwardly of the upper, and further tensioning the upper lengthwise thereof against the outer face of the counter while the counter is held from movement forwardly of the upper by the last.

185. That improvement in methods of making shoes which consists in supporting a counter and holding it from movement heightwise thereof and forwardly thereof, positioning a lined upper relatively to the counter, tensioning the upper lengthwise thereof, tensioning the rear portion of the lining heightwise of the upper, inserting a last into the upper through its bottom opening while the lengthwise tension on the upper is maintained and while the tension on the rear portion of the lining heightwise of the upper is maintained, holding the last from movement forwardly of the upper, releasing the tension on the lining, further tensioning the upper lengthwise thereof against the outer face of the counter while the counter is held from movement forwardly of the upper by the last, and relatively moving the rear portions of the last and upper heightwise thereof thereby to wipe the rear portion of the lining toward the lasting margin of the upper while the lengthwise tension on the upper is maintained.

ARTHUR F. PYM,
*Executor of the Will of Charles F. Pym, Deceased.*

---

CERTIFICATE OF CORRECTION.

Patent No. 2,140,546. December 20, 1938.

ARTHUR F. PYM, EXECUTOR of

CHARLES F. PYM, deceased.

It is hereby certified that error appears in the printed specification of the above numbered patent requiring correction as follows: Page 8, second column, line 4, for the reference numeral "312" read 412; page 26, first column, line 12, claim 84, for the word "carrier" read carried; and that the said Letters Patent should be read with this correction therein that the same may conform to the record of the case in the Patent Office.

Signed and sealed this 5th day of September, A. D. 1939.

Henry Van Arsdale, (Seal)

Acting Commissioner of Patents,